United States Patent
Kato et al.

(10) Patent No.: US 9,766,801 B2
(45) Date of Patent: Sep. 19, 2017

(54) IN-CAR INFORMATION SYSTEM, IN-CAR DEVICE, AND INFORMATION TERMINAL

(71) Applicant: Clarion Co., Ltd., Saitama-shi, Saitama (JP)

(72) Inventors: Ryohei Kato, Yokohama (JP); Noriyuki Abe, Yokohama (JP); Norikazu Nara, Matsudo (JP); Hidetaka Suzuki, Yokohama (JP); Kimio Okamoto, Yokohama (JP)

(73) Assignee: Clarion Co., Ltd., Saitama-shi (JP)

( * ) Notice: Subject to any disclaimer, the term of this patent is extended or adjusted under 35 U.S.C. 154(b) by 53 days.

(21) Appl. No.: 15/018,060

(22) Filed: Feb. 8, 2016

(65) Prior Publication Data

US 2016/0154561 A1 Jun. 2, 2016

Related U.S. Application Data

(63) Continuation of application No. 14/508,420, filed on Oct. 7, 2014, now Pat. No. 9,288,665, which is a
(Continued)

(30) Foreign Application Priority Data

Sep. 17, 2010 (JP) .................. 2010-209333
Nov. 10, 2010 (JP) .................. 2010-251664
Apr. 14, 2011 (JP) .................. 2011-090411

(51) Int. Cl.
*B60K 35/00* (2006.01)
*G01C 21/36* (2006.01)
(Continued)

(52) U.S. Cl.
CPC ............ *G06F 3/0488* (2013.01); *B60K 35/00* (2013.01); *G01C 21/3664* (2013.01);
(Continued)

(58) Field of Classification Search
CPC .......... G01C 31/36; B60K 35/00; H04N 8/24; H04M 1/6075
(Continued)

(56) References Cited

U.S. PATENT DOCUMENTS 8,285,441 B2 10/2012 Bertosa et al.
2005/0065678 A1 3/2005 Smith et al.
(Continued)

FOREIGN PATENT DOCUMENTS

EP 1 338 866 A2 8/2003
JP 2-75052 A 3/1990
(Continued)

OTHER PUBLICATIONS

International Search Report dated Dec. 13, 2011 (Three (3) pages).
European Search Report dated May 18, 2015 (10 pages).

*Primary Examiner* — Tan Q Nguyen
(74) *Attorney, Agent, or Firm* — Crowell & Moring LLP

(57) ABSTRACT

An information terminal includes: an operation assignment information storage unit that stores operation assignment information; an actuation information reception unit that receives from an in-car device actuation information; an assignment unit that, on the basis of the operation assignment information and the actuation information, assigns some among a plurality of operations in the information terminal to each of one or more actuations among a plurality of types of actuation that can be inputted with an actuation unit provided to the in-car device respectively, according to priority levels; an actuation signal reception unit that receives an actuation signal outputted from the in-car device; and a conversion unit that, on the basis of the result of assignment by the assignment unit, converts the actuation signal into an operating command that corresponds to one among the plurality of operations.

7 Claims, 31 Drawing Sheets

Related U.S. Application Data continuation of application No. 13/824,150, filed as application No. PCT/JP2011/071242 on Sep. 16, 2011, now Pat. No. 8,886,398.

(51) Int. Cl.
*G06F 3/0488* (2013.01)
*G06F 17/00* (2006.01)
*H04W 8/24* (2009.01)
*H04M 1/725* (2006.01)
*H04M 1/60* (2006.01)

(52) U.S. Cl.
CPC ........ *G01C 21/3688* (2013.01); *G06F 17/00* (2013.01); *H04M 1/72527* (2013.01); *H04W 8/24* (2013.01); *H04M 1/6075* (2013.01); *H04M 1/72577* (2013.01)

(58) Field of Classification Search
USPC ............................................. 701/36; 455/566
See application file for complete search history.

(56) References Cited

U.S. PATENT DOCUMENTS

| | | |
|---|---|---|
| 2007/0067088 A1 | 3/2007 | Baig |
| 2007/0291664 A1 | 12/2007 | Weyl et al. |
| 2009/0119005 A1 | 5/2009 | Ishibashi et al. |
| 2009/0210147 A1 | 8/2009 | Bauer et al. |
| 2010/0138149 A1 | 6/2010 | Ohta et al. |
| 2012/0313768 A1 | 12/2012 | Campbell et al. |
| 2015/0072663 A1* | 3/2015 | Chande .................. G06Q 10/10 455/414.1 |
| 2015/0156307 A1* | 6/2015 | Kim .................. H04W 52/0261 455/566 |

FOREIGN PATENT DOCUMENTS

| | | |
|---|---|---|
| JP | 2002-10373 A | 1/2002 |
| JP | 2003-244343 A | 8/2003 |
| JP | 2003-344087 A | 12/2003 |
| JP | 2004-102398 A | 4/2004 |
| JP | 2008-193337 A | 8/2008 |
| JP | 2008-245042 A | 10/2008 |
| JP | 2010-126092 A | 6/2010 |
| JP | 2010-130669 | 6/2010 |
| JP | 2010-130670 A | 6/2010 |
| JP | 2010-199718 A | 9/2010 |
| WO | WO 2006/063603 A1 | 6/2006 |

* cited by examiner

FIG.4

OPERATING KEY INFORMATION

| OPERATING KEY | TYPE |
|---|---|
| A | PRESET |
| B | PRESET |
| C | PRESET |
| D | PRESET |
| E RIGHT | DIAL |
| E LEFT | DIAL |

FIG.5

OPERATION ASSIGNMENT INFORMATION

| OPERATION | RECOMMENDED CLASSIFICATION | DISPLAY | PRIORITY LEVEL | POSSIBLE/IMPOSSIBLE WHILE MOVING |
|---|---|---|---|---|
| ENLARGE SCALE | DIAL | ⊕ | 1 | POSSIBLE |
| REDUCE SCALE | DIAL | ⊖ | 2 | POSSIBLE |
| SHIFT UP | CURSOR UP | ← | 3 | IMPOSSIBLE |
| SHIFT DOWN | CURSOR DOWN | → | 4 | IMPOSSIBLE |
| SHIFT RIGHT | CURSOR RIGHT | ↑ | 5 | IMPOSSIBLE |
| SHIFT LEFT | CURSOR LEFT | ↓ | 6 | IMPOSSIBLE |
| SET DESTINATION | PRESET | DESTINATION | 7 | IMPOSSIBLE |
| FIND FACILITY | PRESET | FACILITY | 8 | IMPOSSIBLE |
| CHANGE SETTING | PRESET | SETTING | 9 | — |

FIG.6  OPERATING KEY CORRESPONDENCE INFORMATION

| OPERATING KEY | OPERATION | DISPLAY | POSSIBLE/IMPOSSIBLE WHILE MOVING |
|---|---|---|---|
| A | SHIFT UP | ← | IMPOSSIBLE |
| B | SHIFT DOWN | → | IMPOSSIBLE |
| C | SHIFT RIGHT | ↑ | IMPOSSIBLE |
| D | SHIFT LEFT | ↓ | IMPOSSIBLE |
| E RIGHT | ENLARGE SCALE | ⊕ | POSSIBLE |
| E LEFT | REDUCE SCALE | ⊖ | POSSIBLE |

FIG.7

| OPERATING KEY | OPERATION | CLASSIFICATION | DISPLAY | POSSIBLE/ IMPOSSIBLE WHILE MOVING |
|---|---|---|---|---|
| 61 | | | | |
| 62 | | | | |
| 63 | | | | |
| 64 | | | | |
| 65 | | | | |
| 66 | | | | |
| 67 | | | | |
| 68 | | | | |
| 69 | | | | |

FIG.8

| OPERATING KEY | OPERATION | CLASSIFICATION | DISPLAY | POSSIBLE/ IMPOSSIBLE WHILE MOVING |
|---|---|---|---|---|
| A | | PRESET | | |
| B | | PRESET | | |
| C | | PRESET | | |
| D | | PRESET | | |
| E RIGHT | | DIAL | | |
| E LEFT | | DIAL | | |
| — | — | — | — | — |
| — | — | — | — | — |
| — | — | — | — | — |

| OPERATING KEY | OPERATION | CLASSIFICATION | DISPLAY | POSSIBLE/ IMPOSSIBLE WHILE MOVING |
|---|---|---|---|---|
| A | | PRESET | | |
| B | | PRESET | | |
| C | | PRESET | | |
| D | | PRESET | | |
| E RIGHT | ENLARGE SCALE | DIAL | ⊕ | POSSIBLE |
| E LEFT | REDUCE SCALE | DIAL | ⊖ | POSSIBLE |
| — | — | — | — | — |
| — | — | — | — | — |
| — | — | — | — | — |

| OPERATING KEY | OPERATION | CLASSIFICATION | DISPLAY | POSSIBLE/ IMPOSSIBLE WHILE MOVING |
|---|---|---|---|---|
| A | SHIFT UP | PRESET | ← | IMPOSSIBLE |
| B | SHIFT DOWN | PRESET | → | IMPOSSIBLE |
| C | SHIFT RIGHT | PRESET | ↑ | IMPOSSIBLE |
| D | SHIFT LEFT | PRESET | ↓ | IMPOSSIBLE |
| E RIGHT | ENLARGE SCALE | DIAL | ⊕ | POSSIBLE |
| E LEFT | REDUCE SCALE | DIAL | ⊖ | POSSIBLE |
| — | — | — | — | — |
| — | — | — | — | — |
| — | — | — | — | — |

61
62
63
64
65
66
67
68
69

FIG.20
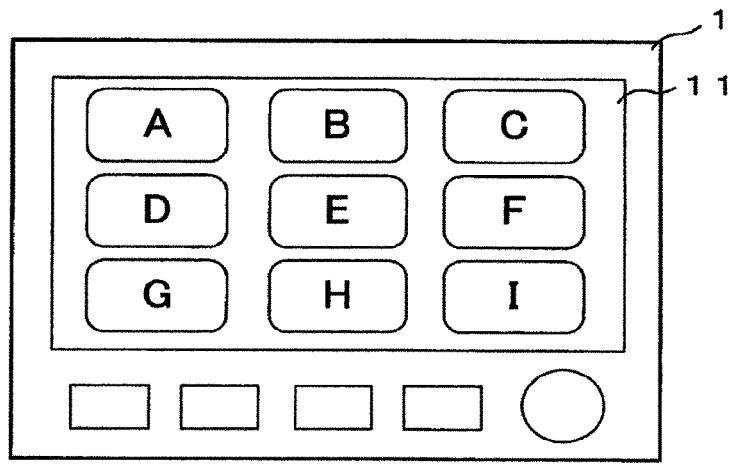
(a) MENU SCREEN WHILE STOPPED
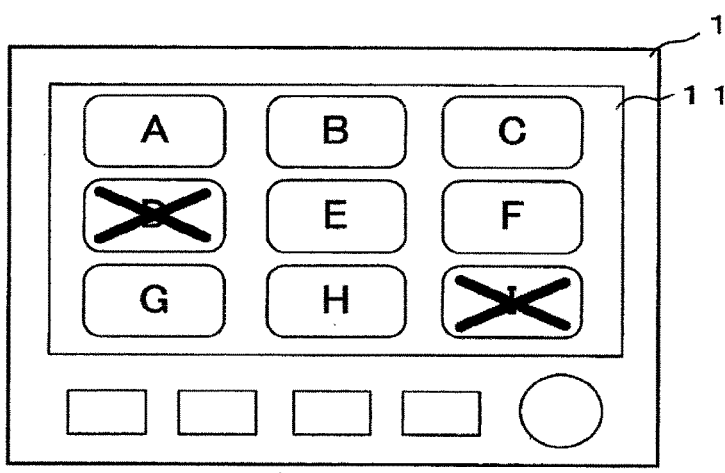
(b) MENU SCREEN WHILE IN MOTION
(C) APPLICATION SCREEN WHILE IN MOTION

FIG.30

| SCREEN SIZE (INCHES) | NUMBER OF PIXELS ||
|---|---|---|
| | WVGA (800×480) | WQVGA (400×240) |
| 7 | 8pt | 6pt |
| 6 | 8pt | 6pt |
| 5 | 9pt | 7pt |
| 4.3 | 10pt | 8pt |

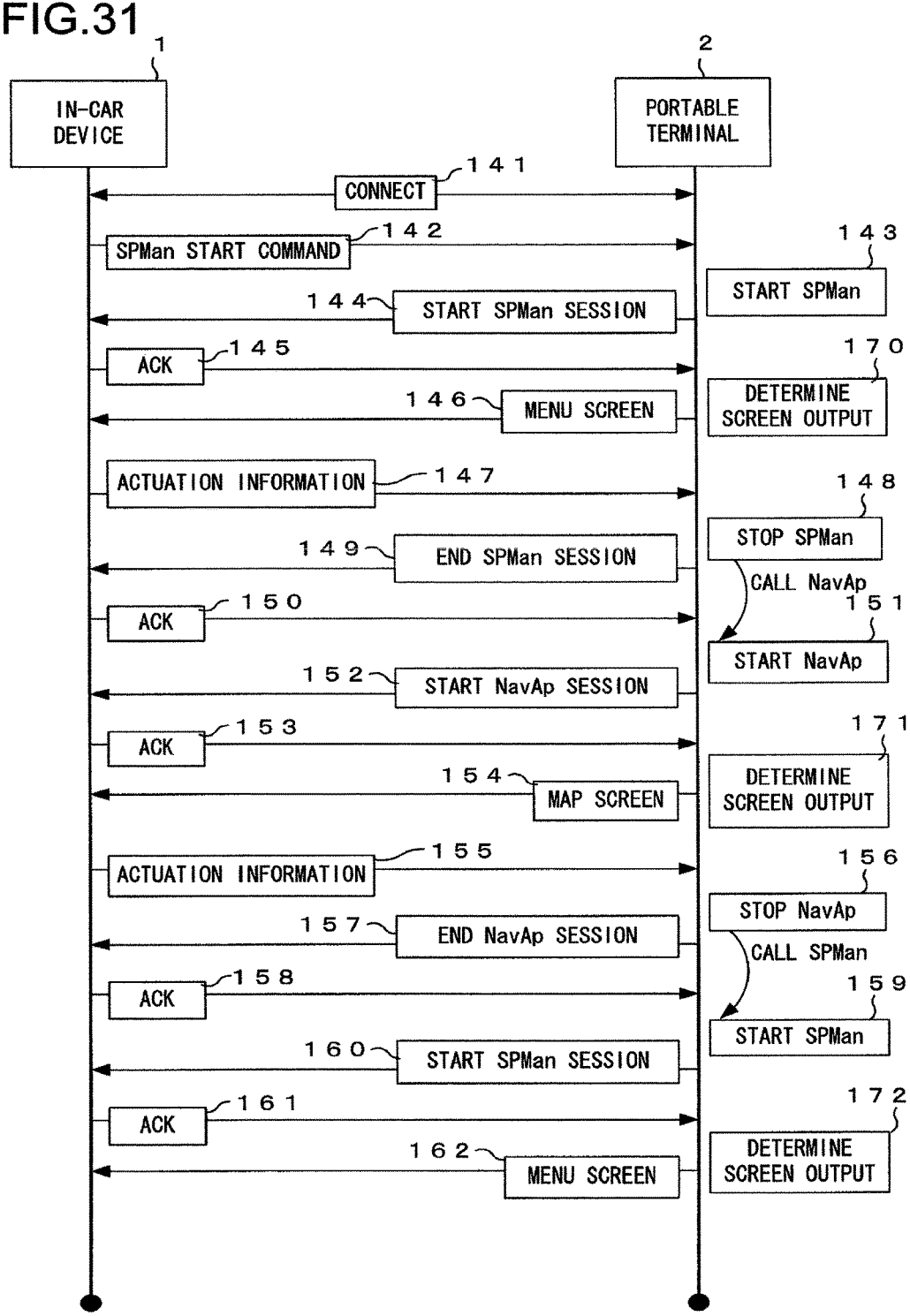

IN-CAR INFORMATION SYSTEM, IN-CAR DEVICE, AND INFORMATION TERMINAL

CROSS REFERENCE TO RELATED APPLICATIONS

This application is a continuation of U.S. application Ser. No. 14/508,420, filed Oct. 7, 2014, which is a continuation of U.S. application Ser. No. 13/824,150, filed Mar. 15, 2013, which is a National Stage application of PCT/JP2011/071242, filed Sep. 16, 2011, which claims priority from Japanese Patent application nos. 2011-090411, filed Apr. 14, 2011, 2010-251664, filed Nov. 10, 2010 and 2010-209333, filed Sep. 17, 2010, the disclosures of which are expressly incorporated by reference herein.

TECHNICAL FIELD

The present invention relates to an in-car information system that is used while mounted to a vehicle, and to an in-car device and an information terminal that are used in such an in-car information system.

BACKGROUND ART

In the prior art, a technique has been per se known for transmitting information that is displayed on the screen of an information terminal such as a portable telephone to an in-car device, and for this information to be displayed upon a display of the in-car device (refer to Patent Document #1). Furthermore, in order to make it possible to actuate the information terminal from the in-car device, it is described in Patent Document #1 to display touch switches corresponding to operating buttons and operating details of the information terminal upon a touch panel of the in-car device, and, when any one of these switches is actuated by being touched, to convert the operating command corresponding to which switch into an operating command for the information terminal, and to transmit that operating command to the information terminal. Moreover, it is also described not to display any such touch switches, but instead to employ one or more operating buttons provided to the in-car device.

CITATION LIST

Patent Literature

Patent Document #1: Japanese Laid-Open Patent Publication No. 2003-244343.

SUMMARY OF INVENTION

Technical Problem

With the prior art technique described in Patent Document #1, in order for the conversion of operating commands to be performed by the in-car device, it is necessary for information to be transmitted from the information terminal to the in-car device, specifying which of the touch switches or operating buttons of the in-car device corresponds to which operating command for the information terminal. However, since in-car devices of various types exist, and since whether or not a touch panel is fitted and the arrangement of such a touch panel are different between different in-car devices, accordingly, in order for it to be possible to actuate an information terminal with these in-car devices in a compatible manner, it is necessary to provide in advance, for that information terminal, information as described above for each type of in-car device, and for one set of such information to be selected when the information terminal is connected to some in-car device. Not only does this solution impose a heavy burden upon the software developer or the like on the information terminal side, but also the problem arises that it cannot be applied when an in-car device of a new type appears on the market. Moreover, a similar problem also arises if the information is transmitted to the information terminal just as it is without the operating commands being converted by the in-car device, and with the conversion instead being performed by the information terminal.

It should be understood that while, in order to make it possible to utilize an information terminal with an in-car device of a novel type, it has also been considered to make the user himself perform the task of establishing the correspondence settings between the details of actuation of the in-car device and the details of operation on the information terminal, the further problem then arises that this is extremely troublesome from the point of view of the user.

Furthermore, in recent years, information terminals such as portable telephones and so on have been provided with many functions of various kinds, and it is arranged for it to be possible for a desired function to be executed by the information terminal by the user selecting that function upon a menu screen or the like. Due to this, it has been considered also to implement a technique such as that described above as one among the various types of functions provided to the information terminal. However, in Patent Document #1, there is no description of any concrete procedure or method for, by actuation of the in-car device, selecting and executing a function for implementation of a technique such as that described above from among the various types of function with which the information terminal is endowed. It should be understood that, while it may also be considered for the user to actuate the information terminal in advance so as to cause that function to be implemented, this is inconvenient from the point of view of the user.

In consideration of the situation as described above, in an in-car information system to which in-car devices and information terminals of various types may be connected, it is desirable for correspondence to be established between the details of actuation of an in-car device and the details of operation of an information terminal in a simple and easy manner.

Solution to Problem

An in-car information system according to a 1st aspect of the present invention includes a portable type information terminal and an in-car device. In this in-car information system, the information terminal includes: an operation assignment information storage unit that, for a plurality of operations on the information terminal, stores operation assignment information that includes information related to priority levels of assignments to the plurality of operations; an actuation information reception unit that receives from the in-car device actuation information related to a plurality of types of actuation that can be inputted with an actuation unit provided to the in-car device; an assignment unit that, on the basis of the operation assignment information and the actuation information, assigns some among the plurality of operations to each of one or more actuations among the plurality of types of actuation respectively, according to the priority levels; an actuation signal reception unit that receives an actuation signal outputted from the in-car device; and a conversion unit that, on the basis of the result of assignment by the assignment unit, converts the actuation signal into an operating command that corresponds to one among the plurality of operations. The in-car device includes: an actuation information transmission unit that transmits the actuation information to the information terminal; and an actuation signal output unit that, in response to actuation of the actuation unit by the user, outputs the actuation signal to the information terminal.

According to a 2nd aspect of the present invention, in the in-car information system of the 1st aspect, the operation assignment information further includes information related to recommended classification, specifying a recommended classification of actuation for each operation; the actuation information includes information related to the classifications of the actuations; and, on the basis of the operation assignment information and the actuation information, the assignment unit can preferentially assign to the actuations, operations for which the classifications of the actuations are set as recommended classifications.

According to a 3rd aspect of the present invention, in the in-car information system of the 1st or 2nd aspect, it is preferred that: the information terminal further includes an actuation correspondence information transmission unit that transmits, to the in-car device, actuation correspondence information related to the result of assignment by the assignment unit; and the in-car device further includes an actuation correspondence information reception unit that receives the actuation correspondence information from the information terminal.

According to a 4th aspect of the present invention, in the in-car information system of the 3rd aspect, it is preferred that: the actuation correspondence information includes information about operations assigned by the assignment unit to actuations, and information about icons denoting the operations; and, on the basis of the actuation correspondence information, the in-car device displays icons denoting operations assigned to actuations in display regions of a display monitor that are determined in advance for the actuations respectively.

According to a 5th aspect of the present invention, in the in-car information system of the 3rd or 4th aspect, it is preferred that: the actuation correspondence information includes information about operations assigned by the assignment unit to actuations, and information as to whether or not the operations are permitted while the vehicle is in motion; and the in-car device determines operations that are prohibited while the vehicle is in motion on the basis of the actuation correspondence information, and makes ineffective the actuations that are assigned to the prohibited operations when the vehicle is in motion.

According to a 6th aspect of the present invention, in the in-car information system of the 4th aspect, it is acceptable that: the actuation correspondence information includes information about operations assigned by the assignment unit to actuations, and information as to whether or not the operations are permitted while the vehicle is in motion; and the in-car device determines operations that are prohibited while the vehicle is in motion on the basis of the actuation correspondence information, and, when the vehicle is in motion, makes ineffective the actuations that are assigned to the prohibited operations and also changes the display mode for the icons denoting the prohibited operations to a mode that is different from a display mode when the vehicle is stopped.

An in-car information system according to a 7th aspect of the present invention includes a portable type information terminal and an in-car device. In this in-car information system, the information terminal includes: an operation assignment information transmission unit that, for a plurality of operations upon the information terminal, transmits to the in-car device operation assignment information that includes information related to priority levels of assignments to the plurality of operations; and an operating command reception unit that receives operating commands outputted from the in-car device. The in-car device includes: an operation assignment information reception unit that receives the operation assignment information from the portable terminal; an assignment unit that, on the basis of the operation assignment information, assigns some among the plurality of operations respectively to each of one or more actuations among a plurality of types of actuation that can be inputted by an actuation unit provided to the in-car device, according to the priority levels; a conversion unit that, on the basis of the result of assignment by the assignment unit, converts an actuation signal corresponding to an actuation by the user upon the actuation unit into an operating command that corresponds to one among the plurality of operations; and an operating command output unit that outputs, to the information terminal, the operating command converted from the actuation signal by the conversion unit.

According to an 8th aspect of the present invention, in the in-car information system of the 7th aspect, it is preferred that: the operation assignment information further includes information related to recommended classification, specifying a recommended classification of actuation for each operation; and, on the basis of the operation assignment information, the assignment unit preferentially assigns to the actuations, operations for which the classifications of the actuations are set as recommended classifications.

According to a 9th aspect of the present invention, in the in-car information system of the 7th or 8th aspect, the operation assignment information further includes information about icons that denote operations; and, on the basis of the results of assignment in the operation assignment information, the in-car device can display icons denoting operations assigned to actuations in respective display regions of a display monitor that are determined in advance for those actuations.

According to a 10th aspect of the present invention, in the in-car information system of any one of the 7th through 9th aspects, it is preferred that: the operation assignment information further includes information as to whether or not the operations are permitted while the vehicle is in motion; and the in-car device determines operations that are prohibited while the vehicle is in motion on the basis of the results of assignment in the operation assignment information, and makes ineffective the actuations that are assigned to the prohibited operations when the vehicle is in motion.

According to an 11th aspect of the present invention, in the in-car information system of the 9th aspect, it is acceptable that: the operation assignment information further includes information as to whether or not the operations are permitted while the vehicle is in motion; and the in-car device determines operations that are prohibited while the vehicle is in motion on the basis of the results of assignment in the operation assignment information, and, when the vehicle is in motion, makes ineffective the actuations that are assigned to the prohibited operations and also changes the display mode for the icons denoting the prohibited operations to a mode that is different from a display mode when the vehicle is stopped.

An in-car device according to a 12th aspect of the present invention is capable to be connected to a portable type information terminal and to which is provided an actuation unit to which actuations of a plurality of types can be inputted, and includes: an actuation information transmission unit that transmits actuation information related to the plurality of types of actuation to the information terminal; and an actuation signal output unit that, in response to actuation of the actuation unit by the user, outputs an actuation signal to the information terminal.

An in-car device according to a 13th aspect of the present invention is capable to be connected to a portable type information terminal and to which is provided an actuation unit to which a plurality of types of actuation can be inputted, and includes: an operation assignment information reception unit that, for a plurality of operations on the information terminal, receives from the portable terminal operation assignment information that includes information related to priority levels of assignments to the operations; an assignment unit that, on the basis of the operation assignment information, assigns some among the plurality of operations to each of one or more actuations among the plurality of types of actuation respectively, according to the priority levels; a conversion unit that, on the basis of the result of assignment by the assignment unit, converts an actuation signal corresponding to actuation of the actuation unit by the user into an operating command that corresponds to one among the plurality of operations; and an operating command output unit that outputs to the information terminal the operating command that has been converted from the actuation signal by the conversion unit.

A portable type information terminal according to a 14th aspect of the present invention is capable to be connected to an in-car device, and includes: an operation assignment information storage unit that, for a plurality of operations, stores operation assignment information that includes information related to priority levels of assignments to the operations; an actuation information reception unit that receives from the in-car device actuation information related to a plurality of types of actuation that can be inputted with an actuation unit provided to the in-car device; an assignment unit that, on the basis of the operation assignment information and the actuation information, assigns some among the plurality of operations to each of one or more actuations among the plurality of types of actuation respectively, according to the priority levels; an actuation signal reception unit that receives an actuation signal outputted from the in-car device; and a conversion unit that, on the basis of the result of assignment by the assignment unit, converts the actuation signal into an operating command that corresponds to one among the plurality of operations.

A portable type information terminal according to a 15th aspect of the present invention that is capable to be connected to an in-car device, and includes: an operation assignment information transmission unit that, for a plurality of operations, transmits to the in-car device operation assignment information that includes information related to priority levels of assignments to the operations; and an operating command reception unit that receives operating commands outputted from the in-car device.

An in-car information system according to a 16th aspect of the present invention includes a portable type information terminal and an in-car device. In this in-car information system, the information terminal includes: a communication control unit for controlling communication performed with the in-car device; and a software execution unit for executing software that is stored in advance. The in-car device includes: an actuation input unit for inputting actuation by the user; an information transmission unit that transmits to the information terminal information corresponding to the actuation inputted by the actuation input unit under control of the communication control unit; and a notification unit that issues notification to the user, on the basis of information transmitted from the information terminal under control of the communication control unit.

According to a 17th aspect of the present invention, in the in-car information system of the 16th aspect, the software includes an application that can be executed by the information terminal; the communication control unit, along with transmitting to the in-car device menu screen information for displaying upon the in-car device a menu screen that includes an icon corresponding to the application, also receives an application execution command transmitted from the information transmission unit by the user selecting the icon upon the menu screen by actuating the actuation input unit of the in-car device; the software execution unit puts the application into the running state in response to the application execution command received by the communication control unit; the notification unit issues the notification by displaying the menu screen upon the display monitor, on the basis of the menu screen information transmitted by the communication control unit; and the information transmission unit can transmit to the information terminal an application execution command for putting into the running state the application that corresponds to the icon that has been selected upon the menu screen by the user actuating the actuation input unit.

According to an 18th aspect of the present invention, in the in-car information system of the 17th aspect, it is preferred that, before putting the application into the state of running on the software execution unit, the information terminal stops the transmission of the menu screen information and the reception of the application execution command by the communication control unit.

According to a 19th aspect of the present invention, in the in-car information system of the 18th aspect, it is preferred that: the information terminal is any one of a first information terminal in which the software execution unit is only capable of executing one of the applications at a time and a second information terminal in which the software execution unit is capable of executing a plurality of the applications at the same time; if the information terminal is the first information terminal, then, before putting the application into the state of running on the software execution unit, the information terminal stops the transmission of the menu screen information and the reception of the application execution command by the communication control unit; and if the information terminal is the second information terminal, then, even when putting the application into the state of running on the software execution unit, the information terminal does not stop the transmission of the menu screen information and the reception of the application execution command by the communication control unit.

According to a 20th aspect of the present invention, in the in-car information system of the 18th or 19th aspect, it is preferred that, when the application that was in the state of running on the software execution unit is put into the stopped state, the information terminal resumes the transmission of the menu screen information and the reception of the application execution command by the communication control unit.

According to a 21st aspect of the present invention, in the in-car information system of the 20th aspect, it is preferred that: the information transmission unit, along with transmitting to the information terminal, in response to the actuation inputted with the actuation input unit, an application stop command for putting the application that is being executed on the information terminal into the stopped state, also, after having transmitted the application stop command, transmits a resume command to the information terminal for causing the resumption by the information terminal of the transmission of the menu screen information and the reception of the application execution command by the communication control unit; and in response to the application stop command, the information terminal puts the application that was in the state of running on the software execution unit into the stopped state, and thereafter, in response to the resume command, resumes the operation of the communication control unit.

According to a 22nd aspect of the present invention, in the in-car information system of any one of the 17th through 21st aspects, the menu screen information includes information for specifying a correspondence relationship between the applications and the icons; and the information transmission unit can determine the application that corresponds to an icon selected upon the menu screen by the user actuating the actuation input unit on the basis of the menu screen information and transmits an application execution command corresponding to the application to the information terminal.

According to a 23rd aspect of the present invention, in the in-car information system of any one of the 17th through 22nd aspects, it is preferred that the information terminal or the in-car device includes: a movement determination unit that makes a determination as to whether or not the vehicle is in motion; and an execution prohibition unit that prohibits execution of the application if it has been determined by the movement determination unit that the vehicle is in motion.

According to a 24th aspect of the present invention, in the in-car information system of the 23rd aspect, the in-car device can change over the display mode on the menu screen for the icon corresponding to the application for which execution has been prohibited by the execution prohibition unit, to a different mode from the mode while the vehicle is stopped.

According to a 25th aspect of the present invention, in the in-car information system of any one of the 17th through 22nd aspects, the information terminal or the in-car device may include: a movement determination unit that makes a determination as to whether or not the vehicle is in motion; and a forced ending unit that terminates the application that is being executed by the software execution unit, if it has been determined by the movement determination unit that the vehicle is in motion.

According to a 26th aspect of the present invention, in the in-car information system of any one of the 17th through 25th aspects, it is acceptable that: the communication control unit takes at least one application or more among the plurality of applications that are stored in advance in the portable terminal as applications to be excluded as subjects, and transmits the menu screen information to the in-car device while omitting information relating to the applications that are to be excluded as subjects; and the notification unit displays the menu screen upon the display monitor on the basis of the menu screen information, while not including icons that correspond to the applications to be excluded as subjects.

According to a 27th aspect of the present invention, in the in-car information system of any one of the 17th through 26th aspects, it is preferred that: a plurality of the applications are stored in advance in the portable terminal; and if there is processing that is utilized in common by the plurality of applications, the software execution unit shares the result of the processing that is utilized in common between the plurality of applications.

An in-car device according to a 28th aspect of the present invention is capable to be connected to a portable type information terminal that is capable of executing an application, and includes: an actuation input unit for inputting actuation by the user; a notification unit that issues notification to the user by displaying a menu screen upon a display monitor, on the basis of menu screen information for displaying the menu screen that includes an icon corresponding to the application, transmitted from the information terminal; and an information transmission unit that transmits to the information terminal an application execution command for putting into the running state the application corresponding to an icon that has been selected upon the menu screen by the user actuating the actuation input unit.

According to a 29th aspect of the present invention, in the in-car information system of the 28th aspect, it is preferred that the information transmission unit, along with transmitting to the information terminal, in response to the actuation inputted with the actuation input unit, an application stop command for putting the application that is being executed on the information terminal into the stopped state, also, after having transmitted the application stop command, transmits a resume command to the information terminal for causing the resumption by the information terminal of the transmission of the menu screen information and the reception of the application execution command by the communication control unit.

A portable type information terminal according to a 30th aspect of the present invention is capable to be connected to an in-car device, and comprising: a communication control unit for controlling communication with the in-car device; and a software execution unit for executing software that is stored in advance. In this information terminal, the software includes an application that can be executed by the information terminal; the communication control unit, along with transmitting to the in-car device menu screen information for displaying upon the in-car device a menu screen that includes an icon corresponding to the application, also receives an application execution command transmitted from the in-car device by the user selecting the icon upon the menu screen of the in-car device; and the software execution unit puts the application into the running state in response to the application execution command received by the communication control unit.

According to a 31st aspect of the present invention, in the information terminal of the 30th aspect, it is preferred that: before the application is put into the state of running on the software execution unit, the transmission of the menu screen information and the reception of the application execution command by the communication control unit are stopped; and when the application that was put into the state of running on the software execution unit is put into the stopped state, the transmission of the menu screen information and the reception of the application execution command by the communication control unit are resumed.

An in-car information system according to a 32nd aspect of the present invention includes a portable type information terminal and an in-car device. The information terminal includes a software execution unit for executing software stored in advance. The in-car device includes: an actuation input unit for inputting actuation by the user; an information transmission unit that transmits to the information terminal information corresponding to the actuation inputted with the actuation input unit; and a notification unit that issues notification to the user.

According to a 33rd aspect of the present invention, in the in-car information system of the 32nd aspect, it is preferred that: the software includes an application that can be executed by the information terminal; the information terminal further includes a screen output unit that outputs to the in-car device a menu screen including an icon that corresponds to the application; on the basis of information transmitted from the information transmission unit, the software execution unit puts into the running state the application corresponding to the icon that has been selected upon the menu screen by the user actuating the actuation input unit of the in-car device; and the notification unit issues the notification by displaying the menu screen that has been outputted by the screen output unit.

According to a 34th aspect of the present invention, in the in-car information system of the 33rd aspect, before the application is put into the state of running on the software execution unit, the information terminal stops the output of the menu screen by the screen output unit.

According to a 35th aspect of the present invention, in the in-car information system of the 34th aspect, it is preferred that, when an application that was in the state of running on the software execution unit is put into the stopped state, the information terminal resumes the output of the menu screen by the screen output unit.

According to a 36th aspect of the present invention, in the in-car information system of the 35th aspect, it is preferred that: the information transmission unit transmits a resume command to the information terminal for causing the resumption of output of the menu screen by the screen output unit of the information terminal; and in response to the resume command, the information terminal resumes the operation of the screen output unit.

According to a 37th aspect of the present invention, in the in-car information system of any one of the 33rd through 36th aspects, it is preferred that the information terminal or the in-car device includes: a movement determination unit that makes a determination as to whether or not the vehicle is in motion; and an execution prohibition unit that prohibits execution of the application if it has been determined by the movement determination unit that the vehicle is in motion.

According to a 38th aspect of the present invention, in the in-car information system of the 37th aspect, the in-car device can change over the display mode on the menu screen for the icon corresponding to the application for which execution has been prohibited by the execution prohibition unit, to a different mode from the mode while the vehicle is stopped.

According to a 39th aspect of the present invention, in the in-car information system of any one of the 33rd through 36th aspects, the information terminal or the in-car device may include: a movement determination unit that makes a determination as to whether or not the vehicle is in motion; and a forced ending unit that terminates the application that is being executed by the software execution unit, if it has been determined by the movement determination unit that the vehicle is in motion.

According to a 40th aspect of the present invention, in the in-car information system of any one of the 33rd through 39th aspects, it is preferred that the screen output unit takes at least one application or more among the plurality of applications that are stored in advance in the portable terminal as applications to be excluded as subjects, and outputs the menu screen to the in-car device while omitting icons corresponding to those applications that are to be excluded as subjects.

According to a 41st aspect of the present invention, in the in-car information system of any one of the 33rd through 40th aspects, it is preferred that: a plurality of the applications are stored in advance in the portable terminal; and if there is processing that is utilized in common by the plurality of applications, the software execution unit shares the result of the processing that is utilized in common between the plurality of applications.

According to a 42nd aspect of the present invention, in the in-car information system of any one of the 33rd through 41st aspects, the in-car device is any one of a first in-car device that comprises a video signal input unit for inputting a video signal from the exterior, and a second in-car device that does not comprise the video signal input unit; and the information terminal may further include a first decision unit that decides whether the in-car device is the first in-car device or the second in-car device. In this in-car information system, it is preferred that: if it has been decided by the first decision unit that the in-car device is the first in-car device, the screen output unit converts the menu screen to the video signal and outputs it to the video signal input unit; and if it has been decided by the first decision unit that the in-car device is the second in-car device, the screen output unit outputs information specifying the contents of the menu screen to the in-car device.

According to a 43rd aspect of the present invention, in the in-car information system of any one of the 33rd through 42nd aspects, the portable terminal may further include a second decision unit that decides whether or not the application that has been put into the state of running on the software execution unit has a screen display function. In this in-car information system, it is preferred that: if it has been decided by the second decision unit that the application has a screen display function, the screen output unit converts a screen corresponding to the application to a video signal that it outputs to the in-car device; and if it has been decided by the second decision unit that the application does not have a screen display function, the screen output unit outputs image information corresponding to the application to the in-car device.

An in-car device according to a 44th aspect of the present invention is capable to be connected to a portable type information terminal that is capable of executing an application, and includes: an actuation input unit for inputting actuation by the user; a notification unit that issues notification to the user by displaying upon a display monitor a menu screen including an icon corresponding to the application, transmitted from the information terminal; and an information transmission unit that transmits to the information terminal information corresponding to the actuation by the user upon the actuation input unit.

According to a 45th aspect of the present invention, in the in-car device of the 44th aspect, it is preferred that the information transmission unit transmits a resume command to the information terminal, for causing the resumption of the transmission of the menu screen by the information terminal.

A portable type information terminal according to a 46th aspect of the present invention is capable to be connected to an in-car device, and includes: a software execution unit for executing software that is stored in advance; and a screen output unit that outputs to the in-car device a screen for display upon the in-car device. In this information terminal, the software includes an application that can be executed upon the information terminal; the screen output unit outputs to the in-car device a menu screen including an icon corresponding to the application; and on the basis of information transmitted from the in-car device, the software execution unit puts the application corresponding to the icon that is selected by the user upon the menu screen on the in-car device into the running state.

According to a 47th aspect of the present invention, in the information terminal of the 46th aspect, it is preferred that: the output of the menu screen by the screen output unit is stopped before the application is put into the state of running on the software execution unit; and when the application that has been put into the state of running on the software execution unit is put into the stopped state, the output of the menu screen by the screen output unit is resumed.

Advantageous Effect of the Invention

According to the present invention, it is possible to establish correspondence between the details of actuation of the in-car device and the details of operation upon the information terminal in a simple and easy manner. Moreover, by actuating the in-car device, it is possible to select any desired function from among the functions of various types that are provided to the information terminal, and to cause that function to be executed.

BRIEF DESCRIPTION OF THE DRAWINGS

FIG. 4 is a figure showing an example of operating key information;

FIG. 5 is a figure showing an example of operation assignment information;

FIG. 6 is a figure showing an example of operating key correspondence information;

FIG. 7 is a figure for explanation of assignment processing;

FIG. 8 is a figure for explanation of assignment processing;

FIG. 9 is a figure for explanation of assignment processing;

FIG. 10 is a figure for explanation of assignment processing;

FIG. 20 is a figure showing examples of screens that are displayed while the vehicle is stopped and while it is in motion;

FIG. 30 is a figure showing an example of a table that is referred to when determining screen display elements; and FIG. 31 is a figure showing the flow of information between an in-car device and a portable terminal according to a sixth embodiment.

DESCRIPTION OF EMBODIMENTS

Embodiment #1

Figure 1:
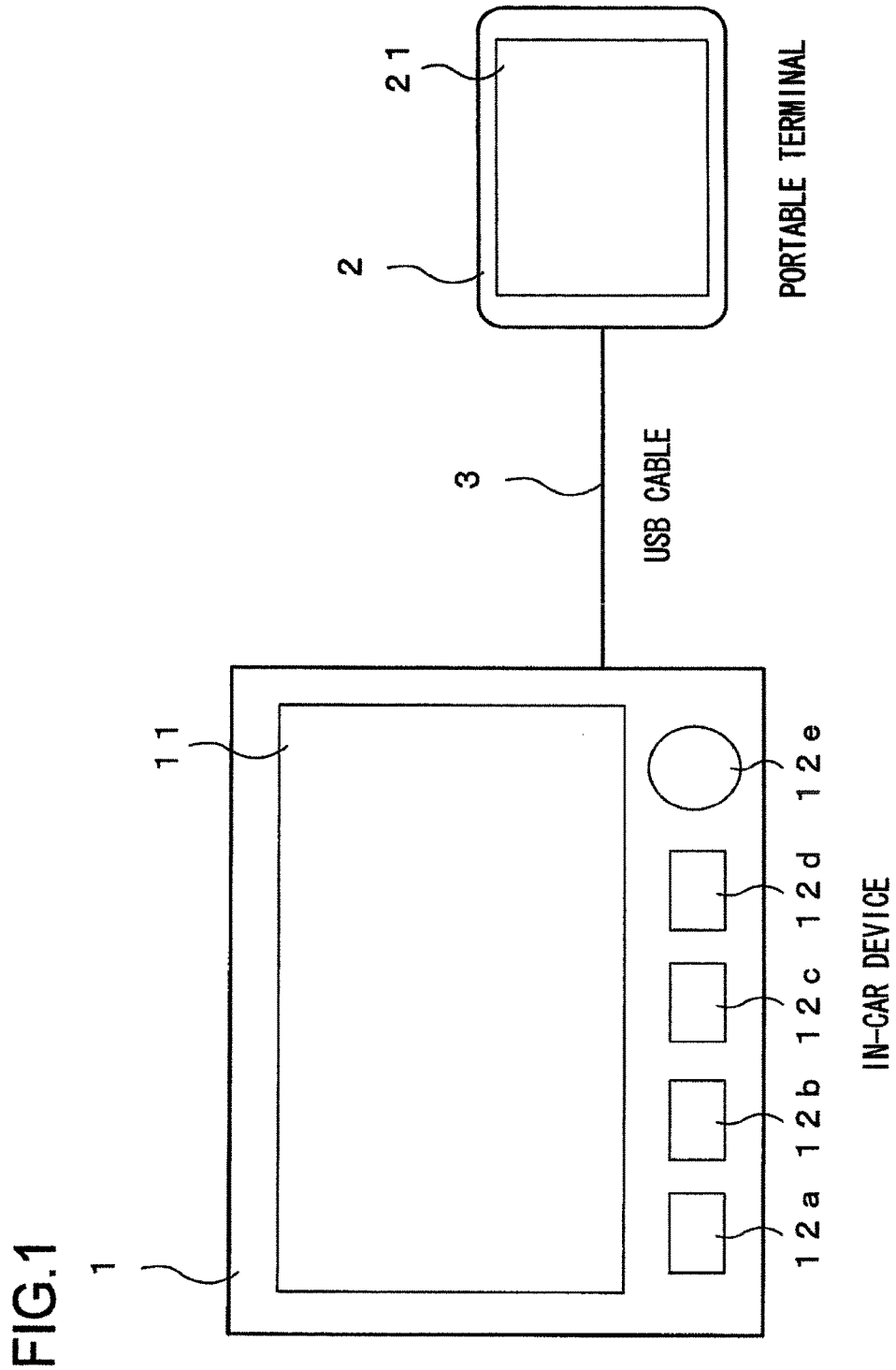
FIG. 1 is a figure showing the structure of an in-car information system according to an embodiment of the present invention.

FIG. 1 is a figure showing the structure of an in-car information system according to an embodiment of the present invention. The in-car information system shown in FIG. 1 is one that is used while being mounted to a vehicle, and is implemented by connecting an in-car device 1 and a portable terminal 2 together via a USB (Universal Serial Bus) cable 3. The in-car device 1 is fixed within the vehicle, and may, for example, be installed in an instrument panel or the like of the vehicle. And the portable terminal 2 is a portable type information terminal that can be carried by the user, and may, for example, be a portable telephone or a smart phone or the like.

A display unit 11 and operating keys (operating switches) 12a, 12b, 12c, 12d, and 12e are provided to the in-car device 1. The display unit 11 is a display monitor that is capable of displaying images of various types, and may, for example, be a liquid crystal display. The operating keys 12a through 12e are operating switches for detecting various types of input actuation by the user, and functions of various kinds are assigned to them, according to the processing that is being executed by the in-car device 1. The user is able to cause the in-car device 1 to execute a desired function or operation by actuating a desired one among these operating keys 12a through 12e. It should be understood that while, in FIG. 1, an example is shown in which the operating keys 12a through 12d are button type switches that can be pressed and the operating key 12e is a dial type switch that can be rotated to the left and the right, the arrangement of the operating keys, their construction, the number thereof, and so on are not limited to this example. Moreover, it would also be acceptable to arrange to build the display unit 11 as a touch panel type display monitor, and to omit some or all of the operating keys.

A display unit 21 is provided to the portable terminal 2. This display unit 21 is a display monitor of a touch panel type that is capable of displaying images of various types, and may, for example, be built by combining a touch sensor that detects the position at which it is touched and a liquid crystal display. The user is able to cause the portable terminal 2 to execute a desired function or operation by touching with his finger or the like at an appropriate position upon the display unit 21, according to the contents of an image that is being displayed upon the display unit 21. It should be understood that while, here, an example is explained in which the display unit 21 is a touch panel type display monitor, it would also be acceptable to arrange for the display unit 21 to be a conventional display monitor that is not of the touch panel type. In this case, it would be desirable to provide operating switches of various types to the portable terminal 2, corresponding to the details of processing to be executed by the portable terminal 2. Or, it would also be acceptable to build the display unit 21 as a touch panel type display monitor, while also providing operating switches corresponding to predetermined types of actuation to the portable terminal 2.

Figure 2:
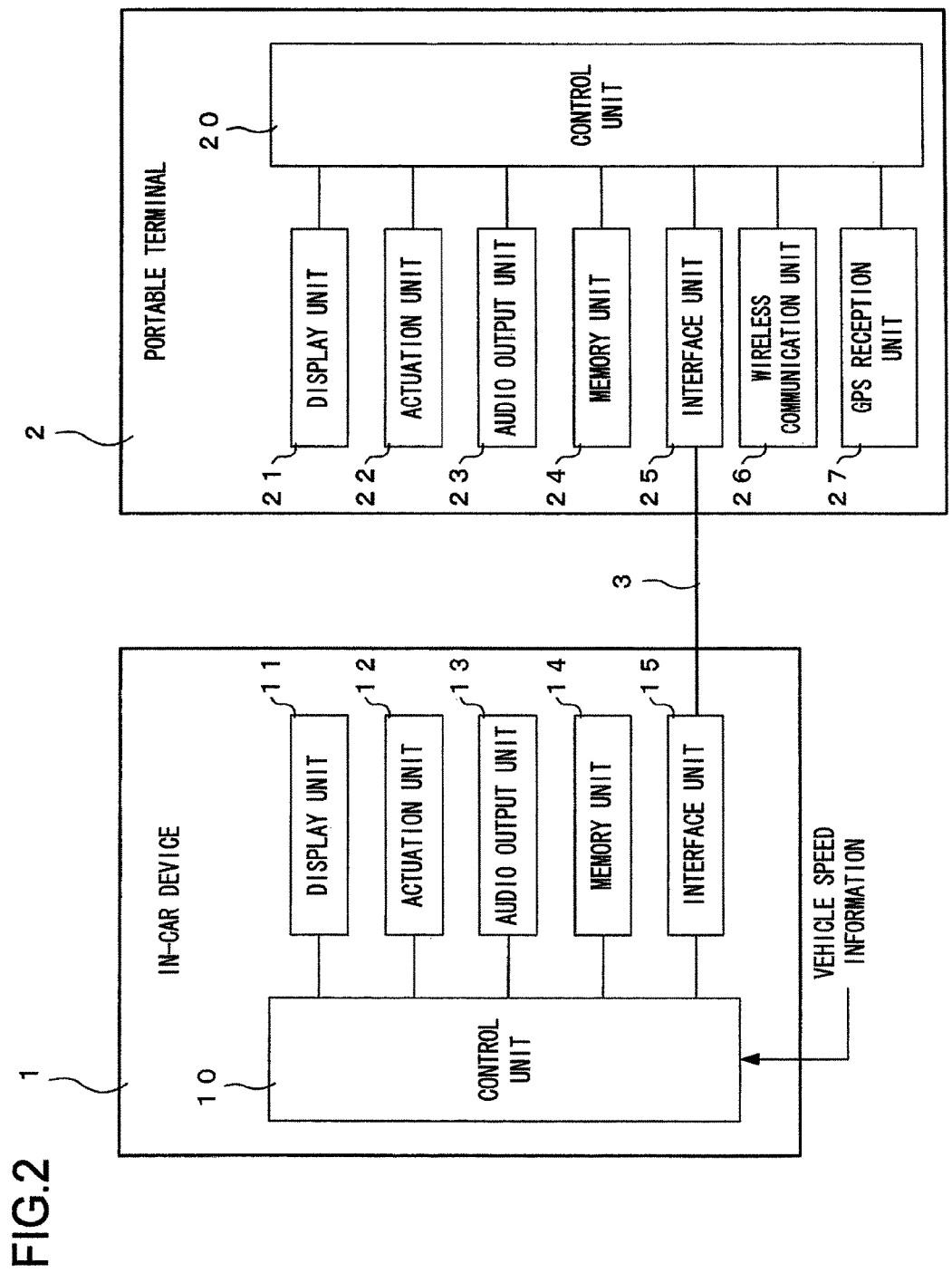
FIG. 2 is a block diagram showing the structures of an in-car device and of a portable terminal.

FIG. 2 is a block diagram showing the structures of the in-car device 1 and of the portable terminal 2. As shown in FIG. 2, the in-car device 1 includes a control unit 10, a display unit 11, an actuation unit 12, an audio output unit 13, a memory unit 14, and an interface unit 15. On the other hand, the portable terminal 2 includes a control unit 20, a display unit 21, an actuation unit 22, an audio output unit 23, a memory unit 24, an interface unit 25, a wireless communication unit 26, and a GPS (Global Positioning System) reception unit 27.

In the in-car device 1, the control unit 10 includes a microprocessor, peripheral circuitry of various types, RAM, ROM, and so on, and executes processing of various types on the basis of a control program recorded in the memory unit 14. Image display processing and audio output processing of various types and so on are executed by the processing performed by this control unit 10.

Furthermore, the control unit 10 acquires vehicle speed information outputted from the vehicle, and determines whether or not the vehicle is currently in motion on the basis of this vehicle speed information. When the result of this determination is that the vehicle is currently in motion, then actuation limitation is imposed, in which operating keys corresponding to types of actuation that are to be prohibited while the vehicle is in motion are disabled. This actuation limitation during vehicle movement will be explained in detail hereinafter. It should be understood that the output of vehicle speed information from the vehicle to the control unit 10 is performed by outputting vehicle speed pulses from a vehicle speed sensor that is mounted to the vehicle via, for example, a CAN (Controller Area Network) that is a communication network provided within the vehicle, not shown in the figures.

As previously described with reference to FIG. 1, the display unit 11 is a display monitor that includes a liquid crystal display or the like. The actuation unit 12 is implemented by switches for detecting input actuation by the user, and, for example, may consist of the operating keys 12a through 12e shown in FIG. 1. It should be understood that it would be also acceptable to provide the display unit 11 and the actuation unit 12 as an integrated structure, by making the display unit 11 as a display monitor of a touch panel type, as previously described. The details of input actuation performed by the user upon the actuation unit 12 are outputted to the control unit 10, and are reflected in the processing that the control unit 10 performs.

The audio output unit 13 includes an amplifier, a speaker, and so on, and is capable of outputting audio of various types according to control by the control unit 10. For example, music that is reproduced from music data read out from the portable terminal 2 or from a recording medium not shown in the figures or a guidance voice for guiding the vehicle to a destination may be outputted from the audio output unit 13.

The memory unit 14 is a non-volatile data storage device, and may, for example, be implemented as an HDD (hard disk drive) or a flash memory or the like. Data of various types, for example, the control program described above used by the control unit 10 is stored in the memory unit 14. Reading out of data from the memory unit 14, and writing of data thereto, are performed under control of the control unit 10, according to requirements.

Under the control of the control unit 10, the interface unit 15 performs interface processing that is required when performing transmission and reception of information to and from the portable terminal 2 via the USB cable 3. For example, the interface unit 15 converts information outputted from the control unit 10 to a predetermined signal format and transmits it to the portable terminal 2, and receives information outputted in a predetermined signal format from the portable terminal 2 and outputs it to the control unit 10. This interface processing is performed by the interface unit 15 according to a communication standard prescribed for USB.

On the other hand, like the control unit 10 of the in-car device 1, the control unit 20 in the portable terminal 2 includes a microprocessor, peripheral circuitry of various types, RAM, ROM, and so on, and executes processing of various types on the basis of a control program recorded in the memory unit 24.

As previously described, the display unit 21 is a display monitor of a touch panel type. The actuation unit 22 is a section for detecting input actuation by the user. It should be understood that while, in FIG. 2, the display unit 21 and the actuation unit 22 are shown as separate structures, actually they may be provided as a unified structure, in which the actuation unit 22 is integrated with the display unit 21 that is of a touch panel type. Or if, as previously described, operating switches are provided to the portable terminal 2, then these operating switches will correspond to the actuation unit 22. The details of input actuation performed by the user upon the actuation unit 22 are outputted to the control unit 20, and are reflected in the processing that the control unit 20 performs.

The audio output unit 23 includes an amplifier and a speaker and so on, and is able to output audio of various types according to control by the control unit 20. For example, when a telephone conversation is being conducted using the portable terminal 2, then the speech of the opposite party in that telephone conversation is outputted from the audio output unit 23.

The memory unit 24 is a non-volatile data storage device that is similar to the memory unit 14 of the in-car device 1, and data of various sorts for use during the processing by the control unit 20 is stored therein. And application programs of various types that have been obtained by the user in advance (hereinafter simply termed "applications") are stored in this memory unit 24. The user is able to implement functions of various kinds upon the portable terminal 2 by selecting one or another from among the various applications stored in the memory unit 24, and by causing the control unit 20 to execute that application.

The interface unit 25 performs interface processing based upon a communication standard prescribed for USB, in a similar manner to the interface unit 15 of the in-car device 1. In other words, communication between the in-car device 1 and the portable terminal 2 is performed in the state in which the interface unit 15 and the interface unit 25 are mutually connected together via the USB cable 3.

The wireless communication unit 26 performs wireless communication via a wireless communication circuit network not shown in the figures, in order to connect the portable terminal 2 to some other portable terminal or server. By the wireless communication unit 26 thus performing wireless communication, the portable terminal 2 is able to conduct a telephone conversation with another portable terminal, or to download a desired application from a server. It should be understood that a portable telephone circuit network or an internet circuit network via a wireless LAN may be used as the wireless communication circuit network for the wireless communication performed by the wireless communication unit 26, for example.

And the GPS reception unit 27 receives GPS signals transmitted from the GPS satellites, and outputs them to the control unit 20. As information for obtaining the current position of the portable terminal 2 and the present time instant, information is included in the GPS signals related to the positions of the GPS satellites that transmitted those GPS signals and the time instants of transmission thereof. Accordingly, by receiving GPS signals from a predetermined number of the GPS satellites or more, it is possible for the control unit 20 to calculate its current position and the present time instant on the basis of these GPS satellites' information.

Next, navigation processing that is performed by this in-car information system will be explained. By an application for navigation being executed on the portable terminal 2 during the state in which the in-car device 1 and the portable terminal 2 are connected together, this in-car information system is able to perform navigation processing in order to guide the vehicle to a destination. In this navigation processing, a map image is created by the portable terminal 2 by drawing a map of the surroundings of the current position, and this map image is transmitted from the portable terminal 2 to the in-car device 1. Due to this, it becomes possible to display this map of the surroundings of the current position upon the display unit 11 of the in-car device 1. Furthermore, a recommended path from the departure point to the destination is found in advance on the portable terminal 2, and, when the vehicle gets near to a guidance point upon the recommended path, information is transmitted from the portable terminal 2 to the in-car device 1 for outputting a guidance voice that corresponds to the direction of progression of the vehicle at this guidance point. Due to this, the guidance voice is outputted from the audio output unit 13 of the in-car device 1. It should be understood that it would also be acceptable to arrange for predetermined signals to be outputted from the portable terminal 2 to the in-car device 1 at this time, corresponding to the timings of the start and of the end of output of the guidance voice. If this is done then, even if audio is currently being outputted on the in-car device 1 based upon a radio broadcast or a CD that is being played or the like, it is possible to reduce the volume of this audio during output of the guidance voice, so as to make it easier for the user to hear the guidance voice. By displaying map images upon the display unit 11 and by outputting guidance sounds from the audio output unit 13 as explained above, the in-car device 1 is able to issue notifications to the user, in order to make it possible for him to drive the vehicle to the destination without going astray.

It should be understood that it would be possible to arrange for data of various types, such as map data and so on that is required in order for the portable terminal 2 to execute an application for navigation, to be stored in advance in the memory unit 24 of the portable terminal 2 for use. Or, it would also be possible to arrange to store only the minimum necessary amount of data in the memory unit 24, and to connect to a predetermined server using the wireless communication unit 26 when the portable terminal 2 is to execute an application for navigation, thus acquiring the data each time that it is required.

In order to make it possible to actuate the portable terminal 2 by using the actuation unit 12 from the in-car device 1 while performing the navigation processing described above, a correspondence is established on the portable terminal 2 between types of actuation that the user can input with the actuation unit 12 of the in-car device 1, and operations by the portable terminal 2. In the following, a case will be explained by way of example in which the user performs input actuation using the operating keys 12a through 12e of FIG. 1 that are installed to the in-car device 1. It should be understood that the present invention is not to be considered as being limited to input actuation performed using operating keys that are installed to the in-car device 1, such as the operating keys 12a through 12e. For example, it would also be possible to employ various other types of input actuation, such as touch panel actuation or remote control actuation or the like.

When the user is performing input actuation using the operating keys 12a through 12e, these operating keys respectively correspond to various operations of the portable terminal 2. By establishing a correspondence between the operating keys of this in-car device 1 and operations of the portable terminal 2, the control unit 20 of the portable terminal 2 becomes able to convert the actuation signals (i.e. the key signals) that are outputted from the in-car device 1 for each of the operating keys 12a through 12e, to operating commands for the portable terminal 2. As a result, the details of the actuation that the user has performed upon the in-car device 1 are recognized by the portable terminal 2, and an operation corresponding to these actuation details is performed by the portable terminal 2. It would also be acceptable to arrange to implement such a correspondence between the operating keys of the in-car device 1 and operations of the portable terminal 2, for each of the applications held by the portable terminal 2.

Figure 3:
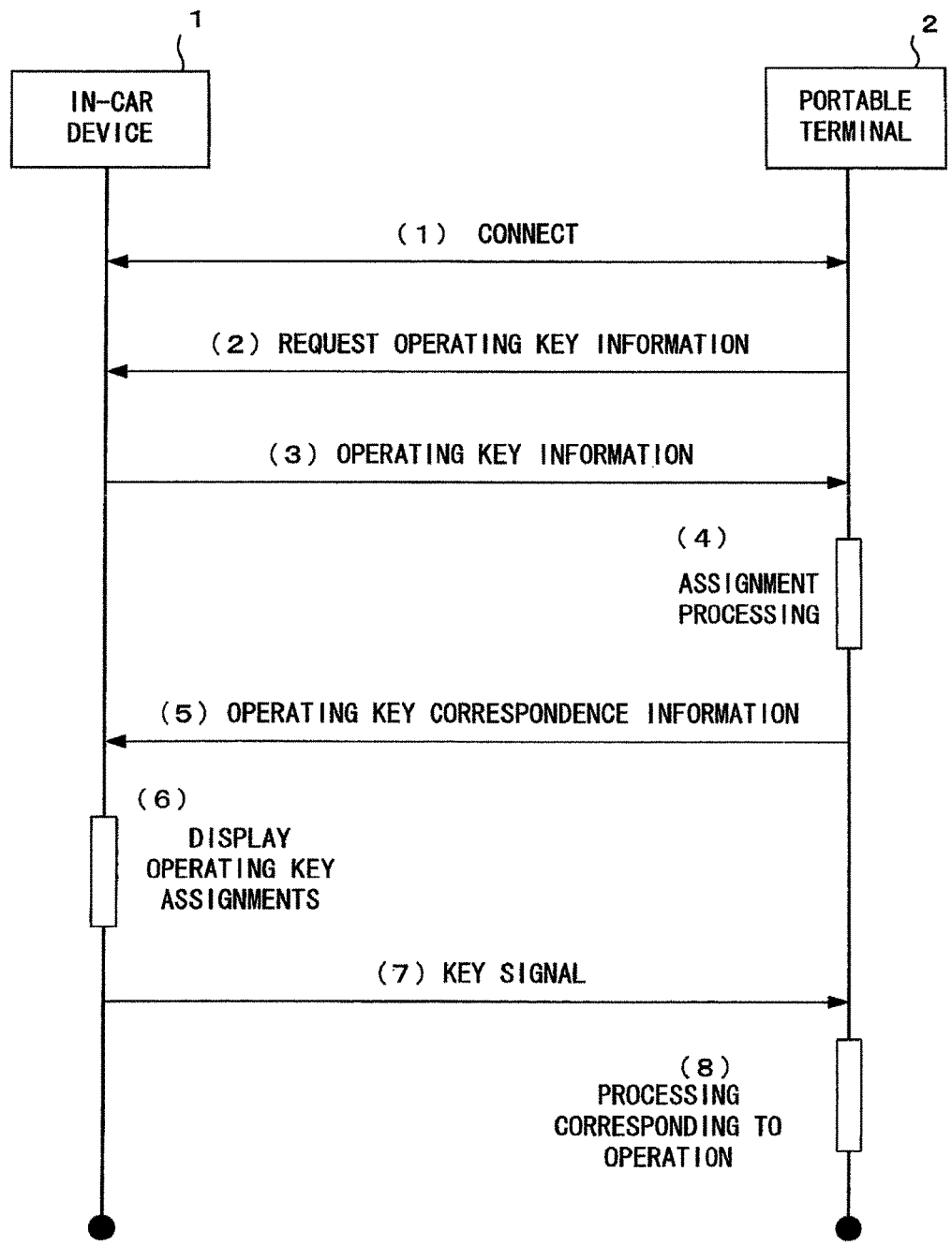
FIG. 3 is a figure showing the flow of information between the in-car device and the portable terminal, according to a first embodiment.

FIG. 3 is a figure showing the flow of information between the in-car device 1 and the portable terminal 2, when correspondence is being established between the operating keys of the in-car device 1 and operations of the portable terminal 2 as explained above.

When the in-car device 1 and the portable terminal 2 are mutually connected together as shown at (1) in FIG. 3, the portable terminal 2 issues a request for actuation information (i.e. for operating key information) to the in-car device 1, as shown at (2). And, upon receipt of this request for operating key information, the in-car device 1 transmits operating key information related to the operating keys that are to be used for actuation of the portable terminal 2 to the portable terminal 2, as shown at (3).

As one example of such operating key information, FIG. 4 shows the operating key information for specifying the operating keys 12a through 12e shown in FIG. 1. In FIG. 4, the items shown in the fields in the column "operating key" respectively refer to the operating keys 12a through 12e, and, for the operating key 12e that can be actuated in a plurality of ways, an item is provided for each of its modes of actuation. In other words, "A", "B", "C", and "D" respectively refer to the operating keys 12a through 12d, while "E right" and "E left" refer to the operating key 12e. Moreover, the items shown in the fields in the column "classification" refer to the classifications of the respective operating keys 12a through 12e. In other words, "preset" means that this is an operating key of the button type, while "dial" means that it is of the dial type. From the operating key information of FIG. 4, it will be understood that pressing actuation is possible for each of the operating keys 12a through 12d that are of the button type, while rotational actuation in either the right direction or the left direction is possible for the operating key 12e that is of the dial type.

When operating key information like that described above is received from the in-car device 1, the portable terminal 2 performs assignment processing as shown at (4) of FIG. 3. In this assignment processing, the portable terminal 2 performs assignment processing for assigning operations of the portable terminal 2 to respective types of actuation of the various operating keys of the in-car device 1, on the basis of the operating key information that has been received from the in-car device 1 and operation assignment information that is stored in the memory unit 24 in advance.

FIG. 5 shows an example of operation assignment information. In FIG. 5, the items shown in the fields in the column "operation" refer to the operations that are the subjects of assignment to the operating keys, in other words denote the operations of the portable terminal 2 that can be actuated from the in-car device 1 during navigation processing. And the items shown in the fields in the column "recommended classification" denote the classifications of the operating keys that are recommended for those operations. In other words, "dial" denotes a dial type operating key, while "preset" denotes a button type operating key. Moreover, "cursor up", "cursor down", "cursor right", and "cursor left" respectively denote actuation directions for a cursor type operating key. The items shown in the fields in the column "priority level" denote the priority levels assigned to the various operations. Assignment of an operation having a smaller numerical value of this priority level to its operating key of the in-car device 1 is performed preferentially.

And the items shown in the fields in the column "display" refer to the display format for icons for denoting these operations. It should be understood that concrete examples of these icons will be shown in FIGS. 11 and 12 and explained hereinafter. The items shown in the fields in the column "possible/impossible while moving" refer to whether or not each of the operations is possible or is impossible while the vehicle is in motion. In other words, the operations described as "possible" are permitted while the vehicle is in motion, while the operations described as "impossible" are forbidden while the vehicle is in motion. Either "possible" or "impossible" is set for each of the operations, and this is determined in consideration of safety while driving and ease of use and so on. It should be understood that, if neither "possible" nor "impossible" is set, then "–" is specified.

Among the items of operation assignment information explained above, the items in the columns "actuation", "recommended classification", and "priority level" are employed in order to assign operations of the portable terminal 2 to respective operating keys of the in-car device 1 during assignment processing. On the other hand, the items in the columns "display" and "possible/impossible while moving" are not employed for this type of assignment of operations to operating keys, but rather are employed in order to display the operating key assignments and in order to impose actuation limitations upon the in-car device 1 while the vehicle is in motion, as will be explained hereinafter. In other words it would be acceptable, if either one or both of these controls is not to be performed by the in-car device 1, to omit either one or both of these columns "display" and "possible/impossible while moving" from the operation assignment information.

Operations of the portable terminal 2 are assigned to respective operating keys of the in-car device 1 by the portable terminal 2 performing assignment processing on the basis of the operating key information such as that shown by way of example in FIG. 4, and on the basis of the operation assignment information like that shown by way of example in FIG. 5. Concrete examples of this assignment processing will be explained below with reference to FIGS. 7 through 10.

In the assignment processing, first the portable terminal 2 prepares an assignment table having empty fields, as shown in FIG. 7. In the example of FIG. 7, an assignment table is shown in which nine fields are set for each of the columns "operating key", "operation", "classification", "display" and "possible/impossible while moving", as shown in the rows denoted by the reference symbols 61 through 69. It should be understood that it is desirable for the number of rows in the assignment table that is prepared here to be made to be equal to or greater than the number of rows of the operation assignment information shown in FIG. 5, in other words to be equal to or greater than the number of operations on the portable terminal 2 that are subjects of assignment. By doing this, if the number of operating keys installed to the in-car device 1 is greater than or equal to the number of operations that are to be subjects of assignment, then it is possible to assign all of the operations to operating keys.

Next, on the basis of the operating key information of FIG. 4, the portable terminal 2 determines the contents of each of the columns "operating key" and "classification" in the assignment table. Here, these contents are determined by simply setting the items shown in the operating key information in each of the columns "operating key" and "classification" in the assignment table, without modification. As a result, the contents of each of the columns "operating key" and "classification" are determined as shown in FIG. 8. Since, at this time, the number of the operating keys shown in the operating key information of FIG. 4 is less than the number of rows of the assignment table, accordingly, as shown in FIG. 8, "–" is set for each of the items in the rows 67 through 69 that are surplus, meaning that they are excluded from the subjects for setting. It should be understood that if, conversely to the above, the number of the operating keys shown in the operating key information is greater than the number of rows of the assignment table, then the contents of each of the columns "operating key" and "classification" in the assignment table may be determined by deleting the operating key information that is surplus.

Next, the portable terminal 2 selects, from the operation assignment information of FIG. 5, the information that corresponds to the number of rows that are to be the subjects of setting in the assignment table. Here, the information shown in six rows is selected in order from the one whose value set in the column "priority level" in the operation assignment information of FIG. 5 is the smallest, so as to match the number of the rows 61 through 66 in the assignment table of FIG. 8 that are the subjects of setting. As a result, the information in the rows corresponding to the operations "enlarge scale", "reduce scale", "shift up", "shift down", "shift right", and "shift left" is selected. It should be understood that the information in the rows corresponding to the operations "set destination", "find facility", and "change setting" that is not selected here is not subsequently used in the assignment processing.

After having selected a portion of the operation assignment information of FIG. 5 by doing as described above, next, the portable terminal 2 compares together the items that were set for the column "classification" in the assignment table, and the items shown in the column "recommended classification" in the operation assignment information that was selected. If the result is that there are two thereof for both of that the same operating key classification is set, then the contents of the corresponding row in the operation assignment information that was selected are extracted, and these contents are set in the fields of the corresponding row in the assignment table. Here, since "dial" that is set in the column "classification" in the assignment table of FIG. 8 and "dial" that is shown in the column "recommended classification" in the operation assignment information of FIG. 5 are the same, accordingly the contents of the rows corresponding to the types of operation "enlarge scale" and "reduce scale" of FIG. 5 corresponding thereto are extracted, and these contents are set in the fields of the rows 65 and 66 of FIG. 8 respectively. As a result, the contents of the fields of the rows 65 and 66 are determined as shown in FIG. 9. In this way, the portable terminal 2 preferentially assigns, to the operating keys of the in-car device 1, those operations for which the classifications of those operating keys in the operation assignment information are set as recommended classifications.

Thereafter, the portable terminal 2 sets the contents of the rows other than those that were extracted from the operation assignment information that was selected as described above into the remaining fields in the assignment table. As a result, the contents of the rows 61 through 64 are determined as shown in FIG. 10. The assignment processing is performed by the portable terminal 2 by setting all of the fields in the assignment table in this manner.

It should be understood that, in the above explanation, an example is described in which the column "classification" in the assignment table and the column "recommended classification" in the selected operation assignment information are compared together, and, if there is some item for which they agree, then this operation is preferentially assigned by extracting the corresponding portion of the operation assignment information and setting it into the assignment table. However, it would also be acceptable to perform this type of preferential assignment of operations according to recommended classification by dividing it into a plurality of stages. For example, there may be provided two of the columns "recommended classification" in the operation assignment information shown by way of example in FIG. 5, and one of them may be taken as "first recommended classification" while the other is taken as "second recommended classification". And, when comparing together the selected operation assignment information and the assignment table, initially the comparison is performed by using the column "first recommended classification", and if some item is present for which agreement holds with the column "classification" of the assignment table, then its operation is preferentially assigned by extracting this portion and by setting it into the assignment table. Next a similar comparison is performed by using the column "second recommended classification", and if some item is present for which agreement holds with the column "classification" of the assignment table, then its operation is assigned by extracting this portion and by setting it into the assignment table. Thereafter, each of the operations that have not yet been assigned is assigned by setting the remaining items of operation assignment information into each of the portions in the assignment table that remain as empty fields. By doing this, i.e. by setting recommended classifications of a plurality of types in the operation assignment information, it is possible to perform the preferential assignment of operations by dividing the task into a plurality of stages, according to the number of types thereof. It should be understood that, if there are three or more types of recommended classification in the operation assignment information, then it would also be possible to divide the preferential assignment of operations into three or more stages, in a similar manner to that described above.

By executing assignment processing as explained above, the portable terminal 2 is able to assign some among the plurality of operations on the portable terminal 2 to each of at least one or more operating keys among the plurality of operating keys that are installed to the in-car device 1, according to the respective priority level that is given in the operation assignment information. In other words, it is possible to assign some of the operations among the plurality of operations of the portable terminal 2 to each of at least one or more of some among the plurality of types of actuation that can be inputted with the actuation unit 12 provided to the in-car device 1, according to the respective priority level that is given in the operation assignment information.

It should be understood that if, as previously described, the in-car device 1 does not perform either one or both of the display of operating key assignments and actuation limitation during vehicle movement, and due to this either one or both of "display" and "possible/impossible while moving" is omitted from the operation assignment information, then these may also be omitted from the assignment table shown in FIGS. 7 through 10, in a similar manner.

When the assignment processing like that explained above has been completed, the portable terminal 2 creates actuation correspondence information (i.e. operating key correspondence information) on the basis of the result thereof. And, along with this operating key correspondence information being transmitted to the in-car device 1 as shown at (5) in FIG. 3, it is also stored in the memory unit 24 in correspondence with the in-car device 1. This storage of the operating key correspondence information is performed for each of the types of in-car device 1. In other words, if subsequently an in-car device of the same type as the in-car device 1 is connected to the portable terminal 2, then it is arranged for operating key correspondence information not to be created newly by the portable terminal 2, but rather for the operating key correspondence information that has been stored in the memory unit 24 to be used.

FIG. 6 shows an example of the operating key correspondence information. In FIG. 6, as with the operating key information of FIG. 4, items that respectively specify the operating keys 12a through 12e of the in-car device 1 are shown in the fields of the column "operating key". The items shown in the fields of the column "operation" denote the operations that are respectively assigned to the operating keys 12*a* through 12*e*. And the items shown in the fields of the column "display" show the display formats for icons that denote the operations assigned to the operating keys 12*a* through 12*e*, while the items shown in the fields of the column "possible/impossible while moving" show whether or not the operations assigned to the operating keys 12*a* through 12*e* are permitted during vehicle movement. This operating key correspondence information is created on the basis of the assignment table shown in FIG. 10 by deleting, as being unnecessary portions, the rows 67 through 69 and the column "classification" that are not to be subjects of setting.

By transmitting operating key correspondence information such as that explained above to the in-car device 1, the portable terminal 2 notifies the results of assignment by the assignment processing to the in-car device 1. As previously described, it should be understood that if the in-car device 1 is not to perform either one or both of the display of the operating key assignments and actuation limitation while the vehicle is in motion, and due to this either one or both of the columns "display" and "possible/impossible while moving" is omitted from the operation assignment information, then in a similar manner this is also omitted from the operating key correspondence information.

When the operating key correspondence information is received from the portable terminal 2, the in-car device 1 performs display of the operating key assignments, as shown at (6) of FIG. 3. Here, icons that specify the operations assigned to the various operating keys are displayed upon the display unit 11 on the basis of the details given in the column "display" in the operating key correspondence information of FIG. 6.

Figure 11:
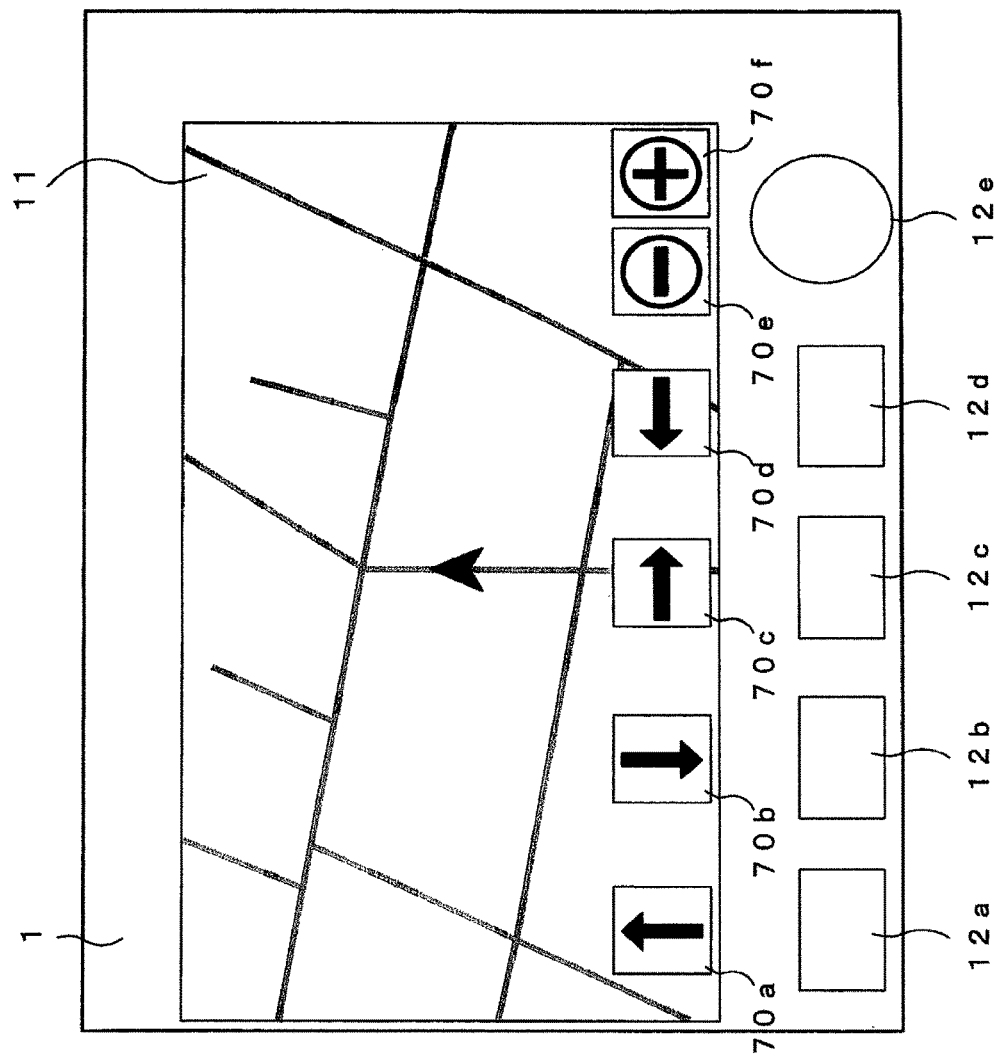
FIG. 11 is a figure showing an example of a screen that is displayed while the vehicle is stopped.
Figure 12:
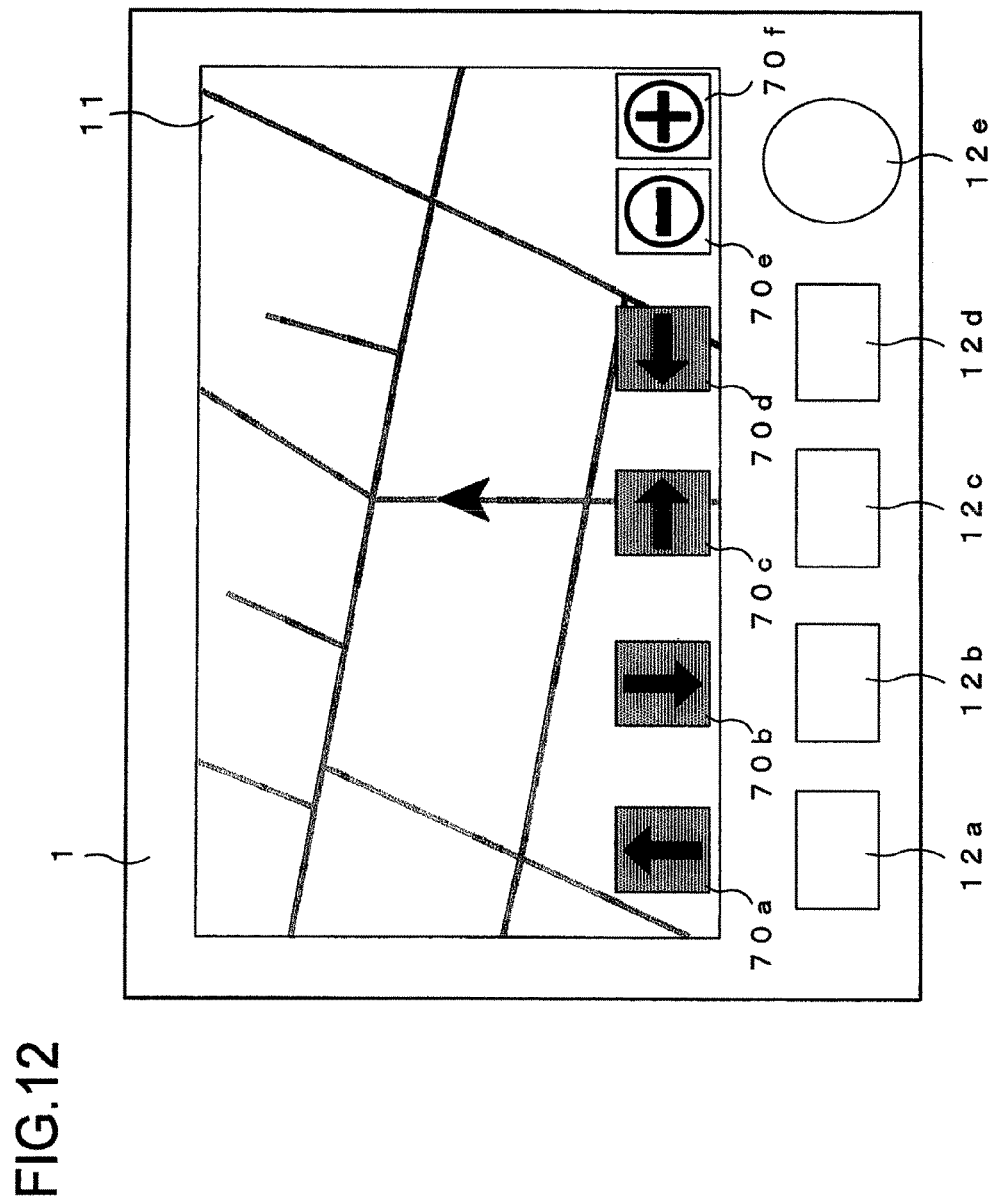
FIG. 12 is a figure showing an example of a screen that is displayed while the vehicle is in motion.

FIGS. 11 and 12 show examples of screens that are displayed upon the display unit 11 of the in-car device 1. FIG. 11 shows an example of a screen that is displayed while the vehicle is stopped, while FIG. 12 shows an example of a screen that is displayed while the vehicle is in motion. In FIG. 11, along with a map that is centered on the current position of the vehicle being displayed upon the display unit 11, icons denoted by reference symbols 70*a* through 70*f* are displayed. The icon 70*a* denotes the operation that is assigned to the operating key 12*a*, in other words the operation of "shift up", while the icon 70*b* denotes the operation that is assigned to the operating key 12*b*, in other words the operation of "shift down". In a similar manner, the icon 70*c* denotes the operation that is assigned to the operating key 12*c*, in other words the operation of "shift right", while the icon 70*d* denotes the operation that is assigned to the operating key 12*d*, in other words the operation of "shift left". Moreover, the icons 70*e* and 70*f* respectively denote the operations that are assigned to rotational actuation of the operating key 12*e* in the leftward direction and to rotational actuation thereof in the rightward direction. In other words, the icon 70*e* denotes the operation of "reduce scale", while the icon 70*f* denotes the operation of "enlarge scale".

It should be understood that the regions in which the icons 70*a* through 70*f* described above are displayed upon the display unit 11 are set in advance for the operating keys 12*a* through 12*e*. In this manner, on the basis of the operating key correspondence information that it has received from the portable terminal 2, the in-car device 1 respectively displays the icons 70*a* through 70*f* that denote the operations assigned to the operating keys 12*a* through 12*e* in the display regions of the display unit 11 that are determined in advance for the operating keys 12*a* through 12*e*.

When the vehicle starts to travel, the in-car device 1 performs actuation limitation in order to make ineffective those operating keys that correspond to operations that are to be prohibited during motion of the vehicle. In concrete terms, only the operating key 12*e* to which are assigned operations for which "possible" is shown in the "possible/impossible while moving" field in the operating key correspondence information of FIG. 6, in other words to which are assigned the operations of "enlarge scale" and "reduce scale", is left as effective, whereas the other operating keys 12*a* through 12*d* to which are assigned operations that are shown as "impossible" are made ineffective. And, by changing the display mode of the icons 70*a* through 70*d* corresponding to the operating keys 12*a* through 12*d* that have been made effective from the mode shown in FIG. 11 for when the vehicle is stopped to that shown in FIG. 12, it is arranged to notify the user that the operations with these operating keys are prohibited during motion of the vehicle. At this time, if there is any operating key to which an operation is assigned for which neither "possible" nor "impossible" during vehicle motion is set, then it is desirable to make this operating key ineffective while the vehicle is in motion as well.

It should be understood that, as previously described, it would also be acceptable to arrange to omit operating key assignment display such as that described above. Moreover, if no actuation limitation when the vehicle is in motion is imposed, then the above described changing of the display mode for the icons in correspondence to motion of the vehicle may be dispensed with.

Thereafter, when any of the operating keys on the in-car device 1 is actuated by the user, as shown at (7) of FIG. 3, the in-car device 1 transmits to the portable terminal 2 an actuation signal (i.e. a key signal) corresponding to this operating key. Upon receipt of this key signal from the in-car device 1, as shown at (8), the portable terminal 2 executes processing corresponding to the operation that corresponds to this key signal. At this time, the portable terminal 2 converts the key signal from the in-car device 1 to an operating command on the basis of the result of the assignment processing that was performed at (4), and executes processing corresponding to the operation specified by this operating command. In other words the portable terminal 2 specifies, on the basis of the key signal, the operating key that has been actuated by the user, and determines the operation that has been assigned to that operating key by referring to the operating key correspondence information as shown in FIG. 6. And the portable terminal 2 performs conversion from the key signal to the operating command on the basis of the result of this decision. By this process being repeated each time a key signal is outputted from the in-car device 1, operations corresponding to the actuations performed by the user on the in-car device 1 are performed by the portable terminal 2.

Figure 13:
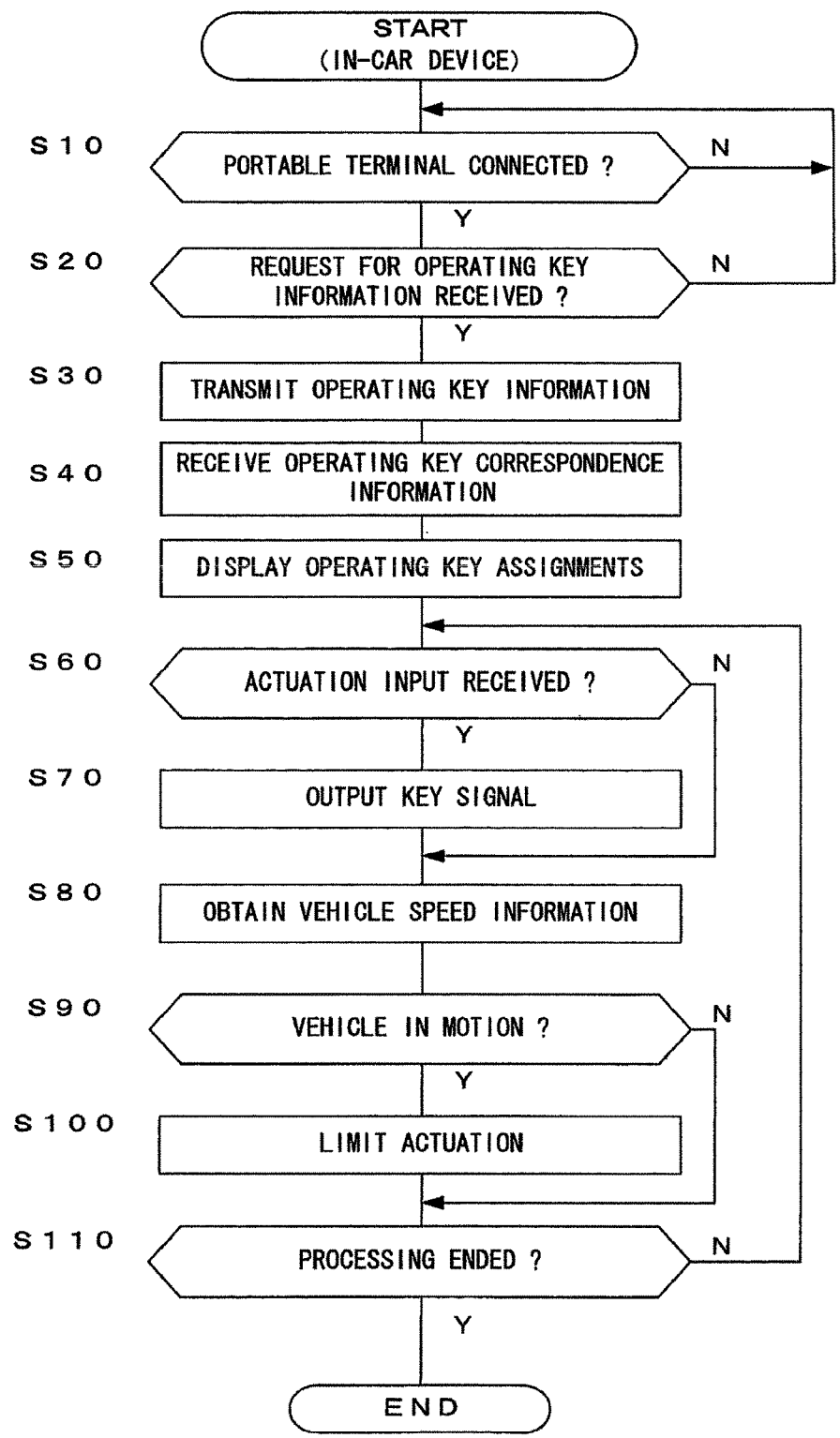
FIG. 13 is a flow chart of processing performed by the in-car device according to the first embodiment.
Figure 14:
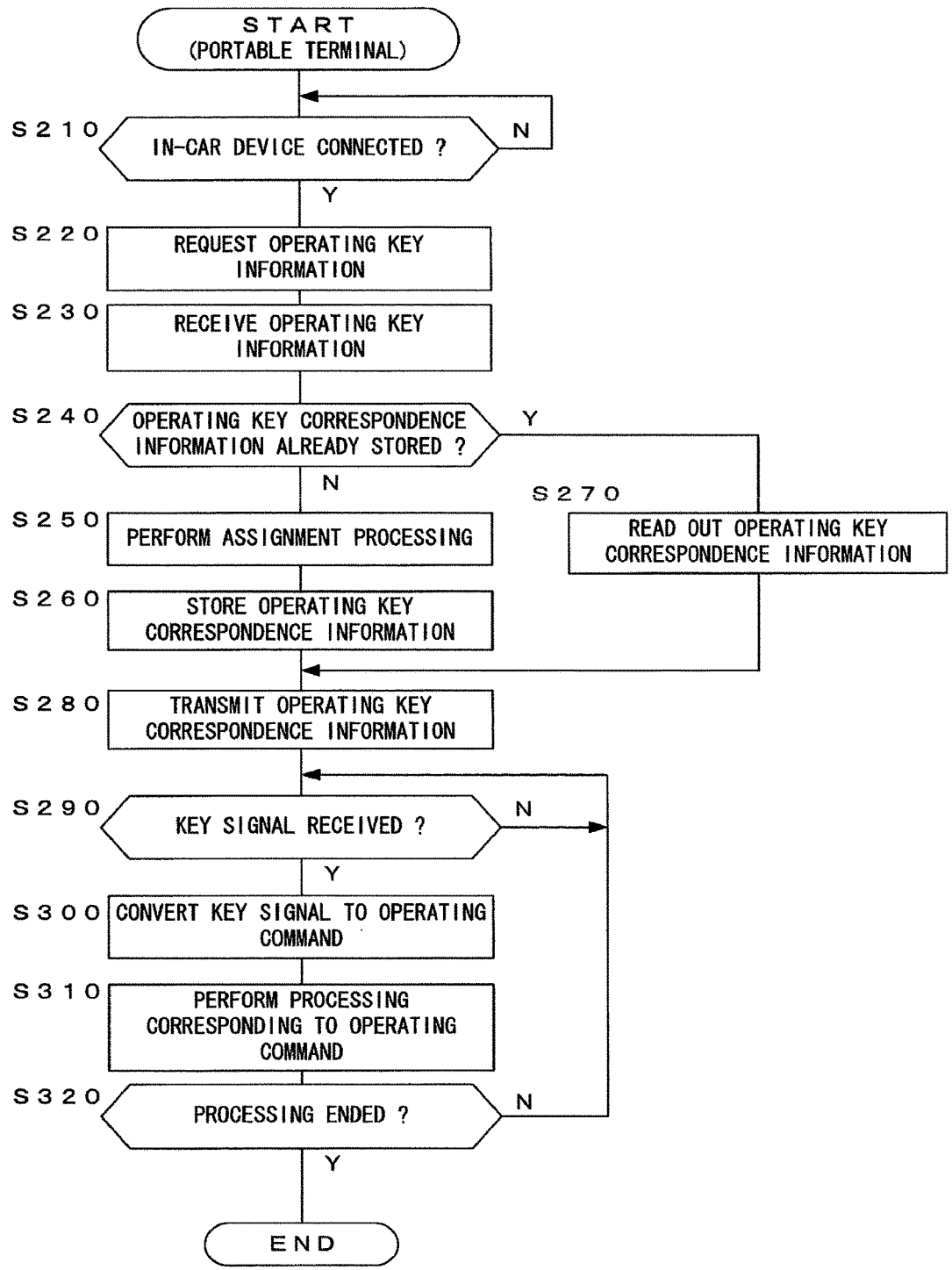
FIG. 14 is a flow chart of processing performed by the portable terminal according to the first embodiment.

Flow charts for processing such as that described above by the in-car device 1 and the portable terminal 2 are shown in FIGS. 13 and 14. FIG. 13 shows a flow chart for processing by the in-car device 1, while FIG. 14 shows a flow chart for processing by the portable terminal 2.

First, the flow chart of FIG. 13 will be explained. The processing shown in the flow chart of FIG. 13 is executed by the control unit 10 of the in-car device 1.

In a step S10, the control unit 10 makes a decision as to whether or not a portable terminal 2 is connected. If the in-car device 1 and a portable terminal 2 are connected together via a USB cable 3 as shown in FIG. 1, then the flow of control proceeds to the next step S20.

In this step S20, the control unit 10 makes a decision as to whether or not a request for operating key information has been received from the portable terminal 2 that was determined in the step S10 as being connected. If a request has been received from the portable terminal 2 for operating key information, then the flow of control proceeds to a step S30, whereas if no such request has been received then the flow of control returns to the step S10.

In the step S30, the control unit 10 transmits the operating key information to the portable terminal 2, as shown in FIG. 4. This transmission of the operating key information is performed via the interface unit 15 and the USB cable 3.

Then, in a step S40, the control unit 10 receives operating key correspondence information transmitted from the portable terminal 2, corresponding to the operating key information that was transmitted in the step S30. Here, by a step S280 of FIG. 14 that will be explained hereinafter being executed by the portable terminal 2, operating key correspondence information like that shown in FIG. 6 is transmitted from the portable terminal 2 via the USB cable 3, and is received using the interface unit 15.

Then in a step S50, on the basis of the operating key correspondence information that was received in the step S40, the control unit 10 performs operating key assignment display for displaying the operations that have been assigned to the operating keys. Here, the operating key assignment display is executed by displaying the icons 70*a* through 70*f* as shown in FIG. 11 upon the display unit 11 in respectively predetermined display regions.

Then, in a step S60, the control unit 10 makes a decision as to whether or not actuation input with any of the operating keys has been received from the user. If actuation input from the user has been performed upon any of the operating keys 12*a* through 12*e*, then the flow of control proceeds to a step S70, whereas if no actuation input has been received then the flow of control is transferred to a step S80.

In the step S70, the control unit 10 outputs a key signal corresponding to the operating key that has been actuated by the user to the portable terminal 2. It should be understood that, if the dial type operating key 12*e* has been actuated, then mutually different key signals are outputted for the case of rotational actuation in the rightward direction and for the case of rotational actuation in the leftward direction. When this step S70 has been executed, the flow of control proceeds to a step S80.

In the step S80, the control unit 10 obtains the vehicle speed information outputted from the vehicle, as described above.

And next in a step S90, on the basis of the vehicle speed information obtained in the step S80, the control unit 10 makes a decision as to whether or not the vehicle is currently in motion. If it is decided that the vehicle is in motion, then the flow of control proceeds to a step S100, whereas if it is decided that the vehicle is stopped, then the flow of control is transferred to a step S110.

In the step S100, the control unit 10 imposes actuation limitation as previously described, in order to make ineffective those operating keys that correspond to actions that are to be prohibited during vehicle motion. At this time, the control unit 10 determines the operations that are to be prohibited during vehicle motion on the basis of the operating key correspondence information that was received in the step S40, and makes actuation of the operating keys 12*a* through 12*d* to which these operations are assigned ineffective. Furthermore, as explained with FIGS. 11 and 12, the control unit 10 changes over the display mode for the icons 70*a* through 70*d* that denote these operations to a different display mode. After actuation limitation has been performed in this manner, the flow of control proceeds to a step S110.

In the step S110, the control unit 10 makes a decision as to whether or not processing has ended. If the connection of the in-car device 1 and the portable terminal 2 has been interrupted, or if execution of the application for navigation on the portable terminal 2 has ceased or the like, then it is determined that the processing has ended, and the flow chart of FIG. 13 terminates. On the other hand, if such a state has not occurred, then it is decided that the processing has not ended, and the flow of control returns to the step S60 and the processing described above is repeated.

Next, the flow chart of FIG. 14 will be explained. The processing shown in the flow chart of FIG. 14 is executed by the control unit 20 when an application for navigation is executed by the portable terminal 2.

In a step S210, the control unit 20 makes a decision as to whether or not the in-car device 1 is connected. If the in-car device 1 and the portable terminal 2 are connected together via a USB cable 3 as shown in FIG. 1, then next the flow of control proceeds to a step S220.

In the step S210, the control unit 20 requests operating key information from the in-car device 1 that was decided in the step S10 to be connected. Here the request for operating key information may, for example, be issued by transmitting predetermined data to the in-car device 1 using the interface unit 25.

In the step S230, the control unit 20 receives operating key information transmitted from the in-car device 1 in response to the request of the step S220. Here, by the step S30 of FIG. 13 being executed by the in-car device 1 as previously described, operating key information like that shown in FIG. 4 is transmitted from the in-car device 1 via the USB cable 3, and is received using the interface unit 25.

In the step S240, on the basis of the operating key information that has been received in the step S230, the control unit 20 makes a decision as to whether or not operating key correspondence information for the in-car device 1 is stored in the memory unit 24. Here, operating key correspondence information having any in-car device as subject that has once been created by the portable terminal 2 is stored in the memory unit 24 in correspondence with that in-car device by a step S260 that will be explained hereinafter. Accordingly, if operating key correspondence information for an in-car device of the same type as this in-car device 1 has already been created in the past, then this operating key correspondence information will already be stored in the memory unit 24. In this type of case, the flow of control is transferred from this step S240 to a step S270. On the other hand, if no such operating key correspondence information corresponding to the in-car device 1 is stored in the memory unit 24, so that this is the first time for creation of this operating key correspondence information, then the flow of control proceeds from this step S240 to a step S250.

It should be understood that the decision in the step S240 may, for example, be performed by comparing together the operation key information that was received in the step S230 and the operating key correspondence information that is stored in the memory unit 24, and by deciding whether or not the contents of the columns "operating key" in these sets of information agree with one another. If the result is that, among the operating key correspondence information stored in the memory unit 24, some information is included for which the content of the column "operating key" agrees with that in the operating key information, then the flow of control is transferred to the step S270, whereas if it does not then the flow of control proceeds to the step S250. Or, in order to make the decision in this step S240, it would also be acceptable to arrange to store information specifying the type of the in-car device in the memory unit 24 along with the operating key information, and, when the operating key information is received from the in-car device 1 in the step S230, to receive information specifying the type of the in-car device 1 along with the operating key information.

In the step S250 the control unit 20 performs assignment processing as previously described, on the basis of the operating key information that was received in the step S230 and operation assignment information as shown in FIG. 5 that has been stored in advance in the memory unit 24. Here, by setting the contents of an assignment table by executing the procedure explained in connection with FIGS. 7 through 10 on the basis of the contents of the operating key information and of the operation assignment information, operations of the portable terminal 2 are respectively assigned to actuation of the operating keys 12a through 12e of the in-car device 1, according to their priority levels.

In the step S260, on the basis of the assignment results due to the assignment processing in the step S250, the control unit 20 creates operating key correspondence information as shown in FIG. 6. And the control unit 20 stores this operating key correspondence information that has been created in the memory unit 24 in correspondence with this in-car device 1. When this step S260 has been executed, the flow of control is transferred to a step S280.

In the step S270, the control unit 20 reads out from the memory unit 24 the operating key correspondence information for the in-car device 1, that in the step S240 was determined as being stored in the memory unit 24. And, when this step S270 has been executed, the flow of control proceeds to the step S280.

In the step S280, the control unit 20 transmits to the in-car device 1 the operating key correspondence information that was created in the step S260, or that was read out in the step S270. This transmission of the operating key correspondence information is performed via the interface unit 25 and the USB cable 3.

Next, in a step S290, the control unit 20 makes a decision as to whether or not a key signal has been received from the in-car device 1. When a key signal that was outputted from the in-car device 1 by execution of the step S70 of FIG. 13 has been received, then the flow of control proceeds to the next step S300.

In this step S300, the control unit 20 converts the key signal received from the in-car device 1 into an operating command. Here, it is decided what operation corresponds to the key signal that was received on the basis of the operating key correspondence information that was created in the step S260, or on the basis of the operating key correspondence information that was read out in the step S270, and the key signal is converted to the operating command corresponding to this operation. By doing this, the key signal that has been received from the in-car device 1 is converted into an operating command corresponding to one of the operations on the portable terminal 2 on the basis of the result of assignment by the assignment processing that was performed in the step S250 this time or previously.

In the step S310, the control unit 20 performs processing corresponding to the operating command into which the key signal was converted in the step S300. By doing this, when for example a key signal corresponding to the operating key 12e has been received from the in-car device 1, then the scale of the map is enlarged or is reduced. Moreover, when for example a key signal corresponding to one of the operating keys 12a through 21d has been received from the in-car device 1, then the map is scrolled so that the map range shifts in the direction that corresponds to that operating key.

In the step S320, the control unit 20 makes a decision as to whether or not processing has ended. Here, as in the step S110 of FIG. 13, if the connection of the in-car device 1 and the portable terminal 2 has been interrupted, or if a predetermined actuation has been performed by the user for terminating execution of the application for navigation or the like, then it is determined that the processing has ended, and the flow chart of FIG. 14 terminates. On the other hand, if such a state has not occurred, then it is decided that the processing has not ended, and the flow of control returns to the step S290 and the processing described above is repeated.

According to the first embodiment as explained above, the beneficial operational effects as described in (1) through (6) below may be obtained.

(1) For a plurality of operations of the portable terminal 2, the portable terminal 2 stores in the memory unit 24 operation assignment information like that of FIG. 5, including information relating to the priority level of assignment for operations such as shown in the column "priority level". Furthermore, actuation information (i.e. operating key information) like that of FIG. 4 related to a plurality of types of actuation that can be inputted by the operating keys 12a through 12e of the actuation unit 12 provided to the in-car device 1 is received from the in-car device 1 (in the step S230) due to the processing of the control unit 20. On the basis of the assignment information for these operations and the actuation information, the control unit 20 assigns (in the step S250) some of the operations among the plurality of operations on the portable terminal 2 to each of the plurality of types of actuation with the operating keys 12a through 12e, according to their respective priority levels. And an actuation signal (i.e. a key signal) of the operating keys 12a through 12e that is outputted from the in-car device 1 is received (in the step S290), and, on the basis of the results of the assignment in the step S250, this actuation signal that has been received is converted (in the step S300) to an operating command corresponding to one among the plurality of operations on the portable terminal 2. On the other hand, due to the processing of the control unit 10, the in-car device 1 transmits (in the step S30) actuation information (i.e. operating key information) like that of FIG. 4 to the portable terminal 2, and outputs (in the step S70) actuation signals (i.e. key signals) to the portable terminal 2, according to actuation by the user of the operating keys 12a through 12e of the actuation unit 12. Since these arrangements are provided, it is possible to establish a correspondence between the details of actuation of the in-car device 1 and the details of operation of the portable terminal 2 in a simple and easy manner.

(2) As shown in the column "recommended classification" of FIG. 5, the operation assignment information that is stored in the memory unit 24 of the portable terminal 2 also includes information related to recommended classification, specifying the classification of actuation that is recommended for each operation. Moreover, as shown in the column "classification" of FIG. 4, the actuation information that is transmitted from the in-car device 1 to the portable terminal 2 in the step S30 and that is received by the portable terminal 2 in the step S230 includes information related to the classifications of the various actuations with the operating keys 12a through 12e. And in the step S250, on the basis of this type of operation assignment information and actuation information, it is arranged for the control unit 20 preferentially to assign operations of the portable terminal 2 for which the classifications of those operations are set as recommended classifications, to actuations with the operating keys 12a through 12e. Since, due to this, if an operating key is installed to the in-car device 1 that is appropriate for the content of the operation to be performed upon the portable terminal 2, then this operation is preferentially assigned to actuation with that operating key, accordingly it is possible to enhance the ease of use from the point of view of the user.

(3) Due to processing by the control unit 20, the portable terminal 2 transmits to the in-car device 1 (in the step S280) actuation correspondence information (i.e. operating key correspondence information) like that of FIG. 6 related to the results of assignment by the assignment processing of the step S250. And, due to processing by the control unit 10, the in-car device 1 receives (in the step S40) this actuation correspondence information from the portable terminal 2. Since these arrangements are provided, it is possible to notify to the in-car device 1 the results of assignment of operations to actuations with the operating keys 12a through 12e from the portable terminal 2, and it is possible to utilize processing of various types with the in-car device 1.

(4) As shown in the columns "operating key" and "display" in FIG. 6, the actuation correspondence information described above includes information about the operations assigned by the assignment processing of the step S250 to each of the actuations by the operating keys 12a through 12e, and information about the icons that denote each of these operations. And due to processing by the control unit 10, on the basis of this actuation correspondence information, as shown in FIG. 11, the in-car device 1 displays (in the step S50) the icons 70a through 70e that respectively denote the operations assigned to the operations with the operating keys 12a through 12e in the display regions on the display unit 11 that have been set in advance for these actuations with the operating keys 12a through 12e. Since these arrangements are provided, it is possible to show the details of the operations that are assigned to the various actuations with the operating keys 12a through 12e to the user in an easily understood manner.

(5) Moreover, as shown in the columns "operating key" and "possible/impossible while moving" in FIG. 6, the actuation correspondence information includes information about the operations that have been assigned by the assignment processing in the step S250 to the actuations with the operating keys 12a through 12e, and information as to whether or not these operations are permitted during movement of the vehicle. And, due to processing by the control unit 10, on the basis of this actuation correspondence information, the in-car device 1 determines upon the operations that are prohibited during vehicle movement, and, while the vehicle is in motion, makes ineffective (in the step S100) the actuations with the operating keys 12a through 12d that have been assigned to those operations. Since these arrangements are provided, actuations for which there is a danger of loss of security if performed during driving, or for which input actuation during driving would be difficult or the like, are prevented from being executed upon the portable terminal 2 from the in-car device 1 while the vehicle is in motion, and accordingly it is possible to enhance the security and the ease of use.

(6) Furthermore, due to processing by the control unit 10, it is arranged for the in-car device 1, along with making ineffective the actuations with the operating keys 12a through 12d as described above when the vehicle is in motion, also to change the mode according to which the icons 70a through 70d that denote these operations are displayed to a mode, as shown in FIG. 12, that is different from their display mode when the vehicle is stopped that is shown in FIG. 11. Due to this, it is possible to inform the user in an easily understood manner that actuation with the operating keys 12a through 12d while the vehicle is in motion is prohibited.

Embodiment #2

In the first embodiment explained above, an example was explained of an in-car information system in which the assignment processing was performed by the portable terminal 2, and conversion was performed from key signals to operating commands on the basis of the results of that assignment. By contrast, in the second embodiment explained below, an example is explained of an in-car information system in which the assignment processing is performed by the in-car device 1, and conversion is performed from key signals to operating commands on the basis of the results of that assignment.

It should be understood that the structure of the in-car information system according to this embodiment is the same as that shown in FIG. 1. Moreover, with the in-car information system of this embodiment, the structures of the in-car device 1 and of the portable terminal 2 are the same as those shown in FIG. 2.

Figure 15:
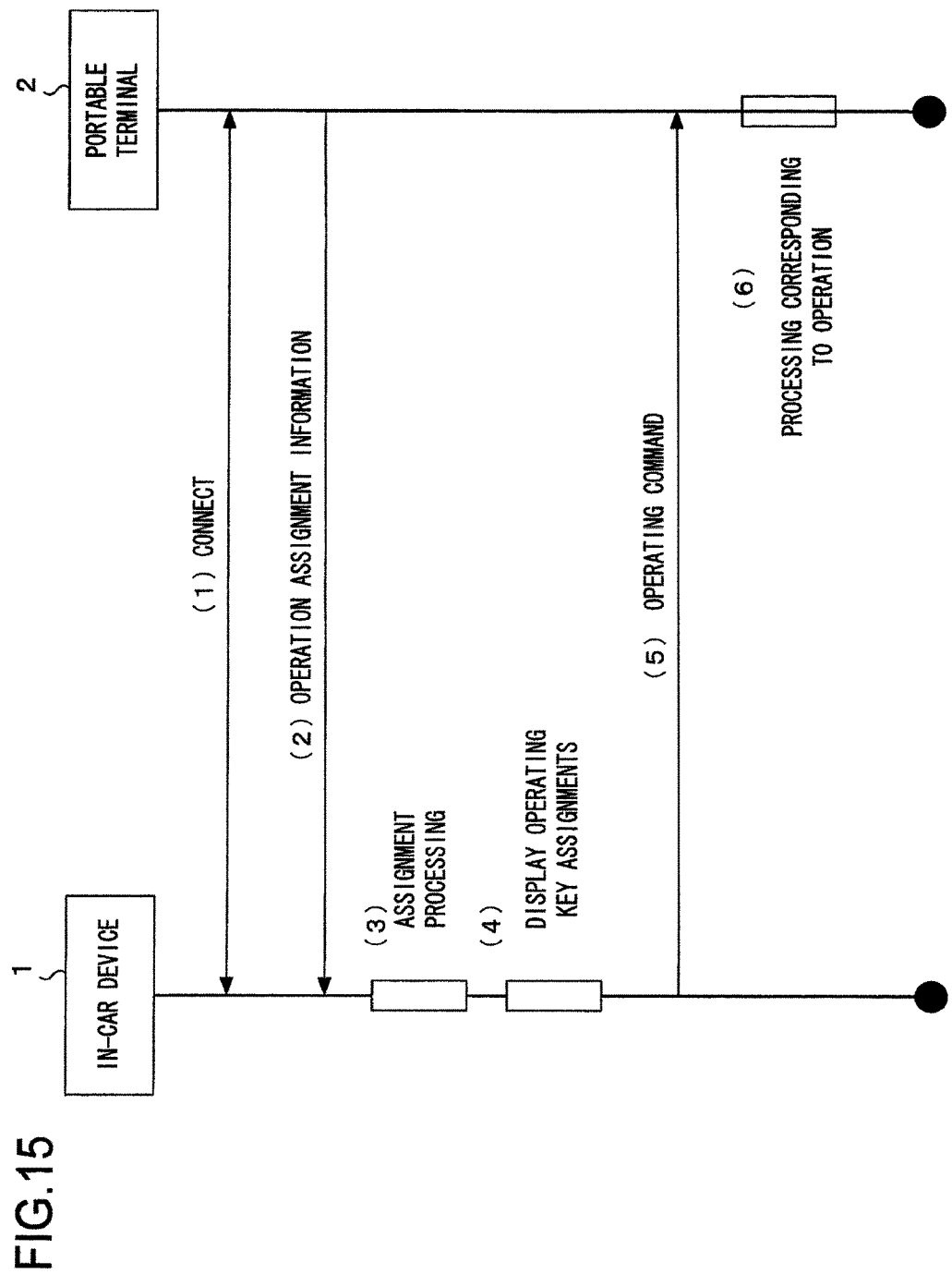
FIG. 15 is a figure showing the flow of information between an in-car device and a portable terminal, according to a second embodiment.

FIG. 15 is a figure showing the flow of information between the in-car device 1 and the portable terminal 2 according to this embodiment, when correspondence is being established between the operating keys of the in-car device 1 and operations of the portable terminal 2.

When the in-car device 1 and the portable terminal 2 are mutually connected together as shown at (1) in FIG. 15, the portable terminal 2 transmits operation assignment information to the in-car device 1, as shown at (2). Similarly to the case with the first embodiment, the operation assignment information that is transmitted here is stored in advance in the memory unit 24 of the portable terminal 2, and specifies items like those shown in FIG. 5.

And, upon receipt of this operation assignment information from the portable terminal 2, as shown at (3) in FIG. 15, the in-car device 1 performs assignment processing in order to assign the operations of the portable terminal 2 respectively to actuations of the operating keys 12a through 12e. In this assignment processing, the in-car device 1 performs assignment processing like that explained with reference to FIGS. 7 through 10 for the first embodiment, on the basis of the operating keys 12a through 12e that it possesses itself and their classification information, and on the basis of the operation assignment information that has been received from the portable terminal 2. It should be understood that the information about the operating keys 12a through 12e on the in-car device 1 is, for example, stored in the memory unit 14, and has contents similar to those of the operating key information shown in FIG. 4. And operating key correspondence information like that shown in FIG. 6 is created on the basis of the assignment results of the assignment processing, and is stored in the memory unit 14.

Thereafter, as shown at (4) in FIG. 15, the in-car device 1 performs display of the operating key assignments on the basis of the operating key correspondence information. Here, icons 70a through 70f specifying the operations that have been assigned to the operating keys 12a through 12e are displayed screens such as shown in FIGS. 11 and 12 being shown on the display unit 11.

When one of the operating keys on the in-car device 1 is actuated by the user, on the basis of the results of the assignment processing that was performed at (3), the in-car device 1 converts the actuation signal (i.e. the key signal) that corresponds to this operating key to an operating command, and transmits that command to the portable terminal 2 as shown at (5). At this time, in a similar manner to the case in which the portable terminal 2 performs in the first embodiment, by referring to the operating key correspondence information, the in-car device 1 determines the operation that has been assigned to that operating key, and performs conversion from the key signal to an operating command on the basis of the result of that determination. And, upon receipt of the operating command from the in-car device 1, as shown at (6), the portable terminal 2 executes processing corresponding to the operation specified by that operating command. By repeating the above procedure each time an operating key is actuated by the user, operations are executed by the portable terminal 2 corresponding to the actuations performed by the user on the in-car device 1.

Figure 16:
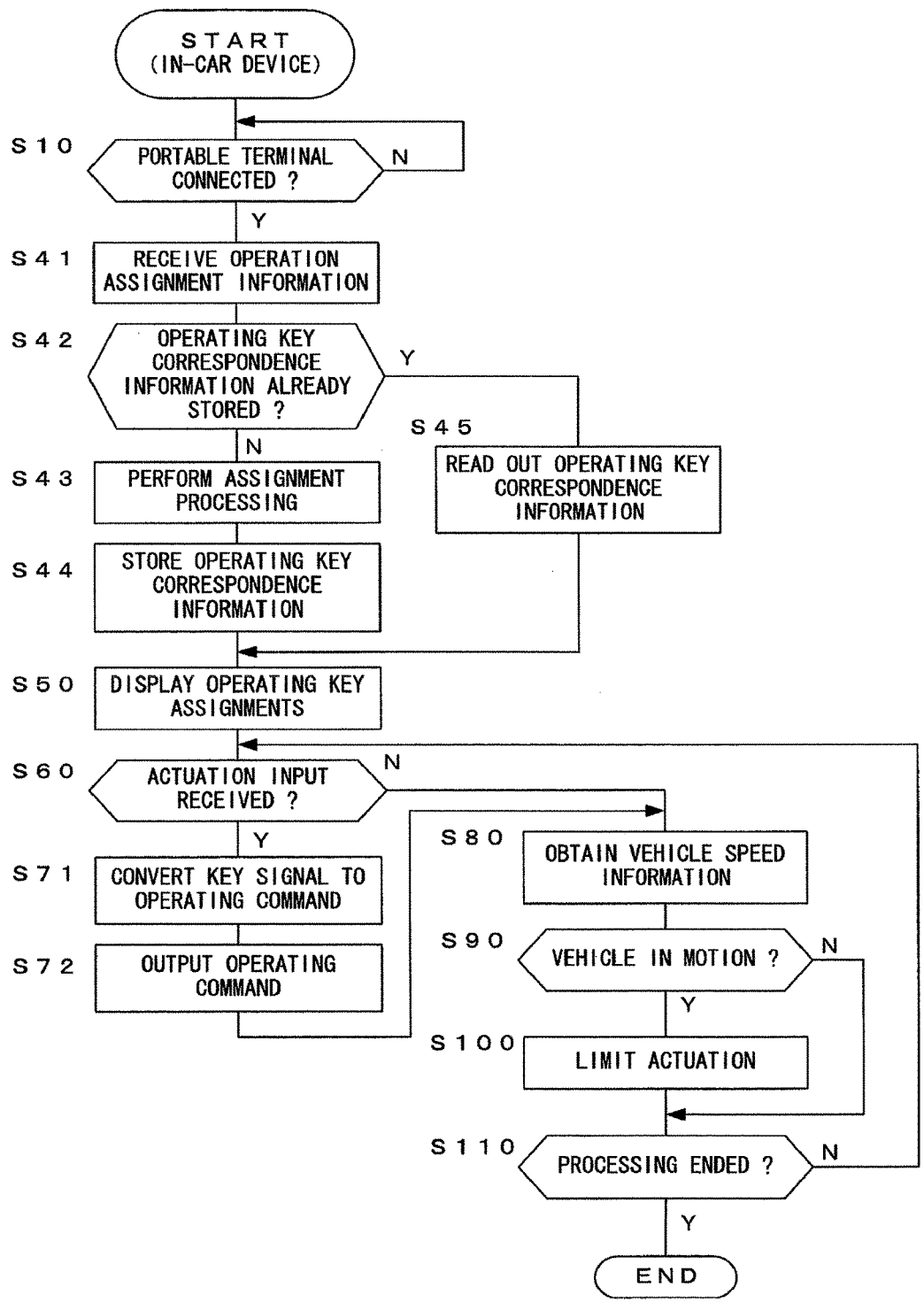
FIG. 16 is a flow chart of processing performed by the in-car device according to the second embodiment.
Figure 17:
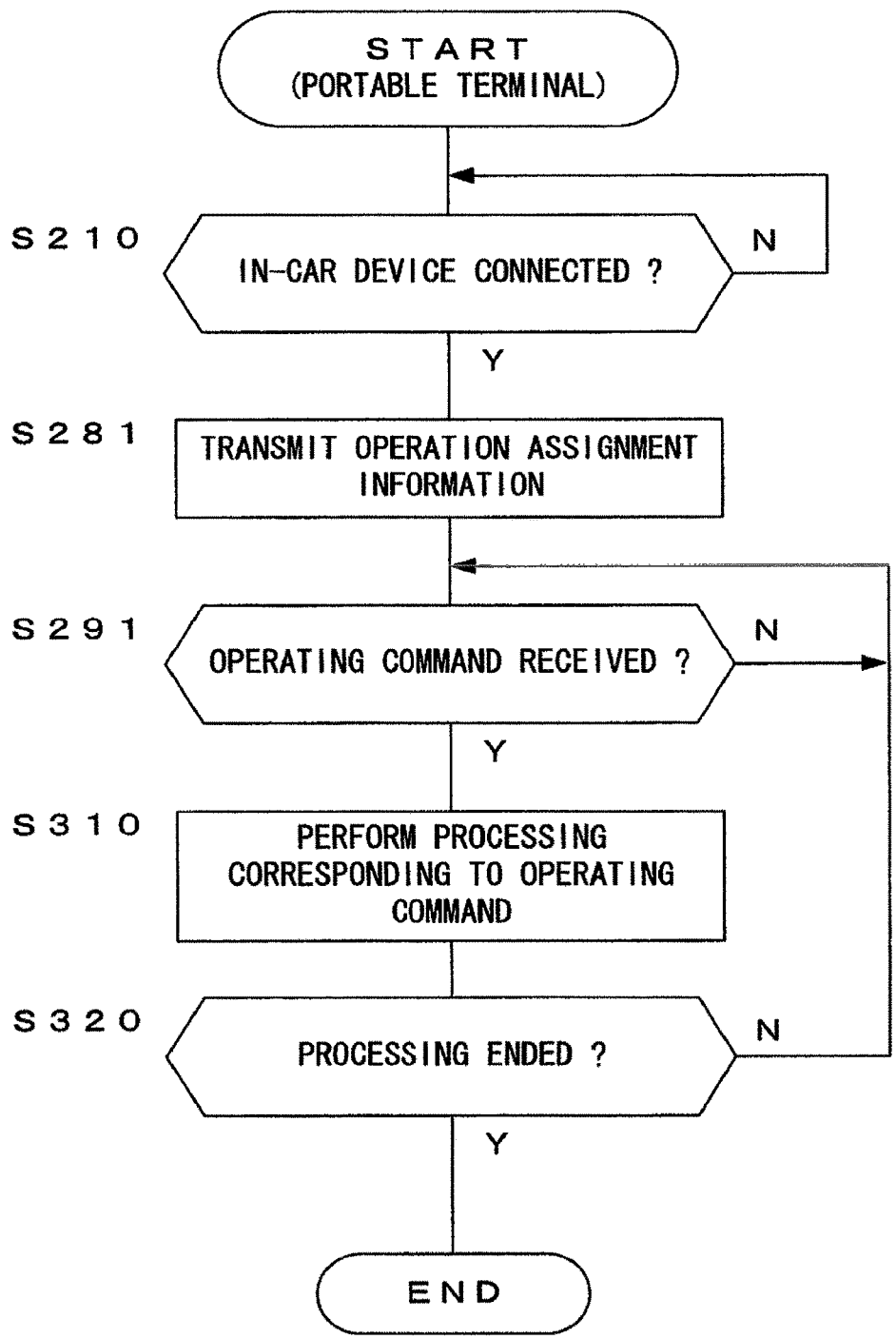
FIG. 17 is a flow chart of processing performed by the portable terminal according to the second embodiment.

Flow charts for the processing executed by the in-car device 1 and by the portable terminal 2 of the in-car information system according to this embodiment are respectively shown in FIGS. 16 and 17. FIG. 16 is a flow chart for the processing performed by the in-car device 1, while FIG. 17 is a flow chart for the processing performed by the portable terminal 2. It should be understood that the same step numbers are appended in FIGS. 16 and 17 to processing steps that execute the same processing as corresponding ones of the flow charts of FIGS. 13 and 14. And, in the following explanation, the explanation of the contents of such processing steps to which the same step numbers as in FIGS. 13 and 14 are appended is omitted, unless such explanation is particularly required.

First, the flow chart of FIG. 16 will be explained. The processing shown in the flow chart of FIG. 16 is executed by the control unit 10 of the in-car device 1.

First in a step S41 the control unit 10 receives operation assignment information transmitted from the portable terminal 2. Here, by the step S281 being executed by the portable terminal 2 as will be explained hereinafter, operation assignment information as shown in FIG. 5 is transmitted from the portable terminal 2 via the USB cable 3, and is received using the interface unit 15.

Then in a step S42, on the basis of the operation assignment information received in the step S41, the control unit 10 makes a decision as to whether or not operating key correspondence information for the portable terminal 2 is stored in the memory unit 14. Here, operating key correspondence information that is previously created once by the in-car device 1 with some portable terminal as subject is stored in the memory unit 14 in correspondence with that portable terminal by a step S44 that will be explained hereinafter. Accordingly, if operating key correspondence information for a portable terminal of the same type as this portable terminal 2 has already been created in the past, then this operating key correspondence information will already be stored in the memory unit 14. In this type of case, the flow of control is transferred from this step S42 to a step S45. On the other hand, if no such operating key correspondence information is already stored in the memory unit 14, then this is the first time for creation of this operating key correspondence information, and the flow of control proceeds from this step S42 to a step S43.

It should be understood that the decision in the step S42 may, for example, be performed by comparing together the operation assignment information that was received in the step S41 and the operating key correspondence information that is stored in the memory unit 14, and by deciding whether or not the contents of the columns "operation" in these sets of information agree with one another. If the result is that, among the operating key correspondence information stored in the memory unit 14, some information is included for which the contents of the column "operation" agrees with that in the operation assignment information, then the flow of control is transferred to the step S45, whereas if no such information is included then the flow of control proceeds to the step S43. At this time, it would also be acceptable to arrange to refer to the contents of the column "display" or to the contents of the column "possible/impossible while moving", as appropriate. Or, in order to make the decision in this step S42, it would also be acceptable to arrange to store information specifying the type of the portable terminal in the memory unit 14 along with the operating key correspondence information, and, when the operating key assignment information is received from the portable terminal 2 in the step S41, to receive the operation assignment information along with the information specifying the type of the in-car device 1.

In the step S43 the control unit 10 performs similar assignment processing to that explained in the case of the first embodiment, on the basis of the operating keys 12a through 12e that it possesses itself and the information relating to their classification, and on the basis of the operation assignment information that was received in the step S41.

In the step S44, on the basis of the assignment processing of the step S43, as shown in FIG. 6, the control unit 10 creates operating key correspondence information. And this operating key correspondence information that has thus been created is stored in the memory unit 14 in correspondence with the portable terminal 2. When this step S44 has been executed, the flow of control is transferred to a step S50.

In the step S45 the control unit 10 reads out the operating key correspondence information for the portable terminal 2 that was determined as being stored in the memory unit 14 in the step S42. When this step S45 has been executed, the flow of control is transferred to the step S50.

It should be understood that, in this embodiment, the control unit 10 performs display of the operating key assignments in the step S50, on the basis of the operating key correspondence information that was created in the step S44, or on the basis of the operating key correspondence information that was read out in the step S45. In other words, the control unit 10 displays each of the icons 70a through 70f in a predetermined display region on the display unit 11, on the basis of the results of assignment by the assignment processing that was performed in the step S43 either this time or previously.

Then in a step S71 the control unit 10 converts the key signal of the operating key that has been actuated by the user into an operating command. Here, it is decided what operation corresponds to the key signal of the operating key that was actuated by the user, on the basis of the operating key correspondence information that was created in the step S44, or on the basis of the operating key correspondence information that was read out in the step S45, and the key signal is converted to the operating command corresponding to this operation. By doing this, the key signal that corresponds to actuation by the user of an operating key 12a through 12e is converted into an operating command corresponding to one of the operations on the portable terminal 2 on the basis of the result of assignment by the assignment processing that was performed in the step S43 this time or previously.

Then in a step S72 the control unit 10 outputs to the portable terminal 2 this operating command that has been converted from the key signal in the step S71. It should be understood that, if the dial type operating key 12*e* has been actuated, then mutually different key signals are outputted for the case of rotational actuation in the rightward direction and for the case of rotational actuation in the leftward direction. When this step S72 has been executed, the flow of control proceeds to a step S80.

It should be understood that, in this embodiment, the control unit 10 imposes the actuation limitation of the step S100 on the basis of the operating key correspondence information that was created in the step S44, or on the basis of the operating key correspondence information that was read out in the step S45. In other words, it determines the operations that are to be prohibited while the vehicle is in motion on the basis of the results of assignment by the assignment processing that was performed in the step S43 this time or previously, and makes actuation of the operating keys 12*a* through 12*d* to which these operations are assigned ineffective. Furthermore, the control unit 10 changes over the display mode for the icons 70*a* through 70*d* that denote these operations to a different display mode.

Next, the flow chart of FIG. 17 will be explained. The processing shown in the flow chart of FIG. 17 is executed by the control unit 20 of the portable terminal 2 when an application for navigation is executed.

First in a step S281 the control unit 20 transmits the operation assignment information stored in the memory unit 24 to the in-car device 1. This transmission of the operation assignment information is performed via the interface unit 25 and the USB cable 3.

Then in a step S291 the control unit 20 makes a decision as to whether or not an operating command has been received from the in-car device 1. If an operating command that has been outputted from the in-car device 1 by the step S72 of FIG. 16 being executed has been received, then the flow of control proceeds to a step S310, and processing according to this operating command is performed in the step S310.

Then in a step S320, in a similar manner to the flow chart of FIG. 14, the control unit 20 makes a decision as to whether or not processing has ended. If it is determined that the processing has ended, then the flow chart of FIG. 17 terminates, while, if it is determined that processing has not ended, then the flow of control returns to the step S291 and the processing described above is repeated.

According to the second embodiment explained above, beneficial operational effects as described in (7) through (11) below may be obtained.

(7) Due to the processing by the control unit 20, for a plurality of the operations of the portable terminal 2, the portable terminal 2 transmits to the in-car device 1 (in the step S281) operation assignment information as shown in FIG. 5, including information related to the priority levels assigned to the various operations, such as shown in the column "priority level". Moreover, the portable terminal 2 receives (in the step S291) an operating command outputted from the in-car device 1. On the other hand, due to the processing by the control unit 10, the in-car device 1 receives the operation assignment information like that in FIG. 5 from the portable terminal 2 (in the step S41), and assigns (in the step S43), on the basis of this operation assignment information, one among the plurality of operations on the portable terminal 2 for each of the plurality of types of actuation that can be inputted with the operating keys 12*a* through 12*e* of the actuation unit 12 provided to the in-car device 1, according to the priority levels. And, on the basis of the results of this assignment, the control unit 10 converts the actuation signals (i.e. the key signals) corresponding to actuations by the user on the operating keys 12*a* through 12*e* of the actuation unit 12 into operating commands that correspond to some among the plurality of operations on the portable terminal 2 (in the step S71), and outputs these commands to the portable terminal 2 (in the step S72). Since it is arranged to do this, accordingly it is possible to establish a correspondence between the details of actuation upon the in-car device 1 and the details of operation on the portable terminal 2 in a simple and easy manner, in a similar manner to the case with the first embodiment.

(8) As shown in the column "recommended classification" in FIG. 5, the operation assignment information that is transmitted from the portable terminal 2 to the in-car device 1 in the step S281 and is received in the step S41 by the in-car device 1 further includes the information related to recommended classification, specifying the classification of actuation that is recommended for each operation. On the basis of this type of operation assignment information, in the step S43, it is arranged for the control unit 10 preferentially to assign, to each of the actuations of the operating keys 12*a* through 12*e*, operations of the portable terminal 2 for which the classifications of those actuations are set as the recommended classifications. Since, by doing this, in a similar manner to the case with the first embodiment, if an appropriate operating key that corresponds to the details of an operation on the portable terminal 2 is installed to the in-car device 1, then that operation is preferentially assigned to actuation of that operating key, accordingly it is possible to enhance the ease of use from the point of view of the user.

(9) As shown in the column "display" in FIG. 5, the operation assignment information described above further includes information about the icons denoting the operations. Using this operation assignment information and on the basis of the assignment results due to the assignment processing of the step S43, as shown in FIG. 11, the control unit 10 displays the icons 70*a* through 70*f* denoting the operations that have been assigned to each of the operations by the operating keys 12*a* through 12*e* in display regions of the display unit 11 that are respectively set in advance for each of the actuations with the operating keys 12*a* through 12*e*. Since this is done, in a similar manner to the case in the first embodiment, it is possible to display the details of the operations that have been assigned to the various actuations with the operating keys 12*a* through 12*e* to the user in a manner that is simple to understand.

(10) Furthermore, the operation assignment information also includes information as to whether each of the operations is permitted or forbidden while the vehicle is in motion, as shown in the column "possible/impossible while moving" in FIG. 5. Using this operation assignment information, and on the basis of the results of assignment by the assignment processing of the step S43, the control unit 10 determines the operations that are to be prohibited while the vehicle is in motion, and makes ineffective (in the step S100) actuations with the operating keys 12*a* through 12*d* to which those operations have been assigned, when the vehicle is in motion. Since it is arranged to do this, accordingly, in a similar manner to the case with the first embodiment, it is possible to prevent actuations for which there is a fear of loss of security if they are performed while the vehicle is in motion, or actuations that are difficult to input or the like, from being performed upon the portable terminal 2 from the in-car device 1 while the vehicle is in motion, so that it is possible to ensure both security and ease of use while the vehicle is in motion.

(11) Furthermore, along with the in-car device 1, due to the processing by the control unit 10, making actuations with the operating keys 12*a* through 12*d* ineffective while the vehicle is in motion as described above, it is also arranged, as shown in FIG. 12, to change over the way in which the icons 70*a* through 70*d* that specify those operations are displayed to a different mode from the one shown in FIG. 11 that is employed when the vehicle is stopped. Due to this, in a similar manner to the case with the first embodiment, it is possible to notify the user in an easily understood manner of the fact that actuation with the operating keys 12*a* through 12*d* is prohibited while the vehicle is in motion.

It should be understood that while, in the embodiments described above, examples are explained in each of which the operations of the portable terminal 2 are assigned to the operating keys 12*a* through 12*e* that are provided to the in-car device 1, it would also be acceptable to arrange to apply the present invention to a case in which the actuations of the in-car device 1 are performed using a touch panel. In this case, in the first embodiment, instead of transmitting operating key information like that previously described from the in-car device 1 to the portable terminal 2, it is desirable to transmit information related to the actuations that can be inputted with the touch panel, for example template information that specifies the arrangement and the shapes of the actuation buttons that are displayed upon the touch panel. By doing this, when performing assignment processing on the portable terminal 2, it is possible to assign operations of the portable terminal 2 to each of the actuation buttons on the touch panel. Moreover it would also be acceptable, instead of transmitting key signals from the in-car device 1 to the portable terminal 2, to arrange to transmit signals corresponding to actuations of the touch panel, for example coordinate signals specifying coordinate positions on the touch panel.

Furthermore, it would also be possible to employ a touch panel on the in-car device 1 that is capable of detecting so-called multi-touch actuation. In this case, it is possible to assign actuations of various types (i.e. gestures) that are implemented by multi-touch actuation to the various operations of the portable terminal 2. For example, instead of the operating keys 12*a* through 12*e*, it is possible to assign so-called pinch-in or pinch-out actuations in which the space between two fingers on the touch panel is narrowed or widened, or so-called flick actuations in which a finger is quickly shifted over the touch panel so as to brush on it, or the like, to the various operations of the portable terminal 2. It should be understood that, if it is also possible to perform multi-touch actuation on the portable terminal 2 that is similar to that on the in-car device 1, then it is desirable to assign, to operations that are performed by the portable terminal 2, the same multi-touch actuations on the in-car device 1 and on the portable terminal 2.

If multi-touch actuation such as described above is employed, then in the first embodiment it is possible to transmit actuation signals corresponding to the details of multi-touch actuations from the in-car device 1 to the portable terminal 2, instead of the key signals previously described. In other words, when the user performs a multi-touch actuation upon the touch panel, the in-car device 1 determines the meaning and the type of the gesture specified by this multi-touch actuation, and transmits an actuation signal corresponding to the result of this determination to the portable terminal 2. And, upon receipt of this actuation signal transmitted from the in-car device 1, the portable terminal 2 converts from the actuation signal to an operating command by deciding, on the basis of the result of the assignment processing, what is the operation that corresponds to this actuation signal. By doing this, the user is able to perform operations on the portable terminal 2 corresponding to touch panel actuations inputted to the in-car device 1.

Or, it would also be acceptable to arrange simply to transmit coordinate signals specifying coordinate positions on the touch panel as actuation signals from the in-car device 1 to the portable terminal 2. In this case, on the basis of the value or the change or the like of the coordinate position specified by the coordinate signal transmitted from the in-car device 1, the portable terminal 2 is able to determine the meaning and the type of a gesture specified by a multi-touch actuation that the user performs on the in-car device 1, and to convert it into an operating command according to the result of this determination.

On the other hand, in the second embodiment, when the user performs multi-touch actuation upon the touch panel, the in-car device 1 determines the meaning and the type of the gesture specified by this multi-touch actuation, and converts it to a corresponding operating command on the basis of the result of the assignment processing. By doing this, the user is able to perform operations on the portable terminal 2 corresponding to touch panel actuations inputted to the in-car device 1.

It should be understood that it would also be acceptable to utilize, mixed together, both touch panel actuation including multi-touch actuation as explained above, and also actuation with operating keys that are installed to the in-car device 1, such as the operating keys 12*a* through 12*e* of FIG. 1. In this case, by methods such as explained above in connection with the embodiments previously described, it would be possible to assign operations of the portable terminal 2 to actuations that are inputted by actuation of the touch panel and also to actuations with the operating keys.

Furthermore in the embodiments described above it would also be acceptable, when the assignment processing has been performed by the portable terminal 2 or by the in-car device 1, to display the result of this assignment before creating the operating key correspondence information, and to make the user confirm this assignment result. Furthermore it would also be acceptable to make it possible for the user to adjust the assignment result according to his wishes. Additionally, along with displaying the results of assignment on the basis of the operating key correspondence information by changing over the portable terminal 2 or the in-car device 1 to a predetermined confirmation screen and making the user confirm those results, it would also be acceptable to arrange for it to be possible for the user to alter these contents as he wishes, even after the operating key correspondence information has been created and stored.

While, with the embodiments explained above, it is arranged for the in-car device 1 to obtain the vehicle speed information outputted from the vehicle, and to make the decision as to whether or not the vehicle is in motion on the basis thereof, it would also be acceptable to arrange to make the decision as to whether or not the vehicle is in motion on the basis of its current position as detected by the portable terminal 2. In this case, by transmitting the result of this decision from the portable terminal 2 to the in-car device 1, when it has been determined by the portable terminal 2 that the vehicle is in motion, it is possible for the in-car device 1 to impose limitation of actuation while the vehicle is in motion, as previously described. Or it would also be acceptable to arrange to decide, on the basis of the operation assignment information, upon the operations on the portable terminal 2 that are to be the subject of limitation, and to control the portable terminal 2 from the in-car device 1, so as to make ineffective actuations with the operating keys to which those operations are assigned. Yet further, it would also be acceptable to arrange to transmit the vehicle speed information that has been obtained by the in-car device 1 from the in-car device 1 to the portable terminal 2, and to decide whether or not the vehicle is in motion by the portable terminal 2, on the basis of this vehicle speed information.

Embodiment #3

Next, a third embodiment of the present invention will be explained. In this embodiment, a method of processing is explained when the user selects an application to be executed upon the portable terminal 2 by actuation of the in-car device 1. It should be understood that the structure of the in-car information system according to this embodiment, and the structures of the in-car device 1 and the portable terminal 2, are the same as those shown in FIGS. 1 and 2. Accordingly, in the following, explanation of figures relating to these structures will be omitted.

In this embodiment, among a plurality of applications including an application for navigation as previously described, an application is executed that has been selected by the user. At this time, the user is able to perform selection of the application to be executed upon the portable terminal 2 by actuating the actuation unit 22 and selecting the desired application on a menu screen that is displayed on the display unit 21 of the portable terminal 2.

Furthermore the portable terminal 2 transmits to the in-car device 1 menu screen information, this being information for displaying a menu screen upon the in-car device 1. And, on the basis of this menu screen information that has been transmitted from the portable terminal 2, the in-car device 1 displays a menu screen on the display unit 11. When the user actuates the actuation unit 12 and selects a desired application on this menu screen, the detail of this actuation is transmitted from the in-car device 1 to the portable terminal 2, and the portable terminal 2 recognizes which application has been selected. Due to this, the user is able to perform selection of an application to be executed by the portable terminal 2, in a similar manner to the case in which he uses a menu screen that is being displayed upon the display unit 21 of the portable terminal 2. It should be understood that it would be acceptable to arrange for the menu screen that is displayed upon the display unit 21 of the portable terminal 2 and the menu screen that is displayed on the display unit 11 of the in-car device 1 to have the same contents; or, alternatively, it could be arranged for them to have mutually differing contents.

In order to display the menu screen on the in-car device 1 and to perform recognition of the application that has been selected on the in-car device 1 as described above, a so-called smart phone application manager application is installed upon the portable terminal 2. In the following, this smart phone application manager will be referred to as "SPMan".

If, among the applications of various types that are stored in the memory unit 24 of the portable terminal 2, there are any applications that it is arranged for the user to be able to select from the in-car device 1, then these applications are registered in advance with SPMan. When an application is registered with SPMan, then the design (i.e. the pattern) of an icon denoting that application is determined. For example, it is possible automatically to determine the designs of the icons that are to be registered in SPMan in correspondence with applications, by setting and storing the designs of icons corresponding to those applications in advance in the portable terminal 2. Or, it would also be acceptable to arrange to determine the designs of the icons by making the user select his desired design from among designs of a plurality of types, or to determine the designs of the icons on the basis of data received from outside. Information specifying the applications that are registered with SPMan and the designs of the icons for those applications are stored in the memory unit 24 in mutual correspondence.

Figure 18:
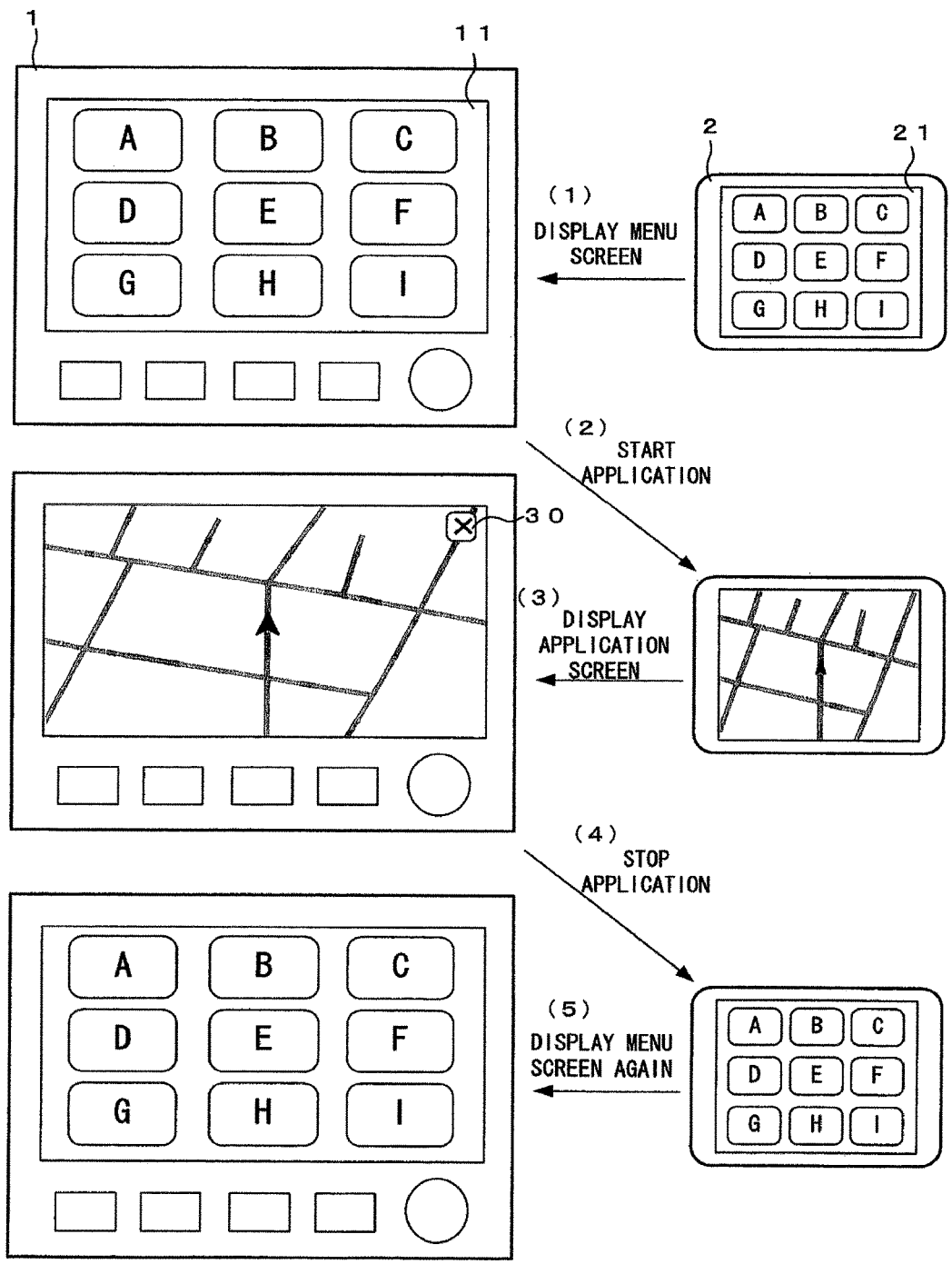
FIG. 18 is a figure showing a way in which screens of an in-car device and a portable terminal according to a third embodiment change.

FIG. 18 is a figure showing the way in which the screens of the in-car device 1 and the portable terminal 2 change, when a menu screen is displayed on the in-car device 1 of this embodiment, and an application that has been selected by the user is executed on the portable terminal 2.

When SPMan is started on the portable terminal 2, a menu screen is displayed upon the display unit 21, as shown in FIG. 18. Here, an example of a menu screen is shown in which applications "A", "B", "C", "D", "E", "F", "G", "H", and "I" are registered with SPMan, and nine icons that respectively correspond to these applications are displayed.

As shown at (1) in FIG. 18, the portable terminal 2 further displays a menu screen on the in-car device 1. At this time, as the previously described menu screen information, the portable terminal 2 transmits to the in-car device 1 information for displaying, on the in-car device 1, icons corresponding to the applications registered with SPMan. For example, image information for each icon and information for specifying the application corresponding to each icon (i.e. an ID number that is assigned to that application or the like) are transmitted from the portable terminal 2 to the in-car device 1 as menu screen information.

On the basis of the menu screen information that has been transmitted from the portable terminal 2, the in-car device 1 displays upon the display unit 11 icons corresponding to the applications "A" through "I" that are registered on the portable terminal 2 with SPMan. At this time, for example, a button arrangement pattern for the menu screen may be determined in advance in the in-car device 1, and the display positions for the icons corresponding to the applications "A" through "I" may be determined by pasting the image information for the icons included in the menu screen information, overlaid over the positions of the buttons specified by this button arrangement pattern. It should be understood that it would also be acceptable to arrange for the button arrangement pattern on the menu screen to be included in the menu screen information, and for it to be transmitted from the portable terminal 2 to the in-car device 1. Or, it would also be acceptable to arrange for information specifying display positions for the icons to be included in the menu screen information and to be transmitted from the portable terminal 2 to the in-car device 1, and for the display positions of the icons to be determined on the basis of this information, or for the contents of the menu screen to be transmitted from the portable terminal 2 to the in-car device 1 as menu screen information, just as they are. By doing this, a menu screen such as shown in FIG. 18 is displayed on the display unit 11. It should be understood that while, in FIG. 18, an example is shown in which a menu screen having the same contents as those being displayed on the display unit 21 of the portable terminal 2 is also being displayed on the display unit 11 of the in-car device 1, it would also be acceptable to arrange for these menu screens to have mutually different contents, as previously mentioned.

It should be understood that the format in which the menu screen is displayed upon the display unit 11 is not limited to the one shown in FIG. 18. For example, it would be acceptable to arrange to display a menu screen in the format of a list box in which boxes corresponding to the applications are lined up in a row, or a menu screen in which the titles of the applications are displayed as a list. Any display method for the menu screen may be employed, provided that it can be used by the user for selecting an application and causing it to be executed by the portable terminal 2.

When the user selects one of the icons by actuating a button or by actuating a touch panel upon the actuation unit 12 of the in-car device 1, as shown at (2), the in-car device 1 causes this application to be started (i.e. to be executed) upon the portable terminal 2. At this time the in-car device 1, for example, specifies the application that corresponds to the icon selected by the user on the basis of the menu screen information transmitted from the portable terminal 2, and outputs an application start command (i.e. an application execution command) corresponding to which application to the portable terminal 2. It should be understood that it will be acceptable to arrange to output information about the icon that has been selected to the portable terminal 2 as the application start command (i.e. an application execution command), if no information for specifying the applications denoted by the icons is included in the menu screen information.

Upon receipt of the application start command (i.e. the application execution command) from the in-car device 1, the portable terminal 2 temporarily stops SPMan. Thereafter, the application that is to be started (i.e. executed) is determined on the basis of the application start command that has been received from the in-car device 1, and the application that corresponds to the result of this decision is started (i.e. is executed). For example an application for navigation may be started, and may display a map image of the vicinity of the current position upon the display unit 21, as shown in FIG. 18. By doing the above, the application that has been selected by the user on the menu screen of the in-car device 1 is executed by the portable terminal 2.

Furthermore, the portable terminal 2 transmits an image created by the application being started to the in-car device 1, and, as shown at (3), a screen corresponding to this application is displayed by the in-car device 1. Due to this, a map image as shown in FIG. 18 is displayed by the in-car device 1 upon the display unit 11. It should be understood that while, in FIG. 18, an example is shown in which a map image having the same contents as those displayed upon the display unit 21 of the portable terminal 2 is displayed upon the display unit 11 of the in-car device 1, in the case of these map images as in that of the menu screens, it would also be acceptable to arrange for them to have mutually different contents.

Thereafter, when an end icon denoted by the reference symbol 30 is selected on the in-car device 1 by the user actuating a button or actuating a touch panel using the actuation unit 12, the in-car device 1 causes the portable terminal 2 to stop the application that it is executing, as shown at (4). At this time, for example, the in-car device 1 outputs to the portable terminal 2 an application stop command corresponding to the application start command that was outputted at (2). Due to this, an application stop command corresponding to the application that is being executed is outputted to the portable terminal 2. It should be understood that if, as previously described, information for specifying the applications denoted by the icons is not included in the menu screen information, then it would be acceptable to arrange to output, as this application stop command, information for commanding the portable terminal 2 to stop the application that is currently being executed, without specifying the type of that application.

When the application that is being executed has stopped, as shown at (5), the portable terminal 2 again displays the menu screen on the in-car device 1. At this time, after SPMan, that was stopped when the application was started, has been restarted and the menu screen has been displayed for a second time, then the portable terminal 2 transmits the menu screen information to the in-car device 1, in a similar manner to the case at (1). And the menu screen is re-displayed by the in-car device 1 on the basis of this menu screen information.

Figure 19:
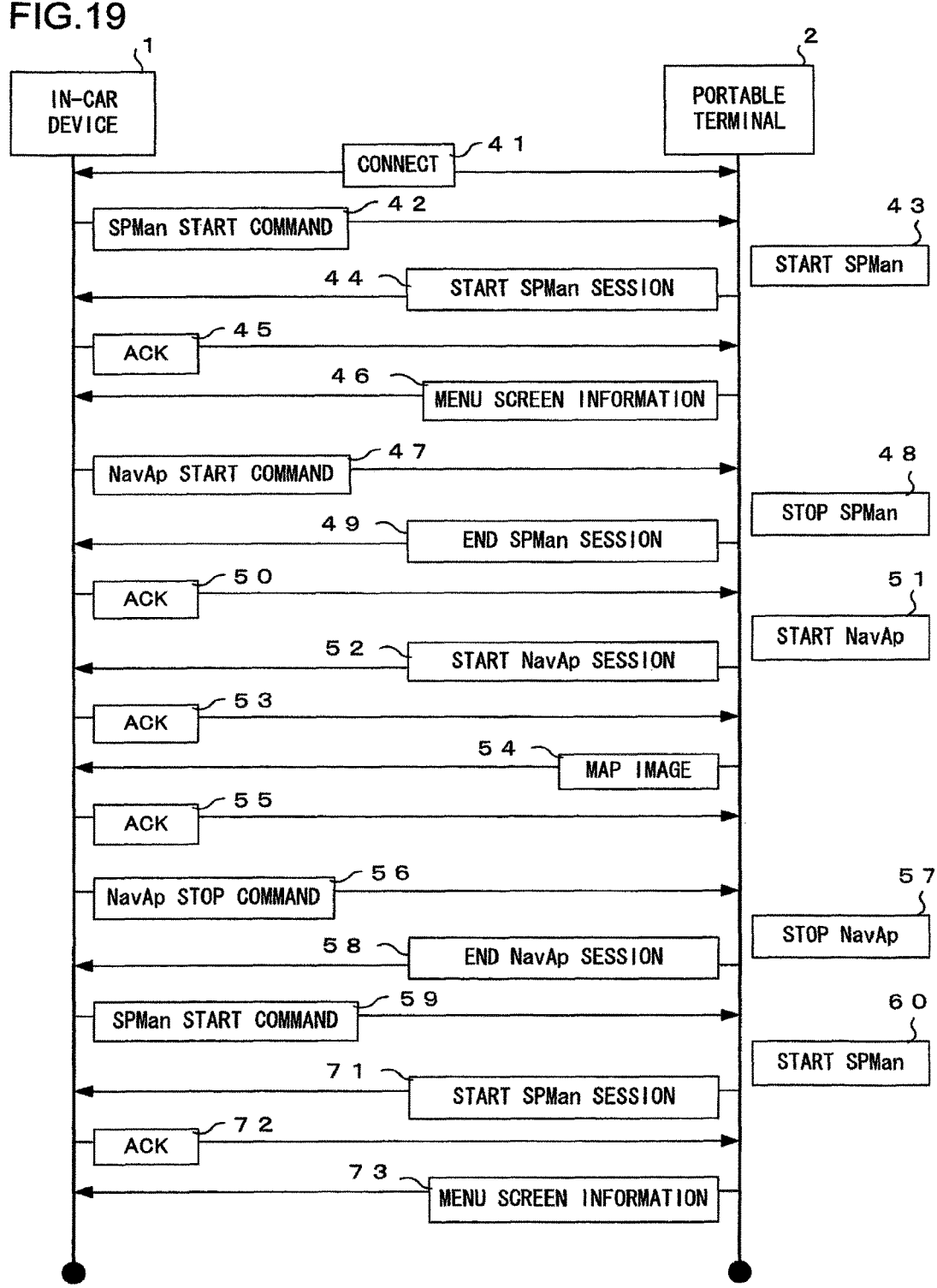
FIG. 19 is a figure showing the flow of information between the in-car device and the portable terminal, according to this third embodiment.

FIG. 19 is a figure showing the flow of information in this embodiment between the in-car device 1 and the portable terminal 2, when a menu screen is displayed on the in-car device 1 as described above, and an application that has been selected by the user is executed on the portable terminal 2. It should be understood that, in FIG. 19, an example is shown in which an application for navigation is selected by the user on the in-car device 1.

When, as shown by the reference symbol 41 in FIG. 19, the in-car device 1 and the portable terminal 2 are mutually connected together, the in-car device 1 outputs a start command for SPMan to the portable terminal 2, as shown by the reference symbol 42. Upon receipt of this start command, the portable terminal 2 starts SPMan, as shown by the reference symbol 43. Due to this, a menu screen as shown in FIG. 18 is displayed upon the display unit 21 of the portable terminal 2.

When SPMan has been started, as shown by the reference symbol 44, the portable terminal 2 commands the in-car device 1 to start a SPMan session. In this SPMan session, in order to display a menu screen on the in-car device 1, a series of communication procedures between the in-car device 1 and the portable terminal 2 are prescribed. Upon receipt of the start command for a SPMan session from the portable terminal 2, the in-car device 1 outputs to the portable terminal 2 an "ACK" that signifies normal reception, as shown by the reference symbol 45, and then waits until menu screen information is transmitted from the portable terminal 2.

Upon receipt of the "ACK" from the in-car device 1, the portable terminal 2 transmits the menu screen information to the in-car device 1, as shown by the reference symbol 46. As previously described, this menu screen information may include, for example, image information for icons corresponding to applications that have been registered in advance on the portable terminal 2, and information for specifying the correspondence relationship between the applications and the icons. It should be understood that this transmission of the menu screen information from the portable terminal 2 to the in-car device 1 may, for example, be performed by USB interrupt communication. In this manner, on the basis of the menu screen information received from the portable terminal 2, a menu screen like the one shown in FIG. 18 is displayed upon the display unit 11 of the in-car device 1.

It should be understood that applications on the portable terminal 2 that are not registered with SPMan are excluded as subjects of the menu screen. In other words, the menu screen information that is transmitted from the portable terminal 2 to the in-car device 1 excludes information related to such applications. Thus, the menu screen that is displayed on the display unit 11 by the in-car device 1 does not include icons corresponding to these applications that are excluded as subjects.

Furthermore, it would also be acceptable to arrange to exclude one or more among the applications that are registered with SPMan from the subjects of the menu screen. For example, as the in-car device 1, there may exist various different types of device whose functions and performance and so on are mutually different, and it may be made possible to connect each of these various types of in-car device 1 to the portable terminal 2. In this type of case, for each of the applications registered with SPMan, and for each of the above types of in-car device 1, it may be set in advance on the portable terminal 2 whether or not this application is to be a subject on the menu screen. And, according to the type of the in-car device 1 to which the portable terminal 2 has been connected, menu screen information is transmitted to the in-car device 1 from which information related to those applications that are set as being excluded as subjects is omitted. Due to this, a menu screen is displayed by the in-car device 1 on the display unit 11 that does not include icons corresponding to those applications that are excluded as subjects. If this is done, then it is possible to display menu screens of various different types according to the type of the in-car device 1, without changing the details of the applications registered with SPMan on the portable terminal 2.

When an icon corresponding to an application for navigation is selected by the user on the menu screen displayed on the display unit 11, as shown by the reference symbol 47, the in-car device 1 outputs a start command for this application for navigation (referred to as "NavAp" in FIG. 19). For example, as previously described, the in-car device 1 may determine that the application corresponding to that icon is an application for navigation on the basis of the menu screen information, and, according to the result of that decision, may output an application start command corresponding to that application for navigation from the in-car device 1 to the portable terminal 2. It should be understood that this outputting of the application start command from the in-car device 1 to the portable terminal 2 may, for example, be performed by USB control communication.

Upon receipt of this start command for the application for navigation from the in-car device 1, the portable terminal 2 stops SPMan, as shown by the reference symbol 48. Thereafter, next, as shown by the reference symbol 49, the portable terminal 2 commands the in-car device 1 to end the SPMan session. By SPMan being stopped before starting the application for navigation in this manner, the transmission of menu screen information to the in-car device 1 and the receipt of application start commands from the in-car device 1 by the portable terminal 2 are stopped during the interval until the next time that SPMan is restarted. Upon receipt of the end command for the SPMan session from the portable terminal 2, the in-car device 1 outputs an "ACK" to the portable terminal 2, as shown by the reference symbol 50, signifying normal receipt.

And, upon receipt of the "ACK" from the in-car device 1, as shown by the reference symbol 51, the portable terminal 2 starts the application for navigation and commences to execute it. Due to this, a map image like that shown in FIG. 18 is displayed upon the display unit 21 of the portable terminal 2.

When the application for navigation has been started, as shown by the reference symbol 52, the portable terminal 2 commands the in-car device 1 to start a navigation application session. In this navigation application session, a series of communication procedures to be performed between the in-car device 1 and the portable terminal 2 in relation to the application for navigation are specified. Upon receipt of this start command from the portable terminal 2 for a navigation application session, as shown by the reference symbol 53, the in-car device 1 outputs to the portable terminal 2 an "ACK" that signifies normal reception, and waits until information is transmitted from the portable terminal 2.

Upon receipt of this "ACK" from the in-car device 1, as shown by the reference symbol 54, the portable terminal 2 transmits to the in-car device 1 the map image of the vicinity of the current position that is being displayed upon the display unit 21. It should be understood that this transmission of the map image from the portable terminal 2 to the in-car device 1 may, for example, be performed by USB interrupt communication. The map image that has been received from the portable terminal 2 in this manner is displayed upon the display unit 11 of the in-car device 1, as shown in FIG. 18. And, when this map image has been received normally from the portable terminal 2, the in-car device 1 outputs an "ACK" to the portable terminal 2, as shown by the reference symbol 55. It should be understood that the procedure that is followed will also be the same if information other than a map image is received, for example information for outputting a guidance voice or the like.

Thereafter, when actuation as previously described for terminating the application for navigation is performed by the user on the in-car device 1, according to this actuation, as shown by the reference symbol 56, the in-car device 1 outputs a stop command for the application for navigation. This application stop command may be issued by, for example, outputting from the in-car device 1 to the portable terminal 2 an application stop command corresponding to the application start command that was outputted, as previously described, at the reference symbol 47. It should be understood that this outputting of the application stop command from the in-car device 1 to the portable terminal 2 may be performed, for example, by USB control communication.

Upon receipt of the stop command for the application for navigation from the in-car device 1, the portable terminal 2 stops the application for navigation, as shown by the reference symbol 57. Then next, as shown by the reference symbol 58, the portable terminal 2 commands the in-car device 1 to terminate the navigation application session.

When, upon receipt of the end command for the navigation application session from the portable terminal 2, then, as shown by the reference symbol 59, the in-car device 1 outputs a start command for SPMan to the portable terminal 2. And upon receipt of this start command, as shown by the reference symbol 60, the portable terminal 2 restarts SPMan, and re-displays the menu screen on the display unit 21, as shown in FIG. 18. Due to this, transmission of menu screen information to the in-car device 1 and application start command receipt from the in-car device 1, that were temporarily stopped,) are resumed.

After SPMan has been restarted on the portable terminal 2, the previously described operations of the in-car device 1 and the portable terminal 2 are both repeated. In other words, as shown by the reference symbol 71, the portable terminal 2 commands the in-car device 1 to start a SPMan session. And, upon receipt of this start command for a SPMan session from the portable terminal 2, the in-car device 1 outputs an "ACK" to the portable terminal 2, signifying normal reception. Upon receipt of this "ACK" from the in-car device 1, as shown by the reference symbol 73, the portable terminal 2 transmits menu screen information to the in-car device 1. In this manner, the in-car device 1 re-displays the menu screen like that shown in FIG. 18 upon the display unit 11 on the basis of the menu screen information that has been received from the portable terminal 2.

It should be understood that, when any one of the icons on the menu screen displayed upon the display unit 11 is selected by the user, a similar operation to that explained in the above description for the application for navigation is performed by both the in-car device 1 and the portable terminal 2. In other words, the in-car device 1 outputs an application start command corresponding to that icon to the portable terminal 2. And, upon receipt of this application start command, the portable terminal 2 stops SPMan, and commands the in-car device 1 to end the SPMan session. Subsequently the application for which the start command was received is started, and a session is started corresponding to this application.

Furthermore, when an actuation for terminating the application that is being executed is performed by the user of the in-car device 1, in response to that actuation, the in-car device 1 outputs a stop command for which application to the portable terminal 2. And, upon receipt of this stop command, the portable terminal 2 stops the application that is being executed, and terminates the session corresponding to which application. After the session has ended, the in-car device 1 outputs a start command for SPMan to the portable terminal 2, and thus restarts SPMan.

It should be understood that, when some application is being executed on the portable terminal 2, it would also be acceptable for control of the communication performed between the in-car device 1 and the portable terminal 2 to be performed directly by the application that is being executed. Or it would also be acceptable to arrange to delegate control of communication corresponding to the application that is being executed to SPMan, in which case the application that is being executed will perform communication with the in-car device 1 via SPMan.

Next, limitation of the execution of an application in this embodiment while the vehicle is in motion will be explained. When registering applications on the portable terminal 2 with SPMan, the user is able to set in advance whether or not execution of each of the applications is to be permitted while the vehicle is in motion. According to the details of these settings, when it has been decided that the vehicle is in motion, the portable terminal 2 performs limitation, so as to prohibit execution of those applications for which execution while the vehicle is in motion is not permitted, while leaving it possible to execute those applications, only, for which execution is permitted while the vehicle is in motion. As the method of prohibiting execution of an application, for example, the icon corresponding to that application on the menu screen that is being displayed upon the display unit 11 of the in-car device 1 may be disabled. Or it would also be acceptable to arrange to prohibit execution of that application, while not disabling its icon but leaving it in the effective state. In this case, for example, it may be arranged not to output any application start command even if the icon for that application is selected by the user on the in-car device 1; or, the execution of that application may be prohibited by, on the portable terminal 2, ignoring any start command for that application that is outputted from the in-car device 1. It will be acceptable to employ either of the above methods. It should be understood that it would also be acceptable to determine, in advance, the setting as to whether or not execution of each of the applications while the vehicle is in motion is permitted, in which case this task is not performed by the user when registering each application with SPMan.

FIGS. 20(a), 20(b), and 20(c) show examples of screens that are displayed while the vehicle is stopped and while it is in motion, when limitation of execution of an application while the vehicle is in motion has been performed. FIG. 20(a) shows an example of a menu screen that is displayed upon the display unit 11 of the in-car device 1 while the vehicle is stopped. This menu screen is the same as the one shown by way of example in FIG. 18, in which icons are shown corresponding to the applications "A" through "I" that are registered with SPMan.

And FIG. 20(b) shows an example of a menu screen that is displayed upon the display unit 11 of the in-car device 1 while the vehicle is in motion. On this menu screen, an "X" mark is displayed over each of the icons denoting the applications "D" and "I", in order to indicate that the execution of these applications are prohibited. It should be understood that, even if one of these icons is selected upon the menu screen by the user, the portable terminal 2 does not execute the corresponding application, but rather continues to display the menu screen. At this time, it would also be acceptable to provide any appropriate display or the like, in order to convey the meaning that execution of that application while the vehicle is in motion is prohibited. By doing the above, the display mode on the menu screen for icons that correspond to applications execution of which is prohibited while the vehicle is in motion is changed to a different mode from their display mode while the vehicle is stopped.

Moreover, FIG. 20(c) shows an example of a screen while in motion, that is displayed if the application "D" or "I" is being executed on the portable terminal 2 while the vehicle is stopped and a screen corresponding to this application is being displayed upon the display unit 11 of the in-car device 1, and subsequently the vehicle starts to move. A text legend "vehicle in motion" is displayed on this screen so as to indicate that execution of this application is prohibited while the vehicle is in motion, and corresponding thereto the screen corresponding to the application is no longer displayed. It should be understood that, instead of displaying this type of screen, it would also be acceptable to arrange to terminate forcibly the application that is being executed upon the portable terminal 2, and then to display a menu screen like the one of FIG. 20(b).

Moreover, it should be understood that the decision as to whether or not the vehicle is in motion may be performed by the portable terminal 2 on the basis of the vehicle speed information that is outputted from the in-car device 1 to the portable terminal 2 at predetermined time intervals. In other words, the control unit 10 of the in-car device 1 may acquire the vehicle speed information outputted from the vehicle as previously explained in connection with the first embodiment, and may output this vehicle speed information to the portable terminal 2 via the interface unit 15 and the USB cable 3 at predetermined time intervals. And, on the basis of this vehicle speed information outputted from the in-car device 1, the portable terminal 2 may determine whether or not the vehicle is in motion, and, if it has determined that the vehicle is in motion, may command the in-car device 1 to change the display mode of the icons that correspond to applications for which execution is prohibited while the vehicle is in motion. Upon receipt of this command, the in-car device 1 then changes the display mode for those icons, as shown in FIG. 20(b).

Figure 21:
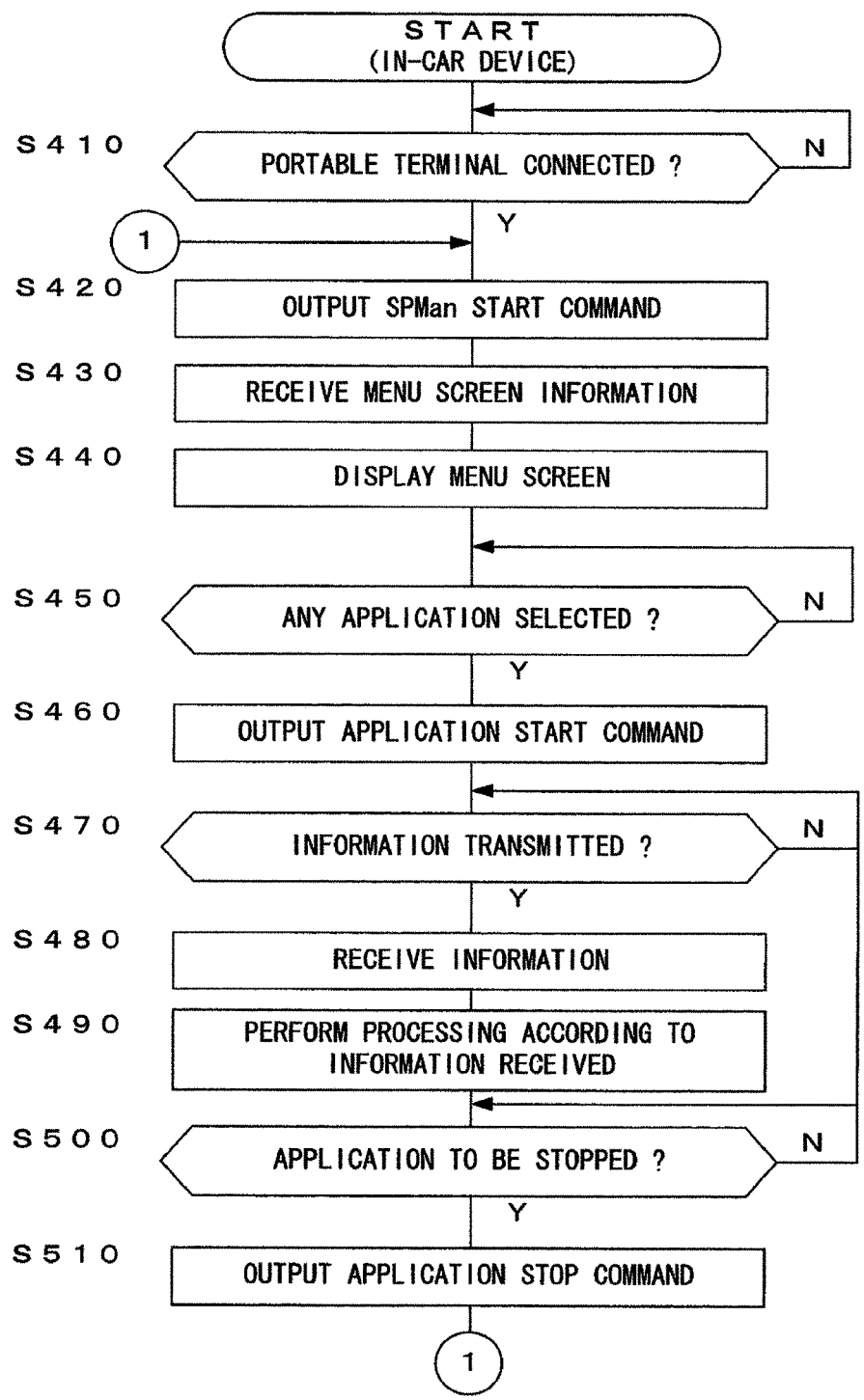
FIG. 21 is a flow chart of processing performed by the in-car device, according to the third embodiment.
Figure 22:
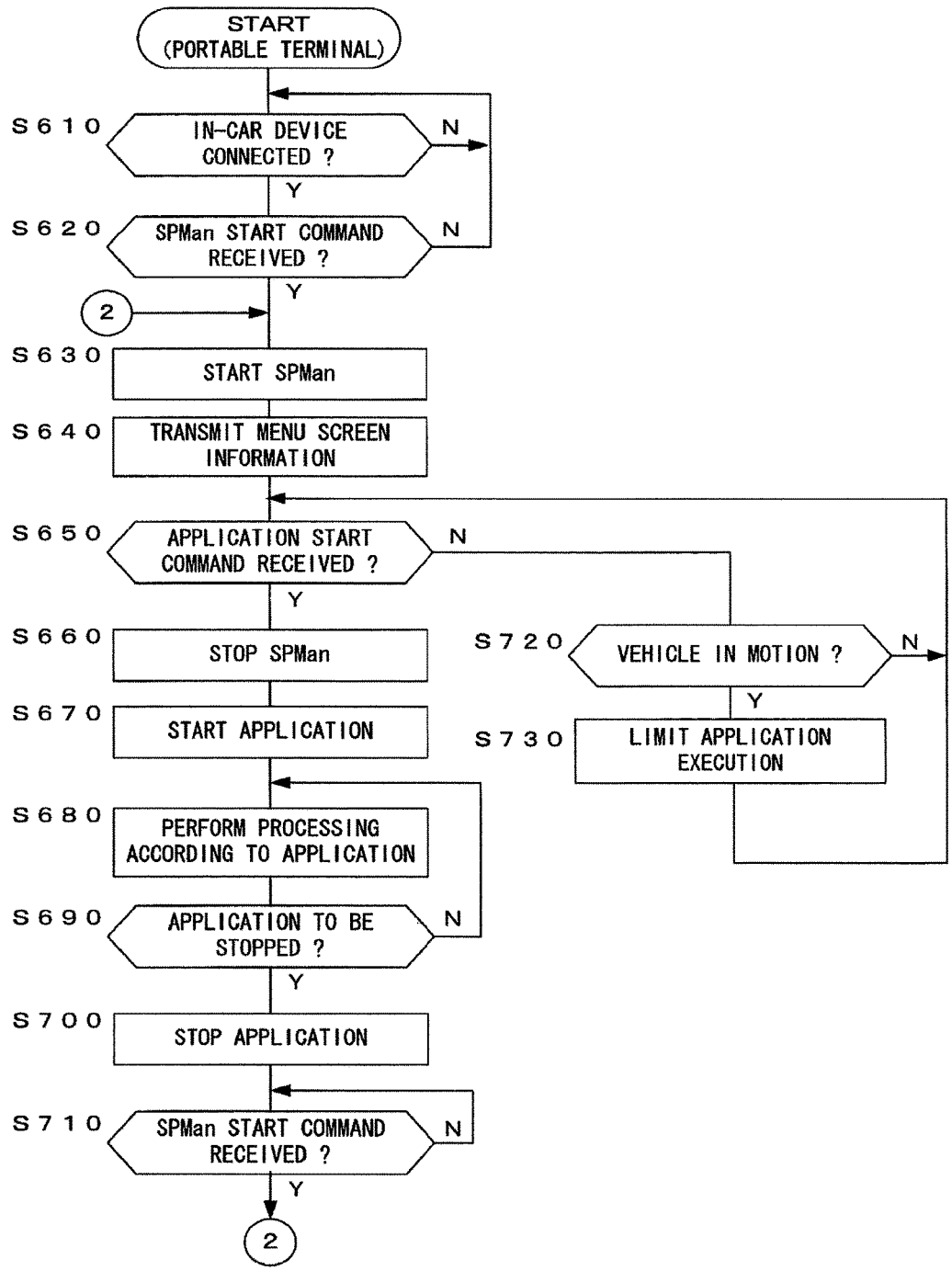
FIG. 22 is a flow chart of processing performed by the portable terminal, according to the third embodiment.

Flow charts for the processing executed by the in-car device 1 and by the portable terminal 2 of this embodiment are respectively shown in FIGS. 21 and 22. FIG. 21 is a flow chart for the processing performed by the in-car device 1, while FIG. 22 is a flow chart for the processing performed by the portable terminal 2.

First, the flow chart of FIG. 21 will be explained. The processing shown in the flow chart of FIG. 21 is executed by the control unit 10 of the in-car device 1.

First in a step S410 the control unit 10 makes a decision as to whether or not a portable terminal 2 is connected. If the in-car device 1 and the portable terminal 2 are connected together via the USB cable 3 as shown in FIG. 1 that relates to the first preferred embodiment described above, then the flow of control proceeds to the next step S420.

In this step S420 the control unit 10 outputs a start command for SPMan to the portable terminal 2. This outputting of the start command for SPMan is performed via the interface unit 15 and the USB cable 3.

Then in a step S430 the control unit 10 receives menu screen information that is transmitted from the portable terminal 2 due to the portable terminal 2 starting SPMan in response to the start command for SPMan that was outputted in the step S420. Here, this menu screen information is transmitted from the portable terminal 2 via the USB cable 3 by the step S640 of FIG. 22 that will be explained hereinafter being executed on the portable terminal 2, and is received using the interface unit 15.

Then in a step S440, on the basis of the menu screen information that was received in the step S430, the control unit 10 displays a menu screen like the one shown in FIG. 15 upon the display unit 11.

Then in a step S450 the control unit 10 makes a decision as to whether or not any application has been chosen by the user selecting any one of the icons on the menu screen displayed in the step S440. If the user has chosen an application by selecting any one of the icons on the menu screen, then the flow of control proceeds to the next step S460.

In this step S460, the control unit 10 outputs an application start command to the portable terminal 2, corresponding to the application that was selected by the user in the step S450. This outputting of the application start command is performed via the interface unit 15 and the USB cable 3.

Then in a step S470 the control unit 10 makes a decision as to whether or not there is any transmission of information by the application that, in response to the application start command that was outputted in the step S460, has been started on the portable terminal 2. If transmission of any information from the portable terminal 2 to the in-car device 1 has taken place, then the flow of control proceeds to the next step S480, whereas if no information has been transmitted then the flow of control is transferred to a step S500.

In the step S480 the control unit 10 receives information from the portable terminal 2. Here, due to the processing corresponding to the application that is being executed that is performed in the step S680 of FIG. 22 as will be explained hereinafter, information related to the result of that processing is transmitted from the portable terminal 2 via the USB cable 3, and is received using the interface unit 15. Due to this, for example, when an application for navigation is being executed, map image information transmitted is received from the portable terminal 2.

Then in a step S490 the control unit 10 performs processing corresponding to the information that was received from the portable terminal 2 in the step S480. For example, when map image information due to an application for navigation has been received from the portable terminal 2, then, on the basis of this map image information, a map image as shown in FIG. 15 is displayed upon the display unit 11.

Then in the step S500 the control unit 10 makes a decision as to whether or not to stop the application that is being executed by the portable terminal 2. For example, when actuation to terminate the application has been performed by the user as previously described, then it is decided to stop the application that is being executed, and the flow of control proceeds to a step S510. On the other hand, if actuation to terminate the application has not been performed by the user, then it is decided not to stop the application that is being executed, and the flow of control returns to the step S470.

In the step S510 the control unit 10 outputs to the portable terminal 2 a stop command for the application that is being executed on the portable terminal 2. Here, for example, output of the application stop command may be performed by outputting an application stop command corresponding to the application start command that was outputted in the step S460 as previously described to the portable terminal 2 via the interface unit 15 and the USB cable 3.

When the step S510 has been executed, the control unit 10 returns the flow of control to the step S420, and outputs a start command for SPMan to the portable terminal 2 for a second time. Due to this, SPMan is restarted on the portable terminal 2, and transmission of menu screen information and execution on the portable terminal 2 of an application selected by the user are resumed.

Next, the flow chart of FIG. 22 will be explained. The processing shown in the flow chart of FIG. 22 is executed by the control unit 20 of the portable terminal 2.

First in a step S610 the control unit 20 makes a decision as to whether or not any in-car device 1 is connected. If the in-car device 1 and the portable terminal 2 are connected together via the USB cable 3 as shown in FIG. 1 in relation to the first preferred embodiment described above, then the flow of control proceeds to the next step S620.

In this step S620 the control unit 20 makes a decision as to whether or not a SPMan start command has been received from the in-car device 1. If a SPMan start command that has been outputted from the in-car device 1 due to the step S420 of FIG. 21 being executed on the in-car device 1 has been received, then the control unit 20 advances the flow of control to the next step S630. On the other hand, if no SPMan start command has been received from the in-car device 1, then the flow of control returns to the step S610.

In the step S630 the control unit 20 starts SPMan. Due to this, when a SPMan start command is received from the in-car device 1, SPMan is started upon the portable terminal 2 in response thereto, and a menu screen like the one shown in FIG. 15 is displayed upon the display unit 21.

Then in a step S640 the control unit 20 transmits menu screen information to the in-car device 1. Here, as previously described, image information for icons corresponding to the applications that are registered with SPMan, that was started in the step S630, and information for specifying the correspondence relationship between the applications and the icons and so on, is transmitted as the menu screen information. This transmission of the menu screen information is performed via the interface unit 25 and the USB cable 3.

Then in a step S650 the control unit 20 makes a decision as to whether or not an application start command has been received from the in-car device 1. If, by the step S460 of FIG. 21 being executed on the in-car device 1, an application start command for some application that has been outputted from the in-car device 1 has been received, then the control unit 20 advances the flow of control to a step S660. On the other hand, if no such application start command has been received from the in-car device 1, then the flow of control is transferred to a step S720.

In the step S660 the control unit 20 stops SPMan that was started in the step S630. And in the next step S670 the control unit 20 starts the application corresponding to the application start command that was received in the step S650 from the in-car device 1. Due to this, when a start command for some application arrives from the in-car device 1, then the application corresponding thereto is started by the portable terminal 2 after SPMan has been stopped.

Then in a step S680 the control unit 20 performs processing corresponding to the application that was started in the step S670. At this time, according to requirements, information related to the results of processing by the application that is being executed is transmitted from the portable terminal 2 to the in-car device 1. This transmission of information is performed via the interface unit 25 and the USB cable 3. Due to this, when for example an application for navigation is being executed, map image information that specifies a map image of the vicinity of the current position is transmitted.

Then in a step S690 the control unit 20 makes a decision as to whether or not the application that was started in the step S670 is to be stopped. If an application stop command that has been outputted from the in-car device 1 due to the step S510 of FIG. 21 being executed by the in-car device 1 has been received, then the control unit 20 decides to stop the application that is being executed, and the flow of control proceeds to a step S700. But on the other hand, if no such application stop command has been received from the in-car device 1, then the control unit 20 decides not to stop the application, and the flow of control returns to the step S680 and the processing corresponding to the application that is being executed is continued. It should be understood that it would also be acceptable to arrange to decide to stop the application when the user performs a predetermined termination actuation upon the portable terminal 2.

In the step S700 the control unit 20 stops the application that was started in the step S670. Next, in a step S710, in a similar manner to the case in the step S620, the control unit 20 makes a decision as to whether or not a start command for SPMan has been received from the in-car device 1. If a SPMan start command that has been outputted from the in-car device 1 due to the step S420 of FIG. 21 being executed by the in-car device 1 has been received, then the control unit 20 returns the flow of control to the step S630 and restarts SPMan. Thereafter, processing like that described above is repeated.

Then in a step S720 the control unit 20 makes a decision as to whether or not the vehicle is currently in motion. Here, as previously described, this decision as to whether or not the vehicle is currently in motion is made on the basis of the vehicle speed information that is outputted from the in-car device 1 to the portable terminal 2 at predetermined intervals. If it is decided that the vehicle is currently in motion then the flow of control proceeds to a step S730, whereas if it is decided that the vehicle is currently stopped then the flow of control returns to the step S650.

In the step S730 the control unit 20 performs limitation of execution of applications for which execution is prohibited while the vehicle is in motion. At this time, as previously described, for each application that is registered with SPMan, the control unit 20 decides whether or not execution thereof is permitted while the vehicle is in motion. And, along with prohibiting the execution of applications for which execution while the vehicle is in motion is not permitted, as explained in connection with FIG. 20, the display mode on the menu screen for the icons that correspond to those applications is changed over to a different mode from the mode while the vehicle is stopped. After limitation of execution of applications has been performed in this manner, then the flow of control returns to the step S650.

According to the third embodiment as explained above, the following beneficial operational effects may be obtained.

(12) Due to the processing of the control unit 20, the portable terminal 2, along with controlling communication with the in-car device 1 by executing SPMan, also executes software that has been stored in advance. On the other hand, the in-car device 1 inputs actuation by the user from the actuation unit 12, and transmits information corresponding to this actuation to the information terminal 2 due to communication control performed by the control unit 20 of the information terminal 2. Furthermore, notification to the user is performed on the basis of information transmitted from the information terminal 2 by communication control performed by the control unit 20 of the information terminal 2. In concrete terms, due to the processing by the control unit 20, the portable terminal 2 transmits to the in-car device 1 (in the step S640) menu screen information in order for the in-car device 1 to display a menu screen that includes a plurality of icons respectively corresponding to each of a plurality of applications that can be executed by the portable terminal 2. And an application start command (i.e. an application execution command) that is transmitted from the in-car device 1 by the user of the in-car device 1 selecting one from among the plurality of icons on the menu screen by actuating the actuation unit 12 is received (in the step S650), and the one among the plurality of applications that corresponds to this start command (i.e. to this application execution command) is put into the running state (the step S670). On the other hand, due to the processing by the control unit 10, the in-car device 1 receives menu screen information from the portable terminal 2 (in the step S430), and notifies the user by displaying (in the step S440) a menu screen upon the display unit 11 on the basis of this menu screen information. And, when the user selects one of the icons upon the menu screen that has been displayed in this manner by actuating the actuation unit 12, an application start command (i.e. an application execution command) for starting (i.e. executing) an application corresponding to this icon is transmitted to the portable terminal 2 (in the step S460). Since it is arranged to do this, accordingly it is possible to select and to execute any desired function from among the various types of function that are provided to the portable terminal 2, by actuation of the in-car device 1. Due to this, it is possible to perform establishment of the correspondence between the details of actuation upon the in-car device 1 and the details of operation on the portable terminal 2 in a simple and easy manner.

(13) Furthermore, due to the processing by the control unit 20, upon receipt of an application start command from the in-car device 1 in the step S650, the portable terminal 2 puts SPMan into the stopped state (in the step S660). Due to this, before putting one of the plurality of applications into the running state in the step S670, the transmission of menu screen information in the step S640 and the receipt of an application start command in the step S650 are stopped. Since it is arranged to do this, accordingly it is possible to perform changeover from SPMan to an application that has been selected by the user, if it is not possible to execute a plurality of applications at the same time on the portable terminal 2.

(14) Yet further when, due to the processing by the control unit 20, the application that was put into the running state in the step S670 is put into the stopped state in the step S700, then, after the SPMan start command has been received from the in-car device 1 in the step S710, the portable terminal 2 returns the flow of control to the step S630 and restarts SPMan. Due to this, the transmission of menu screen information in the step S640 and the application start command reception in the step S650 are resumed. Since it is arranged to do this, accordingly it is possible to perform changeover from the application whose execution has been stopped to SPMan, if it is not possible to execute a plurality of applications at the same time on the portable terminal 2.

(15) Due to the processing by the control unit 10, in response to actuation of the user that has been inputted via the actuation unit 12, the in-car device 1 transmits to the portable terminal 2 (in the step S510) an application stop command for putting the application that is being executed on the portable terminal 2 into the stopped state. Thereafter a SPMan start command is transmitted to the portable terminal 2 (in the step S420) as a resume command for causing the transmission of menu screen information in the step 640 and the application start command reception in the step S650 to be resumed by the portable terminal 2. When this is done, the portable terminal 2 puts the application that was put into the running state in the step S670 into the stopped state by executing the step S700 in response to this application stop command, and thereafter, in response to the SPMan start command, the portable terminal 2 resumes the transmission of menu screen information in the step 640 and the application start command reception in the step S650. Since it is arranged to do this, accordingly, when the user actuates the in-car device 1 and issues a command for the application that is being executed to be stopped, then, along with the application that is being executed on the portable terminal 2 being reliably put into the stopped state, also it is possible to perform the changeover from this application to SPMan automatically, so that it is possible to prepare for the next actuation performed by the user.

(16) The menu screen information that is transmitted from the portable terminal 2 to the in-car device 1 in the step S640 may include information for specifying the correspondence relationship between a plurality of applications that can be executed upon the portable terminal 2 and a plurality of icons. And in the step S460, on the basis of this menu screen information, the in-car device 1 is able to determine the application that corresponds to an icon selected by the user upon the menu screen by actuation of the actuation unit 12, and is able to transmit an application start command corresponding to that application to the portable terminal 2. If this is done, then it is possible reliably to execute any desired application upon the portable terminal 2, since it is possible to output from the in-car device 1 to the portable terminal 2 an application start command that correctly reflects the result of selection by the user.

(17) Due to the processing by the control unit 20, the portable terminal 2 decides whether or not the vehicle is in motion (in the step S720), and, if it has determined that the vehicle is in motion, among the plurality of applications that can be executed by the portable terminal 2, prohibits (in the step S730) the execution of predetermined ones of those applications. Since it is arranged to do this, accordingly it is possible to prevent an application from being executed by the portable terminal 2 that, from the point of view of safety and easy actuation, is not appropriate for being executed while the vehicle is in motion, and accordingly it is possible to ensure both security and ease of use while the vehicle is in motion.

(18) Yet further, due to the processing by the control unit 20, it is arranged for the portable terminal 2 to change over, in the step S730, the display mode on the menu screen for the icons corresponding to applications for which execution is prohibited during vehicle motion to a mode that is different from their display mode when the vehicle is stopped. Due to this, it is possible to inform the user in an easily understandable manner of the fact that execution of the applications that are denoted by those icons is prohibited while the vehicle is in motion.

It should be understood that while, in the third embodiment that has been explained above, when the in-car device 1 and the portable terminal 2 are mutually connected together, it is arranged for SPMan to be started on the portable terminal 2 by a start command being outputted for SPMan from the in-car device 1 to the portable terminal 2, it would also be acceptable to arrange for SPMan to be started upon the portable terminal 2 itself detecting that it has been connected to the in-car device 1. Furthermore, when the application that is being executed is to be stopped, in a similar manner, it would also be acceptable to arrange, not for a start command for SPMan to be outputted from the in-car device 1 to the portable terminal 2, but for SPMan to be restarted after having stopped the application that is being executed upon the portable terminal 2.

With the third embodiment as explained above, when an application that has been selected by the user is to be started, first the portable terminal 2 stops SPMan, and thereafter it performs starting of the application. Furthermore, when an application that is being executed is stopped, then SPMan, that has been stopped, is restarted. By doing this, it is arranged to change over between SPMan and the application that is to be executed. However, if it is possible to execute a plurality of applications simultaneously on the portable terminal 2, then this type of changing over between applications is unnecessary. In other words, in this case, it is possible to leave SPMan always started on the portable terminal 2, irrespective of whether or not any other application is being executed. In this case it will be acceptable to put SPMan into a state of operating in the background or sleeping when an application that has been selected by the user is to be executed, while SPMan will be shifted from the background into the foreground and made active when this application has been stopped. Or it will also be acceptable, when the application that is being executed upon the portable terminal 2 is stopped, to arrange to keep SPMan operating in the background just as before while performing communication with the in-car device 1. This type of operation will also be the same for various types of application, such as an application for navigation, that are selected for execution by the user by actuation of the in-car device 1. In other words, the "starting" of SPMan and of applications of various types explained in this embodiment means that these applications are put into the running state, and that it is arranged for exchange of information between the in-car device 1 and the portable terminal 2 to be performed by these applications. And, conversely, the "stopping" of SPMan and of applications of various types means that these applications are put into the stopped state, and that it is arranged for the exchange of information between the in-car device 1 and the portable terminal 2 by these applications no longer to be performed.

And if, as described above, the portable terminal 2 that is connected to the in-car device 1 is one that is capable of executing a plurality of applications simultaneously, then it is desirable not to stop SPMan even while the application for navigation is being executed, but rather to continue transmission of the menu screen information to the in-car device 1 and application start command reception from the in-car device 1 without interruption. By doing this, it is possible to reduce the amount of processing and the processing time when an application is started. Moreover, while an application for navigation is being executed upon the portable terminal 2, it is also possible for the user to actuate the in-car device 1 and to cause some other application to be started. On the other hand, if the portable terminal 2 that is connected to the in-car device 1 is a device upon which only one application can be executed at a time, then, as explained in connection with this embodiment, it is necessary to stop SPMan while an application for navigation is being executed, and to stop transmission of menu screen information to the in-car device 1 and application start command reception from the in-car device 1. By doing this, it is possible to change over the application being executed upon the portable terminal 2 from SPMan to the application for navigation.

In the third embodiment as explained above it would also be acceptable, if there is some processing that is used in common by a plurality of applications, to arrange for it to be possible to share the results of that processing between the plurality of applications by delegating that processing to SPMan. Processing that is not required after having been initially performed once except when subsequently changing over between different portable terminals 2, such as, for example, user authentication processing or the like, may be of this type. If the above is done, then it is possible for each of the applications merely only to acquire the results of this processing by SPMan, and it is not necessary to perform the same processing again in detail, each time a different application is executed. Due to this, it is possible to anticipate increase of the processing efficiency of the portable terminal 2 and increase of its operating speed.

With the third embodiment as explained above, the decision as to whether or not the vehicle is in motion is made by the portable terminal 2, by the vehicle speed information outputted from the vehicle being acquired by the in-car device 1, and by this vehicle speed information being outputted from the in-car device 1 to the portable terminal 2. However, it would also be acceptable to arrange for the in-car device 1 to make the decision as to whether or not the vehicle is in motion. In this case, it would not be necessary for the vehicle speed information to be outputted from the in-car device 1 to the portable terminal 2, and the processing of the steps S720 and S730 of FIG. 22 would be executed by the control unit 10 of the in-car device 1. Or, it would also be acceptable to arrange for the decision as to whether or not the vehicle is in motion to be made on the basis of the current position of the vehicle as detected by the portable terminal 2. In this case as well, there would be no requirement for the vehicle speed information to be outputted from the in-car device 1 to the portable terminal 2.

Moreover, it would also be acceptable to arrange for the in-car device 1 to acquire vehicle information of various kinds outputted from the vehicle other than the vehicle speed information. It may be arranged for the vehicle information that is acquired at this time to be employed in the processing executed by the in-car device 1, or it may be arranged for it to be outputted from the in-car device 1 to the portable terminal 2 and to be employed in the processing executed by the portable terminal 2. As one example of this, it may be arranged for a start condition that is determined in terms of vehicle information to be stored in advance for each application, and for an application to be automatically started on the portable terminal 2 when vehicle information satisfying its start condition is outputted from the vehicle. In this case, it will be acceptable to arrange for the information specifying the start condition for each application to be transmitted from the portable terminal 2 to the in-car device 1 as a part of the menu screen information, and for the decision as to whether or not, on the basis of this vehicle information, the start condition is satisfied to be made by the in-car device 1. Or, it would also be acceptable for the vehicle information to be transmitted from the in-car device 1 to the portable terminal 2, and for the decision as to whether or not, on the basis of this vehicle information, the start condition is satisfied to be made by the portable terminal 2. By doing this, when vehicle information such as for example whether the remaining amount of fuel has dropped below some predetermined value is outputted from the vehicle, then it is possible automatically to start an application upon the portable terminal 2 for finding a gasoline station in the vicinity of the current position.

Embodiment #4

Next, a fourth embodiment of the present invention will be explained. In this embodiment, the method for processing when the user selects an application to be executed on the portable terminal 2 by actuation of the in-car device 1 will be explained by using a different example from that in the third embodiment described above.

Figure 23:
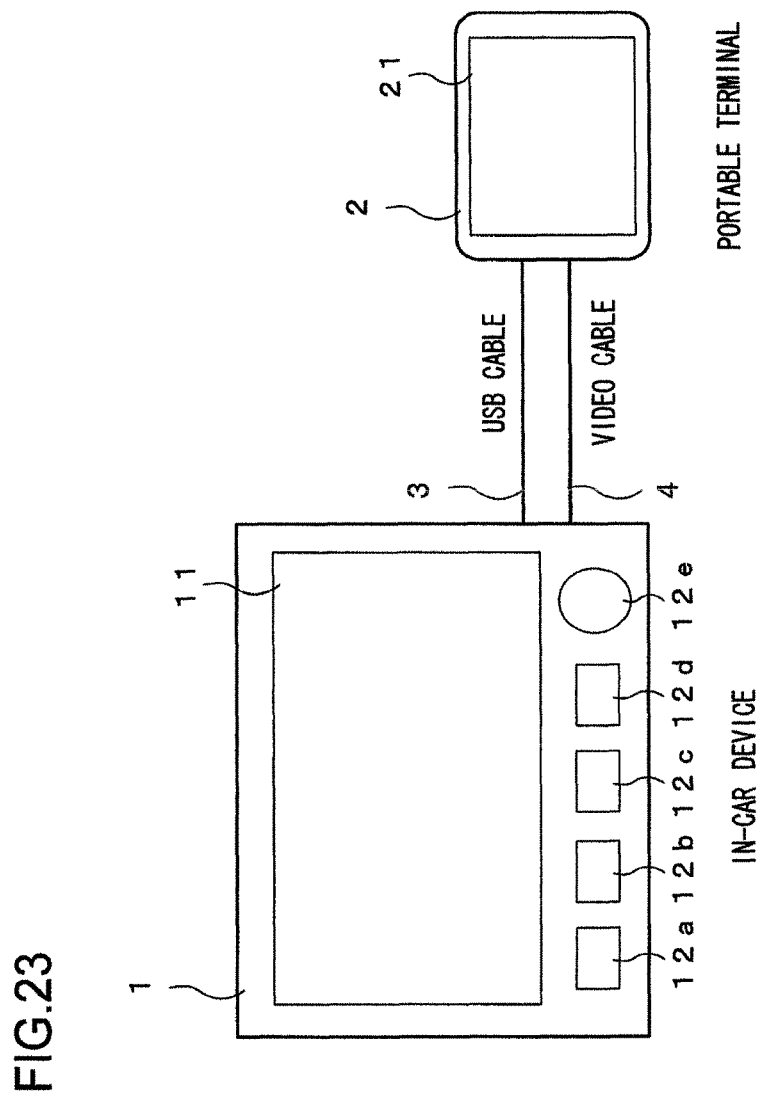
FIG. 23 is a figure showing the structure of an in-car system according to a fourth embodiment.

FIG. 23 is a figure showing the structure of the in-car information system according to this fourth embodiment of the present invention. As compared with the in-car information system of FIG. 1 that was explained above in connection with the first embodiment, the in-car information system shown in FIG. 23 differs by the feature that, in addition to the USB cable 3, the in-car device 1 and the portable terminal 2 are also connected together via a video cable 4.

Figure 24:
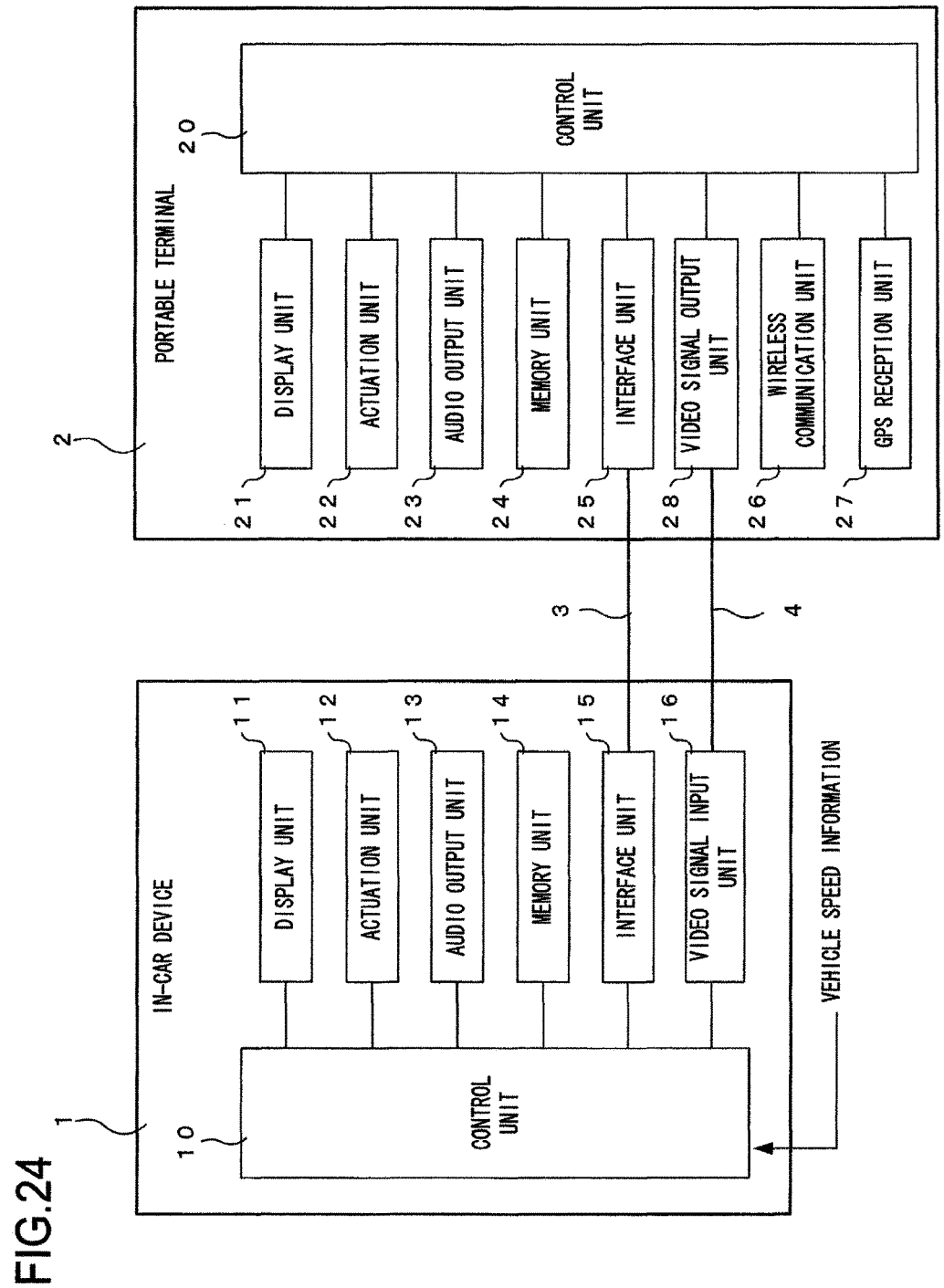
FIG. 24 is a block diagram showing the structures of an in-car device and of a portable terminal according to the fourth embodiment.

FIG. 24 is a block diagram showing the structures of an in-car device 1 and a portable terminal 2 in the in-car information system according to this embodiment. As shown in FIG. 24, in addition to a control unit 10, a display unit 11, an actuation unit 12, an audio output unit 13, a memory unit 14, and an interface unit 15 that are similar to the ones shown in FIG. 2, the in-car device 1 according to this embodiment also comprises a video signal input unit 16. On the other hand, in addition to a control unit 20, a display unit 21, an actuation unit 22, an audio output unit 23, a memory unit 24, an interface unit 25, a wireless communication unit 26, and a GPS reception unit 27 that are similar to the ones shown in FIG. 2, the portable terminal 2 also comprises a video signal output unit 28.

The video signal input unit 16 converts a video signal inputted via the video cable 4 from the portable terminal 2 into video data for screen display, and outputs that video data to the control unit 10. And, when video data is outputted to the control unit 10 from the video signal input unit 16, the control unit controls the display unit 11, and causes a screen based on this video data to be displayed upon the display unit 11.

On the other hand, in the portable terminal 2, the video signal output unit 28 converts a screen that has been created by the control unit 20 for display by the in-car device 1 into a video signal such as a composite signal or the like, and outputs this video signal to the in-car device 1 via the video cable 4. And, by this video signal being inputted to the video signal input unit 16 of the in-car device 1, it is possible to display the screen from the portable terminal 2 upon the display unit 11 of the in-car device 1.

In this embodiment, the portable terminal 2 transmits the menu screens like those explained in connection with the previously described third embodiment to the in-car device 1 by using the video signal from the video signal output unit 28. And the in-car device 1 displays these menu screens upon its display unit 11 on the basis of the video signal transmitted from the portable terminal 2.

Figure 25:
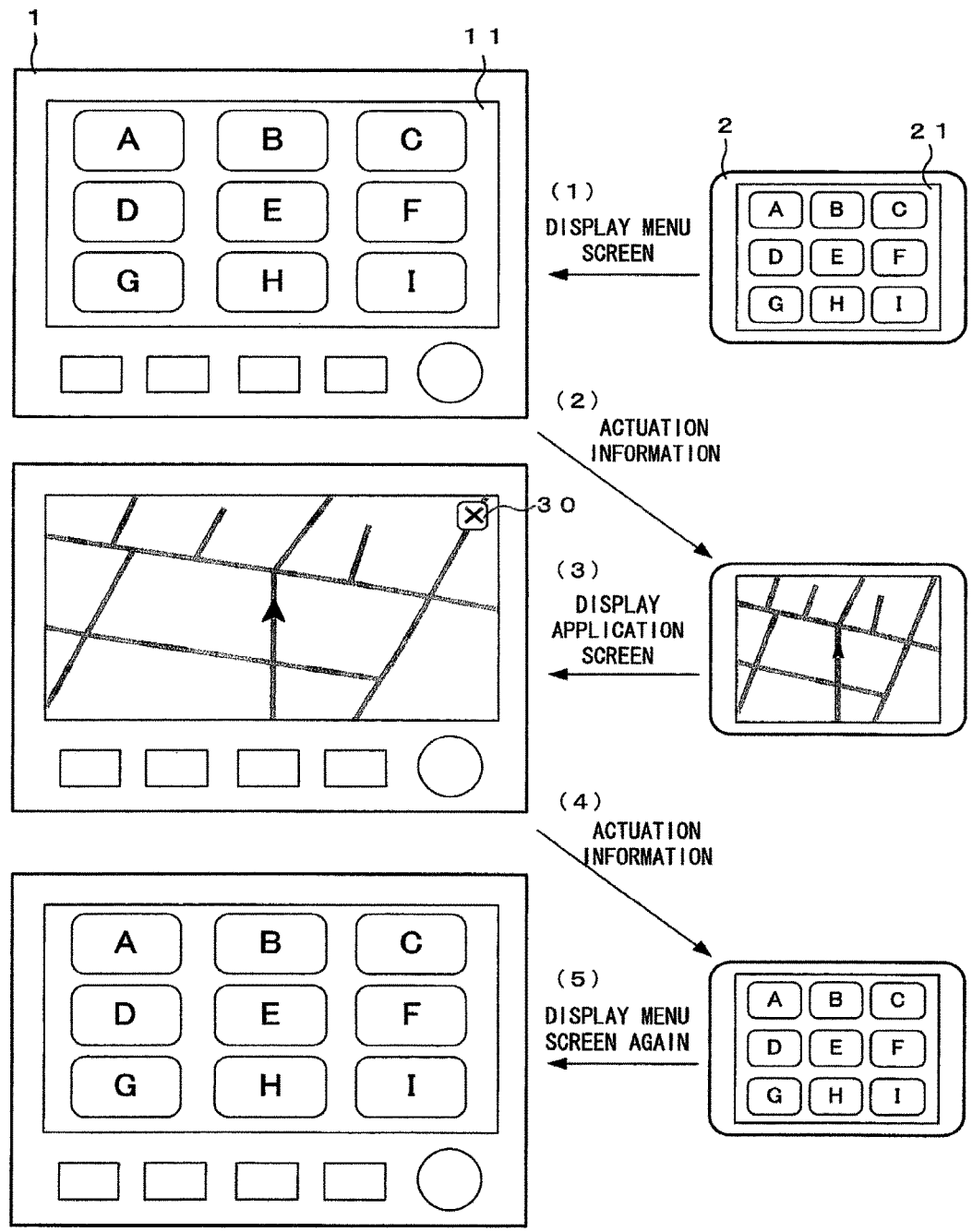
FIG. 25 is a figure showing a situation during changes of screens on the in-car device and the portable terminal, according to the fourth embodiment.

FIG. 25 is a figure showing the way in which the screens of the in-car device 1 and the portable terminal 2 change, when a menu screen is displayed on the in-car device 1 of this embodiment, and an application that has been selected by the user is executed on the portable terminal 2.

When SPMan is started on the portable terminal 2, as shown in FIG. 25, a menu screen is displayed upon the display unit 21 similar to the one shown in FIG. 18 that was explained for the previously described third embodiment.

As shown at (1) in FIG. 25, the portable terminal 2 further causes a menu screen to be displayed upon the in-car device 1. At this time the portable terminal 2 converts the menu screen for display upon the in-car device 1 into a video signal, and transmits this video signal to the in-car device 1 from the video signal output unit 28 via the video cable 4.

On the basis of this video signal transmitted from the portable terminal 2, the in-car device 1 displays upon the display unit 11 a menu screen such as the one shown in FIG. 25, this being similar to the menu screen of FIG. 18 that was explained in connection with the third embodiment previously described. It should be understood that in this embodiment as well, as explained in connection with the third embodiment, it would also be acceptable to arrange for the respective menu screens that are displayed upon the display unit 21 of the portable terminal 2 and upon the display unit 11 of the in-car device 1 to have mutually differing contents. In that case, a menu screen would be generated by the portable terminal 2 for display by the in-car device 1 that is different from the menu screen being displayed upon its own display unit 21, and this different menu screen would be transmitted to the in-car device 1 as a video signal.

When the user performs actuation to select one of the icons by actuating a button or by actuating a touch panel on the actuation unit 12 of the in-car device 1, as shown at (2), the in-car device 1 transmits to the portable terminal 2 actuation information related to the details of this actuation. At this time, as this actuation information, the in-car device 1 may output to the portable terminal 2, for example, button information that specifies the details of button actuation, or coordinate information that specifies a position on the screen of the display unit 11 that has been indicated by touch panel actuation.

Upon receipt of the actuation information from the in-car device 1, the portable terminal 2 determines which application is to be started on the basis of the actuation information that has been received from the in-car device 1, and the application that corresponds to the result of this decision is started (i.e. is executed). For example an application for navigation may be started, and this application may display a map image of the vicinity of the current position upon the display unit 21, as shown in FIG. 25. By doing the above, the application that has been selected by the user on the menu screen of the in-car device 1 is executed by the portable terminal 2. At this time, the portable terminal 2 temporarily stops SPMan.

Furthermore, the portable terminal 2 transmits to the in-car device 1 a video signal representing the screen that has been generated by this application being started, and, as shown at (3), this screen corresponding to the application is displayed by the in-car device 1. Due to this, a map screen like the one shown in FIG. 25 is displayed by the in-car device 1 upon the display unit 11. It should be understood that in this embodiment as well, as explained previously in connection with the third embodiment, in a similar manner both with the map screens and with the menu screens that are displayed upon the display unit 21 of the portable terminal 2 and upon the display unit 11 of the in-car device 1, it would also be acceptable to arrange for them to have mutually different contents. In this case, a map screen for display by the in-car device 1 will be generated by the portable terminal 2 that is different from the map screen displayed upon its display unit 21, and will be transmitted to the in-car device 1 via the video signal.

Thereafter, when an end icon like that denoted by the reference symbol 30 is selected on the in-car device 1 by the user actuating a button or actuating a touch panel using the actuation unit 12, then, as shown at (4), the in-car device 1 transmits actuation information corresponding to the details of this actuation to the portable terminal 2. When this takes place, the portable terminal 2 decides on the basis of this actuation information received from the in-car device 1 that the application is to be terminated, and stops the application that is being executed in response thereto.

When the application that is being executed has stopped, as shown at (5), the portable terminal 2 again causes the menu screen to be displayed by the in-car device 1. At this time, after SPMan, that was stopped when the application was started, has been restarted and the menu screen has been displayed once again, in a similar manner to the case at (1), the portable terminal 2 converts the menu screen to a video signal, and transmits this video signal from the video signal output unit 28 via the video cable 4 to the in-car device 1. And the menu screen is re-displayed by the in-car device 1 on the basis of this video signal.

Figure 26:
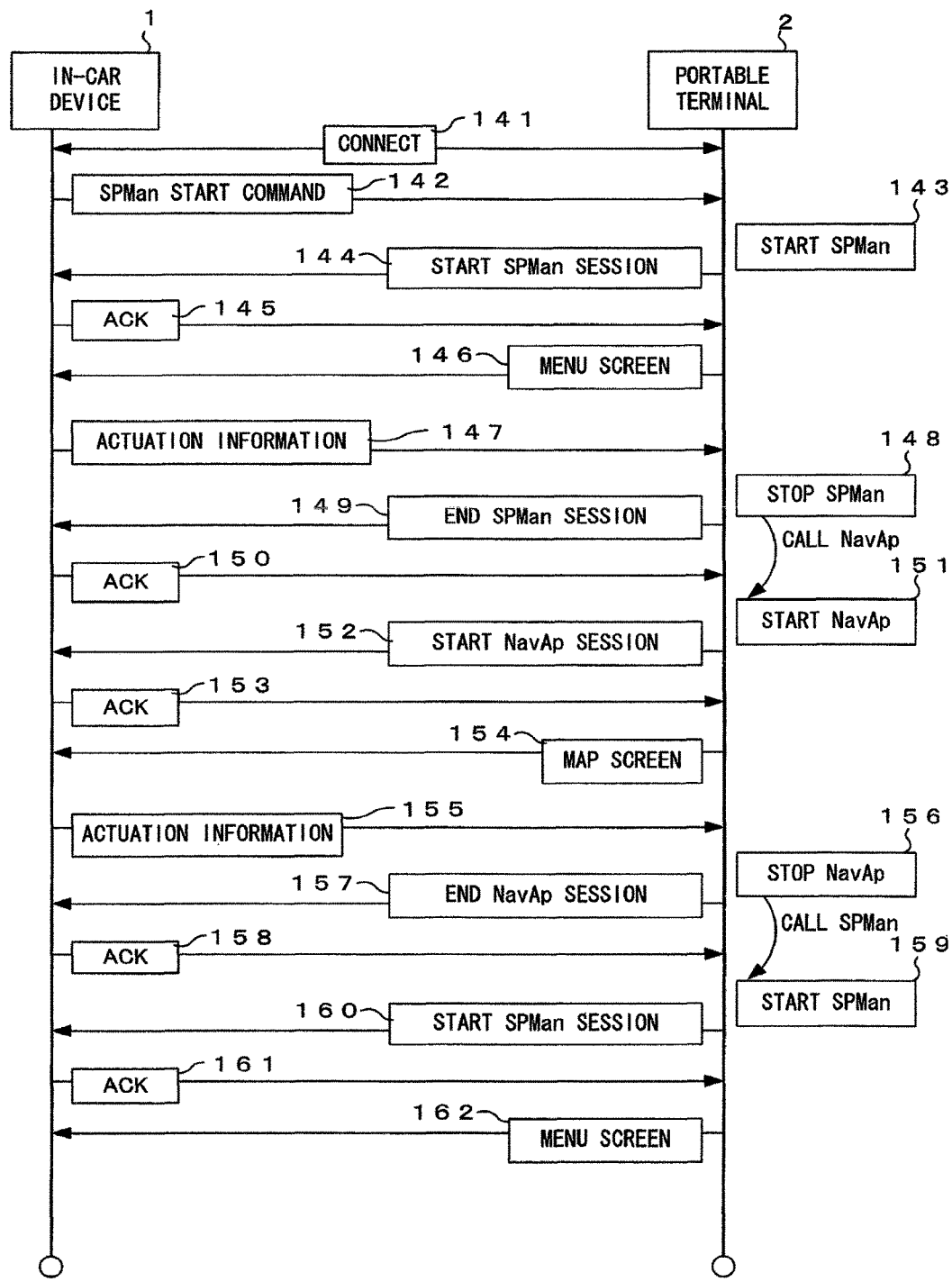
FIG. 26 is a figure showing the flow of information between the in-car device and the portable terminal, according to the fourth embodiment.

FIG. 26 is a figure showing the flow of information in this embodiment between the in-car device 1 and the portable terminal 2, when a menu screen is displayed on the in-car device 1 as described above, and an application that has been selected by the user is executed on the portable terminal 2. It should be understood that, in FIG. 26, an example is shown in which an application for navigation has been selected by the user on the in-car device 1.

When, as shown by the reference symbol 141 in FIG. 26, the in-car device 1 and the portable terminal 2 are mutually connected together, the in-car device 1 outputs a start command for SPMan to the portable terminal 2, as shown by the reference symbol 142. Upon receipt of this start command, the portable terminal 2 starts SPMan, as shown by the reference symbol 143. Due to this, a menu screen as shown in FIG. 25 is displayed upon the display unit 21 of the portable terminal 2.

When SPMan has been started, as shown by the reference symbol 144, the portable terminal 2 commands the in-car device 1 to start a SPMan session. In this SPMan session, in order to display a menu screen on the in-car device 1, a series of communication procedures between the in-car device 1 and the portable terminal 2 are prescribed. Upon receipt of the start command for a SPMan session from the portable terminal 2, the in-car device 1 outputs to the portable terminal 2 an "ACK" that signifies normal reception, as shown by the reference symbol 145.

Upon receipt of the "ACK" from the in-car device 1, the portable terminal 2 transmits the menu screen to the in-car device 1, as shown by the reference symbol 146. As previously described, this transmission of the menu screen is performed by converting the menu screen to a video signal and by outputting that video signal from the video signal output unit 28 via the video cable 4. In this manner, on the basis of the video signal received from the portable terminal 2, a menu screen like the one shown in FIG. 25 is displayed upon the display unit 11 of the in-car device 1.

It should be understood that applications on the portable terminal 2 that are not registered with SPMan are excluded from being subjects of the menu screen. In other words, a menu screen that omits icons corresponding to such applications is created, and a video signal for that menu screen is transmitted from the portable terminal 2 to the in-car device 1. Thus, the menu screen that is displayed on the display unit 11 by the in-car device 1 does not include icons corresponding to those applications that are excluded from being subjects.

Furthermore, it would also be acceptable to arrange to exclude one or more among the applications that are registered with SPMan from being subjects of the menu screen. For example, for use as the in-car device 1, there may be available various different types of device whose functions and performance and so on are different from one another, and it may be made possible to connect each of these various types of in-car device 1 to the portable terminal 2. In this type of case, for each of the applications registered with SPMan, and for each of the above types of in-car device 1, it may be set in advance on the portable terminal 2 whether or not this application is to be a subject on the menu screen. And, according to the type of the in-car device 1 to which the portable terminal 2 has been connected, a menu screen is created from which the icons that correspond to the applications that are set as being excluded as subjects are omitted, and a video signal for this menu screen is transmitted from the portable terminal 2 to the in-car device 1. Due to this, the menu screen that is displayed by the in-car device 1 upon its display unit 11 does not include any icons corresponding to those applications that are excluded from being subjects. If this is done, then, in correspondence to the type of the in-car device 1, it is possible to display menu screens of various different types, without changing the details of the applications registered with SPMan on the portable terminal 2.

When, on the menu screen displayed on the display unit 11, some position upon the screen is designated by actuation of a button or by actuation of the touch panel by the user, then, as shown by the reference symbol 147, the in-car device 1 outputs button information or coordinate information specifying the details of this actuation as actuation information. It should be understood that this outputting of the actuation information from the in-car device 1 to the portable terminal 2 may, for example, be performed by USB control communication.

Upon receipt of this actuation information from the in-car device 1, the portable terminal 2 determines, on the basis of this actuation information, which icon has been selected by the user on the menu screen. If the result is that it is determined that an icon corresponding to an application for navigation has been selected, then the portable terminal 2 stops SPMan, as shown by the reference symbol 148. At this time, as shown by the reference symbol 151, the portable terminal 2 starts the application for navigation by calling the application for navigation from SPMan (this application is referred to in FIG. 26 as "NavAp"). Thereafter, next, as shown by the reference symbol 149, the portable terminal 2 commands the in-car device 1 to end the SPMan session. By SPMan being stopped in this manner when starting the application for navigation, the menu screen transmission to the in-car device 1 is stopped by the portable terminal 2 during the interval until the next time that SPMan is restarted. Upon receipt of the end command for the SPMan session from the portable terminal 2, the in-car device 1 outputs an "ACK" to the portable terminal 2, as shown by the reference symbol 150, signifying normal receipt.

When the portable terminal 2 starts the application for navigation and its execution is commenced, a map screen like the one shown in FIG. 25 is displayed upon the display unit 21 of the portable terminal 2.

When the application for navigation has been started, as shown by the reference symbol 152, the portable terminal 2 commands the in-car device 1 to start a navigation application session. In this navigation application session, a series of communication procedures to be performed between the in-car device 1 and the portable terminal 2 in relation to the application for navigation are specified. Upon receipt of this start command from the portable terminal 2 for a navigation application session, as shown by the reference symbol 153, the in-car device 1 outputs to the portable terminal 2 an "ACK" that signifies normal reception.

Upon receipt of this "ACK" from the in-car device 1, as shown by the reference symbol 154, the portable terminal 2 transmits to the in-car device 1 a map screen of the vicinity of the current position. It should be understood that, in a similar manner to the transmission of the menu screen, this transmission of the map screen from the portable terminal 2 to the in-car device 1 is performed by converting the map screen to a video signal, and by outputting the video signal from the video signal output unit 28 via the video cable 4. And, on the basis of the video signal that is received from the portable terminal 2 in this manner, a map screen like the one shown in FIG. 25 is displayed upon the display unit 11 of the in-car device 1. At this time it would also be acceptable, for example, to arrange to transmit information for outputting a guidance voice or the like from the portable terminal 2 to the in-car device 1 by USB interrupt communication or the like, according to requirements.

Thereafter, when actuation as previously described for terminating the application for navigation is performed by the user on the in-car device 1, according to this actuation, as shown by the reference symbol 155, the in-car device 1 outputs button information or coordinate information as actuation information. It should be understood that this outputting of actuation information from the in-car device 1 to the portable terminal 2 may be performed, for example, by USB control communication.

Upon receipt of the actuation information from the in-car device 1, the portable terminal 2 decides, on the basis of this actuation information, that the user has commanded termination of the application for navigation, and accordingly stops the application for navigation, as shown by the reference symbol 156. At this time, by calling SPMan from the application for navigation, the portable terminal 2 restarts SPMan, as shown by the reference symbol 159. Due to this, the menu screen transmission to the in-car device 1 by the portable terminal 2, that was temporarily stopped, is resumed. And furthermore, as shown by the reference symbol 157, the portable terminal 2 commands the in-car device 1 to terminate the navigation application session.

Upon receipt of the end command for the navigation application session from the portable terminal 2, as shown by the reference symbol 158, the in-car device 1 outputs an "ACK" to the portable terminal 2, signifying normal reception.

After SPMan has been restarted on the portable terminal 2, the operations as previously described of the in-car device 1 and the portable terminal 2 are both repeated. In other words, as shown by the reference symbol 160, the portable terminal 2 commands the in-car device 1 to start a SPMan session. And, upon receipt of this start command for a SPMan session from the portable terminal 2, as shown by the reference symbol 161, the in-car device 1 outputs an "ACK" to the portable terminal 2, signifying normal reception. Upon receipt of this "ACK" from the in-car device 1, as shown by the reference symbol 162, the portable terminal 2 transmits a menu screen video signal to the in-car device 1. In this manner, the in-car device 1 re-displays a menu screen like that shown in FIG. 25 upon the display unit 11 on the basis of the video signal that has been received from the portable terminal 2.

It should be understood that, when any one of the icons on the menu screen displayed upon the display unit 11 is selected by the user, a similar operation to that explained in the above description for the application for navigation is performed by both the in-car device 1 and the portable terminal 2. In other words, on the basis of the actuation information outputted from the in-car device 1, the portable terminal 2 determines that an icon has been selected by the user, and starts an application that corresponds to that icon. At this time, the portable terminal 2 stops SPMan, and commands the in-car device 1 to end the SPMan session. Subsequently, a session is started corresponding to the application that was started.

Furthermore, when an actuation for terminating the application that is being executed is performed by the user of the in-car device 1, in response to this actuation, the in-car device 1 outputs the actuation information to the portable terminal 2. And, upon receipt thereof, the portable terminal 2 determines that the user has commanded termination of the application, and, along with terminating the application that is being executed and terminating the session that corresponds to that application, also restarts SPMan.

Figure 27:
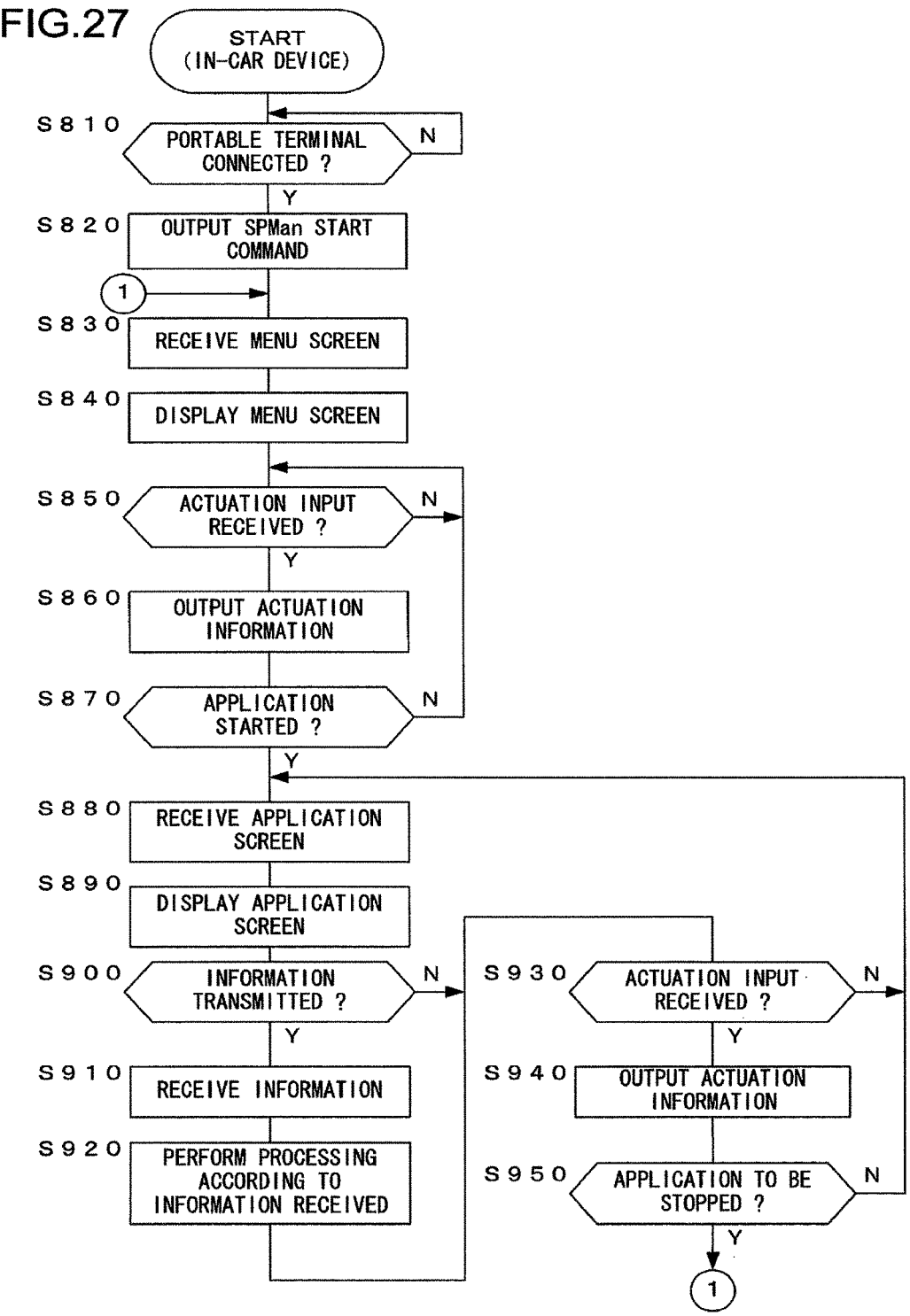
FIG. 27 is a flow chart of processing performed by the in-car device, according to the fourth embodiment.
Figure 28:
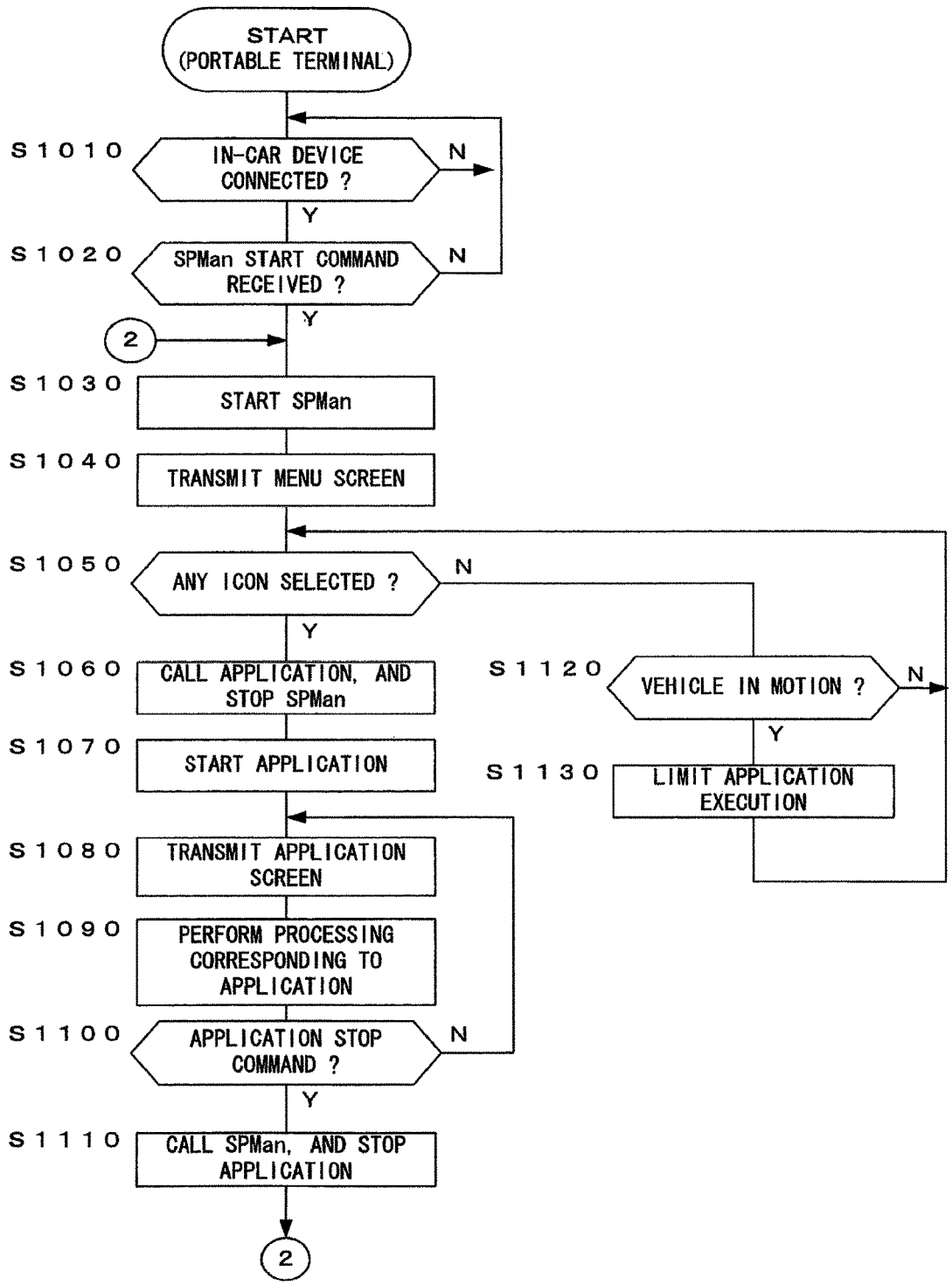
FIG. 28 is a flow chart of processing performed by the portable terminal, according to the fourth embodiment.

Flow charts for the processing executed by the in-car device 1 and by the portable terminal 2 according to this embodiment are respectively shown in FIGS. 27 and 28. FIG. 27 is a flow chart for the processing performed by the in-car device 1, while FIG. 28 is a flow chart for the processing performed by the portable terminal 2.

First, the flow chart of FIG. 27 will be explained. The processing shown in the flow chart of FIG. 27 is executed by the control unit 10 of the in-car device 1.

First in a step S810 the control unit 10 makes a decision as to whether or not a portable terminal 2 is connected. If the in-car device 1 and the portable terminal 2 are connected together via the USB cable 3 and the video cable 4 as shown in FIG. 23, then the flow of control proceeds to the next step S820.

In this step S820 the control unit 10 outputs a start command for SPMan to the portable terminal 2. This outputting of the start command for SPMan is performed via the interface unit 15 and the USB cable 3. It should be understood that, if SPMan is already started upon the portable terminal 2, then there is no need to output a start command for SPMan again.

Then in a step S830 the control unit 10 receives the menu screen that has been transmitted from the portable terminal 2 due to the portable terminal 2 starting SPMan in response to the start command for SPMan that was outputted in the step S820. Here, due to the step S1040 of FIG. 28 that will be explained hereinafter being executed by the portable terminal 2, a menu screen video signal is transmitted from the portable terminal 2 via the video cable 4, and is inputted to the video signal input unit 16. The video signal input unit 16 converts this video signal that has been inputted into video data for screen display, and then outputs this video data to the control unit 10. Due to this, the menu screen is received by the control unit 10.

Then in a step S840, on the basis of the menu screen video signal that was received in the step S830, the control unit 10 displays a menu screen like the one shown in FIG. 25 upon the display unit 11.

Then in a step S850 the control unit 10 makes a decision as to whether or not any actuation input has been performed from the user. If the user has performed button actuation or touch panel actuation in order to select any one of the icons on the menu screen, then the flow of control proceeds to the next step S860.

In this step S860, corresponding to the actuation input from the user that was performed in the step S850, the control unit 10 outputs to the portable terminal 2, as actuation information, button information that specifies the button, or coordinate information that specifies the position on the screen, that was designated by that actuation. This outputting of the actuation information is performed via the interface unit 15 and the USB cable 3.

Then in a step S870 the control unit 10 makes a decision as to whether or not any application has been started on the portable terminal 2. If an application has been started on the portable terminal 2 due to the actuation information that was outputted in the step S860, then, as previously described, a SPMan session end command and a session start command for the application that has been started are issued from the portable terminal 2 to the in-car device 1. In this case the control unit 10 decides that an application has been started, and the flow of control proceeds to the next step S880. On the other hand, if a SPMan session end command and an application session start command have not been issued from the portable terminal 2, then the control unit 10 decides that no application has been started, and the flow of control returns to the step S850.

In the step S880 the control unit 10 receives the application screen transmitted from the portable terminal 2. Here, due to the step S1080 of FIG. 28 that will be explained hereinafter being executed by the portable terminal 2, a video signal for an application screen corresponding to the application that is being executed by the portable terminal 2 is transmitted from the portable terminal 2 via the video cable 4, and is inputted to the video signal input unit 16. And the video signal input unit 16 converts the video signal that has thus been inputted into video data for screen display, and then outputs this video data to the control unit 10. Due to this, the application screen is received by the control unit 10.

Then in a step S890, on the basis of the application screen video signal that was received in the step S880, the control unit 10 displays upon the display unit 11 the application screen corresponding to the application that is being executed by the portable terminal 2. Due to this, when for example an application for navigation is being executed, a map screen as shown in FIG. 25 is displayed upon the display unit 11.

Then in the step S900 the control unit 10 makes a decision as to whether or not any information is being transmitted by the application that is being executed by the portable terminal 2. If transmission of any information is being performed from the portable terminal 2 to the in-car device 1, then the flow of control proceeds to a step S910, whereas if no such information is being transmitted then the flow of control is transferred to a step S930.

In the step S910 the control unit 10 receives information from the portable terminal 2. Here, by processing corresponding to the application that is being executed in a step S1090 of FIG. 28 that will be explained hereinafter, information related to the result of this processing is transmitted from the portable terminal 2 via the USB cable 3, and is received using the interface unit 15. Due to this, when for example an application for navigation is being executed, information such as a guidance voice or the like that is transmitted from the portable terminal 2 is received.

Then in a step S920 the control unit 10 performs processing according to the information that was received from the portable terminal 2 in the step S910. For example, when information for a guidance voice due to an application for navigation has been received from the portable terminal 2, then a guidance voice is outputted from the audio output unit 13 on the basis of this information.

In the step S930, the control unit 10 makes a decision as to whether or not actuation input has been performed by the user. If the user has performed any button actuation or touch panel actuation for selecting any icon upon the application screen that was displayed in the step S890 by the application currently being executed by the portable terminal 2, or if actuation to terminate the application has been performed as previously described, then the flow of control proceeds to the next step S940.

In this step S940, in response to the actuation input from the user that was made in the step S930, the control unit 10 outputs to the portable terminal 2 actuation information specifying the details of the actuation, in a similar manner to the case for the step S860. Due to this, when for example the user has performed actuation to change the scale ratio of a map upon an application screen for navigation, actuation information specifying the details of this actuation is transmitted to the portable terminal 2. After, upon receipt of this actuation information, the portable terminal 2 has changed the scale ratio of the map in the step S1090 of FIG. 28, then a map screen according to the scale ratio after change is transmitted to the in-car device 1.

Then in a step S950 the control unit 10 makes a decision as to whether or not the application that is being executed upon the portable terminal 2 is to be stopped. For example, if termination actuation for the application as previously described is performed by the user and actuation information corresponding to this actuation is transmitted to the portable terminal 2 in the step S940, then the application that is being executed by the portable terminal 2 is stopped, and SPMan is restarted. When this is done, as previously described, a session end command for the application that is being executed and a start command for a SPMan session are issued from the portable terminal 2 to the in-car device 1. In this case, the control unit 10 decides that the application that is being executed has been stopped and returns the flow of control to the step S830, and the menu screen is transmitted from the portable terminal 2 and is received once again. On the other hand, if no end actuation for the application has been made by the user, and no session end command for the application that is being executed and no SPMan session start command have arrived, then it is decided that the application that is being executed has not been stopped, and the flow of control is returned to the step S880.

It should be understood that, in the flow chart of FIG. 27 explained above, if the application that is being executed by the portable terminal 2 is not endowed with any function of cooperating with the in-car device 1, and is not capable of decoding actuation information from the in-car device 1, then it would also be acceptable to arrange not to execute the step S940, and not to output any actuation information from the in-car device 1 to the portable terminal 2. In this case, when actuation is performed by the user on the in-car device 1 to terminate the application, it is desirable, by returning to the step S820, to output a SPMan start command from the in-car device 1 to the portable terminal 2, so as to cause SPMan to be restarted. Furthermore, in a similar manner, if no application, including SPMan, is being performed upon the portable terminal 2, then it will be acceptable not to output any actuation information from the in-car device 1 to the portable terminal 2. In this case, it would be acceptable to cause a SPMan start command to be outputted from the in-car device 1 to the portable terminal 2, when some predetermined actuation is performed upon the in-car device 1.

Next, the flow chart of FIG. 28 will be explained. The processing shown in the flow chart of FIG. 28 is executed by the control unit 20 of the portable terminal 2.

First in a step S1010 the control unit 20 makes a decision as to whether or not any in-car device 1 is connected. If the in-car device 1 and the portable terminal 2 are connected together via the USB cable 3 and the video cable 4 as shown in FIG. 23, then the flow of control proceeds to the next step S1020.

In this step S1020 the control unit 20 makes a decision as to whether or not a SPMan start command has been received from the in-car device 1. If a SPMan start command that has been outputted from the in-car device 1 due to the step S820 of FIG. 27 being executed by the in-car device 1 has been received, then the control unit 20 advances the flow of control to the next step S1030. It should be understood that, if SPMan has already been started, then the processing of this next step S1030 is omitted, and the flow of control proceeds to a step S1040. On the other hand, if no SPMan start command has been received from the in-car device 1, then the flow of control returns to the step S1010.

In the step S1030 the control unit 20 starts SPMan. Due to this, when an SPMan start command is received from the in-car device 1, SPMan is started upon the portable terminal 2 in response thereto, and a menu screen like that shown in FIG. 25 is displayed upon the display unit 21.

In the step S1040 the control unit 20 transmits a menu screen to the in-car device 1. Here, as previously described, a menu screen is generated upon which are arranged the icons corresponding to the applications that are registered with SPMan, that was started in the step S1030, and is outputted to the video signal output unit 28. And the video signal output unit 28 converts this menu screen that has been outputted from the control unit 20 to a video signal, and transmits this video signal to the in-car device 1 via the video cable 4.

Then in a step S1050 the control unit 20 makes a decision as to whether or not, on the in-car device 1, any icon has been selected upon the menu screen due to input actuation from the user. If, by the step S860 of FIG. 27 being executed on the in-car device 1, actuation information has been outputted, and this actuation information is button information specifying that some icon has been selected upon the menu screen, or is coordinate information specifying a position that corresponds to some icon, then the control unit 20 advances the flow of control to a step S1060. On the other hand, if no actuation information has been received from the in-car device 1, or if the actuation information that has been received is button information specifying details of some actuation other than icon selection, or is coordinate information specifying some position that does not correspond to any icon upon the menu screen, then it is determined that no icon has been selected, and the flow of control is transferred to a step S1120.

In the step S1060 the control unit 20, along with calling the application corresponding to the icon that was selected in the step S1050 from SPMan, that is currently being executed, also stops SPMan. And in the next step S1070 the control unit 20 starts the application that was called in the step S1060. Due to this, when some icon corresponding to an application is selected by input actuation from the user on the in-car device 1, then the application corresponding thereto is started by the portable terminal 2 after SPMan has been stopped.

Then in a step S1080 the control unit 20 transmits an application screen generated by execution of the application that was started in the step S1070 to the in-car device 1. Here, as previously described, the application screen that has been generated is outputted from the control unit 20 to the video signal output unit 28, and this application screen is then transmitted by being converted by the video signal output unit 28 into a video signal and being transmitted via the video cable 4 to the in-car device 1. By doing this, when for example an application for navigation is being executed, a map screen of the vicinity of the current position is transmitted to the in-car device 1.

Then in a step S1090 the control unit 20 performs processing corresponding to the application that has been started in the step S1070. At this time, according to requirements, information related to the results of processing by the application that is being executed is transmitted from the portable terminal 2 to the in-car device 1. This transmission of information is performed via the interface unit 25 and the USB cable 3. Due to this, when for example an application for navigation is being executed, information for a guidance voice corresponding to guidance timing for the vehicle is transmitted to the in-car device 1. Moreover, when the user performs actuation to change the scale ratio of the map, processing to change the scale ratio of the map according to this actuation is performed in this step S1090. In this case, a map screen according to the scale ratio after change is transmitted to the in-car device 1 by the flow of control being returned from the next step S1100 to the step S1080.

In the step S1100, the control unit 20 makes a decision as to whether or not a stop command for the application that is being executed has been issued from the in-car device 1. If actuation information has been outputted by the in-car device 1 due to the step S940 of FIG. 27 being executed, and this actuation information specifies termination actuation for the application, then the control unit 20 decides that this is a stop command for the application that is being executed, and the flow of control proceeds to a step S1110. But on the other hand, if no such actuation information specifying termination actuation for the application has been received from the in-car device 1, then the control unit 20 returns the flow of control to the step S1080, and the application screen transmission and the processing corresponding to the application that is being executed are continued.

In the step S1110, along with calling SPMan from the application that was started in the step S1070, the control unit 20 stops that application. When the step S1110 has been executed, the control unit 20 returns the flow of control to the step S1030 and restarts SPMan. Thereafter, processing as described above is repeated. It should be understood that it would also be acceptable to arrange to stop the application that is being executed by executing the processing of the step S1110 and to restart SPMan, in some case other than when it has been determined in the step S1100 that a stop command for the application has been issued from the in-car device 1. For example, it is possible to stop the application that is being executed by executing the processing of the step S1110 and to restart SPMan, when the user of the portable terminal 2 performs predetermined actuation to terminate the application, or the like.

Then in the step S1120 the control unit 20 makes a decision as to whether or not the vehicle is currently in motion. Here, as previously described, this decision as to whether or not the vehicle is currently in motion is made on the basis of the vehicle speed information that is outputted from the in-car device 1 to the portable terminal 2 at predetermined intervals. If it is decided that the vehicle is currently in motion then the flow of control proceeds to a step S1130, whereas if it is decided that the vehicle is currently stopped then the flow of control returns to the step S1050.

In the step S1130 the control unit 20 performs limitation of execution of applications for which execution is prohibited while the vehicle is in motion. At this time, as previously described, for each application that is registered with SPMan, the control unit 20 decides whether or not execution thereof is permitted while the vehicle is in motion. And, along with prohibiting the execution of applications for which execution while the vehicle is in motion is not permitted, as explained in connection with the previously described third embodiment, the display mode on the menu screen for the icons that correspond to those applications is changed to a different mode from the mode while the vehicle is stopped. After limitation of execution of applications has been performed in this manner, the flow of control returns to the step S1050.

According to the fourth embodiment as explained above, the following beneficial operational effects may be obtained.

(19) Due to the processing by the control unit 20, the portable terminal 2 executes software that is stored in advance. On the other hand, the in-car device 1 inputs actuation by the user upon the actuation unit 12, and transmits information corresponding to this actuation to the portable terminal 2. Furthermore, it issues notifications to the user via the display unit 11. In concrete terms, due to the processing by the control unit 20, the portable terminal 2 transmits (in the step S1040) to the in-car device 1 a menu screen that includes a plurality of icons, each respectively corresponding to one of a plurality of applications that can be executed by the portable terminal 2. And, on the basis of the coordinate information transmitted from the in-car device 1 in the step S860 and determines which is the icon that has been selected upon the menu screen by the user actuates the actuation unit 12 of the in-car device 1 (in a step S1050), and puts the application that corresponds to this icon into the running state (in the step S1070). On the other hand, due to the processing by the control unit 10, the in-car device 1 receives this menu screen from the portable terminal 2 (in the step S830), and issues a notification to the user by displaying this menu screen upon the display unit 11 (in the step S840). Since it is arranged to do this, accordingly it is possible, by actuation of the in-car device 1, to select and to execute any desired function, among the functions of various types that are provided to the portable terminal 2. Due to this, it is possible to establish a correspondence between the details of actuation of the in-car device 1 and the details of operations on the portable terminal 2 in a simple and easy manner.

(20) Furthermore, due to the processing by the control unit 20, when it is determined that some icon has been selected by the user in the step S1050, SPMan is put into the stopped state (in the step S1060). Due to this, the output of the menu screen is stopped by the step S1040 before the application is put into the running state in the step S1070. Since it is arranged to do this, accordingly, if it is not possible to execute a plurality of applications at the same time on the portable terminal 2, it is possible to change over from SPMan to the application that corresponds to an icon that has been selected by the user.

(21) Yet further, due to the processing by the control unit 20, when the application that was put into the running state in the step S1070 is stopped by the step S1110, the portable terminal 2 returns the flow of control to the step S1030 and restarts SPMan. Due to this, the outputting of the menu screen is resumed by the step S1040. Since it is arranged to do this, accordingly, if it is not possible to execute a plurality of applications at the same time on the portable terminal 2, it is possible to change over from the application whose execution has been stopped to SPMan.

(22) And, due to the processing by the control unit 10, when actuation to terminate an application has been performed by the user, the in-car device 1 transmits actuation information corresponding to that actuation to the portable terminal 2 (in the step S940), as a resume command for resumption of the output of the main screen by the portable terminal 2 in the step S1040. When this is done, the portable terminal 2 determines (in the step S1100) that termination of the application that is being executed has been commanded by the user on the basis of the actuation information that has been received, and restarts SPMan (in the step S1030) and resumes the output of the menu screen in the step S1040. Since it is arranged to do this, accordingly, when the user has actuated the in-car device 1 and has issued a command for the application that is being executed to be stopped, along with it being possible reliably to put the application that is being executed upon the portable terminal 2 into the stopped state, also it is possible to perform changeover from that application to SPMan automatically, so that it is possible to prepare for the next actuation performed by the user.

(23) Moreover, due to the processing by the control unit 20, the portable terminal 2 determines whether or not the vehicle is in motion (in the step S1120), and, if it has determined that the vehicle is in motion, then it prohibits (in the step S1130) execution of predetermined applications among the plurality of applications that can be executed by the portable terminal 2. Since it is arranged to do this, accordingly it is possible to prevent the execution by the portable terminal 2 of applications that, from the point of view of safety or ease of operation, are not appropriate while the vehicle is in motion, so that it is possible to ensure security and ease of use while the vehicle is in motion.

(24) Even further, due to the processing by the control unit 20, it is arranged for the portable terminal 2 to change over, in the step S1130, the display mode on the menu screen for icons that correspond to applications for which the execution is prohibited during motion of the vehicle to a different mode from their display mode when the vehicle is stopped. Due to this, it is possible to inform the user in an easily understandable manner of the fact that execution of the applications corresponding to these icons is prohibited while the vehicle is in motion.

Embodiment #5

Next, a fifth embodiment of the present invention will be explained. In this fifth embodiment, an example is explained of an in-car information system in which the contents of the screens outputted from the portable terminal 2 to the in-car device 1 are determined according to the resolution of the display unit 11 of the in-car device 1. It should be understood that the structure of the in-car information system according to this embodiment is the same as the structure of the fourth embodiment shown in FIG. 23, and it will be supposed that the in-car device 1 and the portable terminal 2 are mutually connected together via a USB cable 3 and a video cable 4. Moreover, the structures of the in-car device 1 and of the portable terminal 2 are respectively the same as the structures of the corresponding devices in the fourth embodiment shown in FIG. 24.

Figure 29:
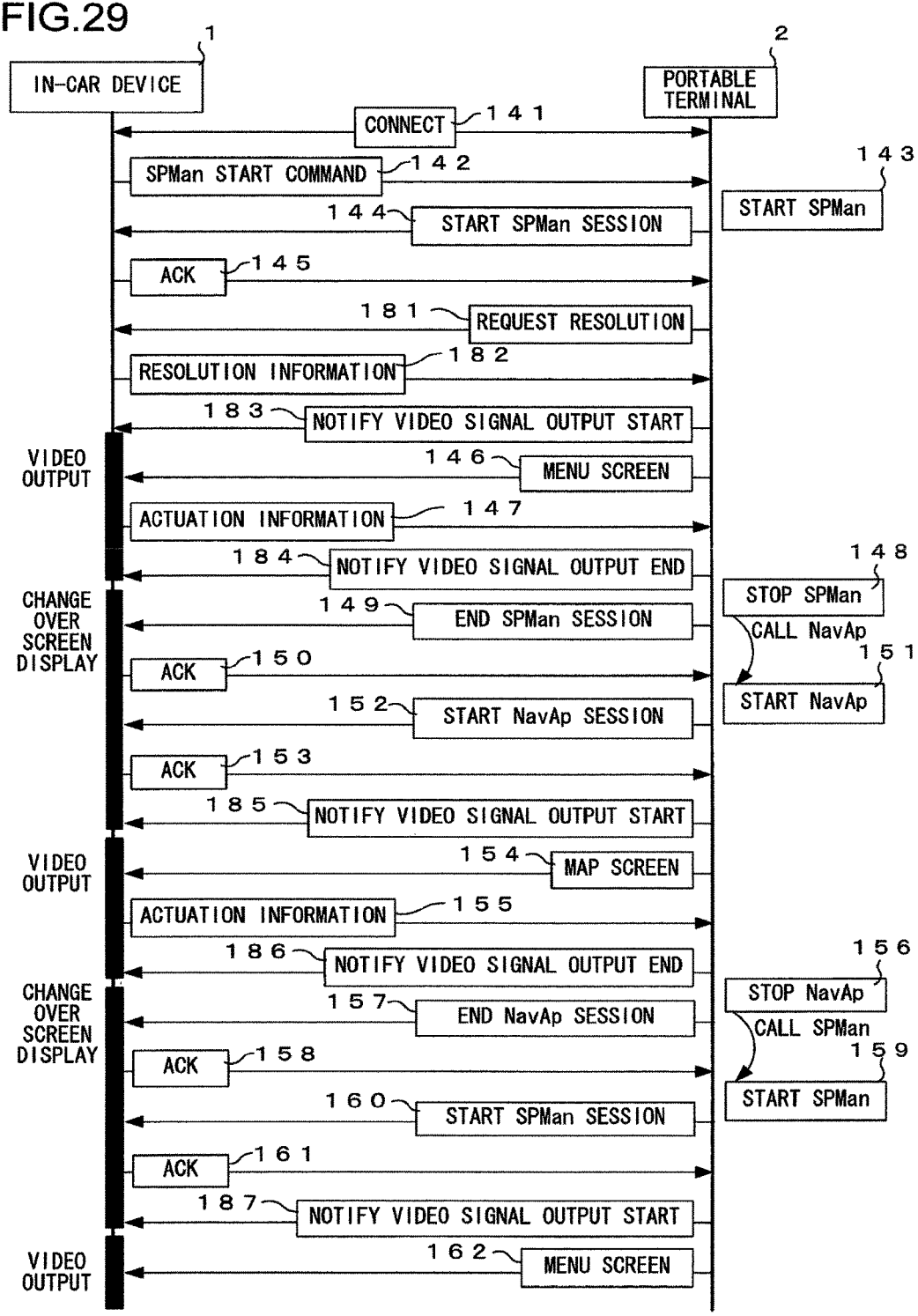
FIG. 29 is a figure showing the flow of information between an in-car device and a portable terminal according to a fifth embodiment.

FIG. 29 is a figure showing the flow of information in the in-car information system according to this embodiment between the in-car device 1 and the portable terminal 2 when a menu screen is displayed upon the in-car device 1 and an application is executed by the portable terminal 2. It should be understood that, in FIG. 29, the same reference symbols are appended to portions that have the same content as corresponding portions of the flow of information in the in-car information system according to the fourth embodiment shown in FIG. 26. And, unless particularly required, in the following description explanation for these portions to which the same reference symbols are appended as in FIG. 26 is omitted.

When the start of a SPMan session is commanded from the portable terminal 2 to the in-car device 1 (at the reference symbol 144), and an "ACK" in response thereto is transmitted from the in-car device 1 to the portable terminal 2 (at the reference symbol 145), the portable terminal 2 then outputs to the in-car device 1 a resolution request for the resolution of the display unit 11 possessed by the in-car device 1, as shown by the reference symbol 181. It should be understood that this outputting of a resolution request by the portable terminal 2 is performed due to the processing by the control unit 20, via the interface unit 25 and the USB cable 3. And this resolution request is received from the portable terminal 2 by the in-car device 1 via the interface unit 15, and the details thereof are determined by the control unit 10.

Upon receipt of the resolution request from the portable terminal 2, the in-car device 1 transmits resolution information to the portable terminal 2 related to the resolution of the display unit 11, as shown by the reference symbol 182. At this time, as resolution information, the in-car device 1 transmits information such as, for example, the size of the screen of the display unit 11 and the number of pixels thereof vertically and horizontally and so on. It should be understood that this transmission of resolution information by the in-car device 1 is performed due to the processing by the control unit 10, via the interface unit 15 and the USB cable 3. This resolution information is received by the portable terminal 2 from the in-car device 1 via the interface unit 25, and the details thereof are determined by the control unit 20.

Upon receipt of the resolution information from the in-car device 1, due to the processing by the control unit 20, as shown by the reference symbol 183, the portable terminal 2 notifies the in-car device 1 of the start of video signal output. And, upon receipt of this notification, the in-car device 1 starts to output video to the display unit 11 on the basis of a video signal. It should be understood that, in the interval up until now, no video output on the basis of any video signal has been provided to the display unit 11 by the in-car device 1.

After the start of video signal output has been notified to the in-car device 1 as described above, the portable terminal 2 starts transmission of a menu screen (at the reference symbol 146). At this time, the portable terminal 2 determines the content of the menu screen that is transmitted on the basis of the resolution information that has been received from the in-car device 1. For example, the content of the menu screen may be determined by, according to the resolution information, for the various structural elements used upon the menu screen such as letters, lines, icons and so on, changing the sizes and/or fonts of the letters, the thicknesses and/or hues of the lines, the sizes of the icons and/or the gaps between adjacent icons, and so on. It should be understood that, also for screen structural elements other than letters, lines, and icons as well, it is possible to determine the ones to be used according to contents corresponding to these screen structural elements.

FIG. 30 shows an example of a table that is referred to while the display elements of the menu screen are being determined by the portable terminal 2. In this example, the sizes of the letters that are used for screen display are shown in numbers of points, corresponding to screen sizes of 7 inches, 6 inches, 5 inches, and 4.3 inches, and to numbers of pixels 800×480 and 400×240. A table of this type is stored in advance by the portable terminal 2 in the memory unit 24 or the like. When the resolution information is received from the in-car device 1, due to processing by the control unit 20, the portable terminal 2 determines the size of the letters to be used by referring to the corresponding portion of the table, on the basis of the information for the display unit 11 about the screen size and the number of pixels thereon that is included in this resolution information. The screen structural elements may be determined on the basis of the resolution information in this way, for example. It should be understood that the table shown in FIG. 30 is only an example, and its contents should not be considered as being limitative.

While in the above described example a case has been explained in which the sizes of the letters are determined, other screen structural elements may be determined by similar methods. Or it would also be acceptable to use some other method and not to refer to a table. For example, it would be possible to arrange to determine the sizes of letters and/or the thicknesses of lines by using a predetermined calculation equation.

Furthermore, while in the example described above an example was explained in which the resolution information was expressed in terms of the screen size of the display unit 11 and its number of pixels vertically and horizontally, it would also be acceptable to arrange to express the resolution information using some other data. For example, it would be possible to express the resolution information using the density of the pixels, the pixel size, the vertical to horizontal aspect ratio, or the like. Or, if the types of the in-car devices 1 that can be connected to the portable terminal 2 are determined in advance, it would be possible to arrange to store a resolution for each type of in-car device 1 in advance in the portable terminal 2, and to transmit information specifying the type of the in-car device 1 that has been connected from the in-car device 1, as resolution information.

When, from the actuation information transmitted from the in-car device 1 (at the reference symbol 147), it is decided that an icon corresponding to an application for navigation has been selected, then, due to the processing by the control unit 20, the portable terminal 2 notifies the in-car device 1 of the end of video signal output, as shown by the reference symbol 184. And, upon receipt of this notification, due to the processing by the control unit 10, the in-car device 1 stops the video output which is based upon the video signal to the display unit 11, and starts a predetermined screen changeover display. Here, for example, the screen changeover display may be started by displaying upon the display unit 11 a message to the effect that changing over of the screen is taking place, or a screen effect animation that shows that changing over of the screen is taking place, or the like.

On the other hand, after the portable terminal 2 has notified the in-car device 1 of the end of video signal output, it calls the application for navigation from SPMan and stops SPMan (at the reference symbol 148). Thereafter the application for navigation is started, and the in-car device 1 is commanded to start a navigation application session (at the reference symbol 152). When in response thereto an "ACK" is received from the in-car device 1 (at the reference symbol 153), the portable terminal 2 notifies the in-car device 1 of the start of video signal output (at the reference symbol 185), as it did at the reference symbol 183. And, upon receipt of this notification, the in-car device 1 terminates the screen changeover display described above, and starts video output to the display unit 11 on the basis of the video signal once again.

After the start of video signal output has been notified to the in-car device 1 as described above, the portable terminal 2 starts transmission of the map screen (at the reference symbol 154). At this time, in a similar manner to the case for the menu screen, the portable terminal 2 determines the content of the map screen to be transmitted on the basis of the resolution information that was previously received from the in-car device 1 at the reference symbol 182. In other words, the content of the map screen may be determined by, for each screen structural element used upon the map screen such as letters, lines, icons, and the like, changing, for example, the sizes and/or fonts of the letters, the thicknesses and/or hues of the lines, the sizes of the icons and/or the gaps between adjacent icons, and so on, according to the resolution information.

When actuation information that commands the termination of the application for navigation is transmitted (at the reference symbol 155) from the in-car device 1, in a similar manner to the case at the reference symbol 184, the portable terminal 2 notifies the in-car device 1 of the end of video signal output (at the reference symbol 186). Upon receipt of this notification, as previously described, the in-car device 1 stops the video output to the display unit 11 on the basis of the video signal, and starts a predetermined screen changeover display. On the other hand, the portable terminal 2 calls SPMan from the application for navigation and stops the application for navigation (at the reference symbol 156), and issues a start command for a SPMan session to the in-car device 1 (at the reference symbol 160) after having restarted SPMan.

Thereafter, the in-car device 1 and the portable terminal 2 both repeat their operations described above. In other words, when the portable terminal 2 receives an "ACK" from the in-car device 1 in response to the start command for a SPMan session (at the reference symbol 161), in a similar manner to the case at the reference symbols 183 and 185, it notifies the in-car device 1 of the start of video signal output (at the reference symbol 187). And, upon receipt of this notification, the in-car device 1 terminates the screen changeover display, and starts video output to the display unit 11 on the basis of the video signal once again. On the other hand, the portable terminal 2 transmits the menu screen to the in-car device 1 (at the reference symbol 162), and the menu screen is re-displayed upon the display unit 11 of the in-car device 1.

According to the fifth embodiment as explained above, the following beneficial operational effects may be obtained.

(25) Due to the processing by the control unit 20, the portable terminal 2 receives the resolution information transmitted from the in-car device 1 related to the resolution of the display unit 11, and changes the contents of the menu screen or the map screen transmitted to the in-car device 1 on the basis thereof. Since it is arranged to do this, accordingly it is possible for the in-car device 1 to display a screen that appropriately corresponds to the resolution of its display unit 11. Moreover, even if there are available in-car devices 1 of various types the resolution of whose display units 11 are mutually different, and any one of them may be connected to the portable terminal 2, still it is possible for these in-car devices 1 to display optimized map screens upon their display units 11.

(26) Due to the processing by the control unit 20, when changing over a screen such as the menu screen or the map screen or the like to some other screen, the portable terminal 2 transmits notifications to the in-car device 1 for the start and the end of video signal output. And, in response to these notifications, it is arranged for a predetermined screen changeover display to be provided by the in-car device 1, due to the processing by the control unit 10. Because of this, it is possible to prevent flickering or the like occurring during the screen changeover, and it is also possible to ensure that the user does not suffer a sense of unease due to the screen going blank.

It should be understood that in the fifth embodiment as explained above, after a SPMan session has been started, and before transmission of the menu screen from the portable terminal 2 to the in-car device 1, a resolution request is outputted from the portable terminal 2 to the in-car device 1, and in response thereto resolution information is transmitted from the in-car device 1 to the portable terminal 2. It is arranged for the portable terminal 2 to determine the contents of the menu screen and of the map screen, by using this resolution information. However, the timings of the output of the resolution request from the portable terminal 2 and of the transmission of resolution information from the in-car device 1 are not to be considered as being limited to those in the above example. For example, a case may be considered in which only the content of the map screen is changed according to the resolution of the display unit 11, while the menu screen has generally compatible content. In this case it will be acceptable, when a SPMan session is started, not to output any resolution request from the portable terminal 2 to the in-car device 1, but rather to output a resolution request from the portable terminal 2 when the application for navigation is started and a navigation application session is started, and to transmit resolution information from the portable terminal 2 in response thereto. In this manner, it is acceptable to arrange to perform output of a resolution request from the portable terminal 2 and transmission of the resolution information from the in-car device 1, only when a necessity arises for the portable terminal 2 to create a screen having contents that correspond to the resolution of the display unit 11.

Embodiment #6

Next, a sixth embodiment of the present invention will be explained. In this embodiment an example is explained in which if, as the in-car device 1, a device is employed that does not support any video signal input from the exterior, then the method of screen output to the in-car device 1 is determined by the portable terminal 2, and screens are outputted according to the result of this determination. It should be understood that it is supposed that the structure of the in-car information system according to this embodiment is the same as that of the first embodiment shown in FIG. 1 or that of the fourth embodiment shown in FIG. 23. In other words it will be supposed that the in-car device 1 and the portable terminal 2 are mutually connected together via a USB cable 3, and, if the in-car device 1 is one that supports video signal input, then they are further mutually connected together via a video cable 4. Furthermore, if the structure of the in-car device 1 does not support video signal input, then it will be supposed that this device has the same structure as that of the device according to the first embodiment shown in FIG. 2, while, if it does support video signal input, then it will be supposed that it has the same structure as that of the device according to the fourth embodiment shown in FIG. 24. On the other hand, it will be supposed that the structure of the portable terminal 2 is the same as that of the terminal according to the fourth embodiment shown in FIG. 24.

FIG. 31 is a figure showing the flow of information in the in-car information system according to this embodiment between the in-car device 1 and the portable terminal 2 when a menu screen is displayed upon the in-car device 1 and an application is executed by the portable terminal 2. It should be understood that, in FIG. 31, to portions that denote the same flows of information and the same contents as in the in-car information system of the fourth embodiment shown in FIG. 26, the same reference symbols are appended. Moreover in the following, unless particularly required, explanation will be omitted of portions to which the same reference symbols are appended as in FIG. 26.

The start of a SPMan session is commanded from the portable terminal 2 to the in-car device 1 (at the reference symbol 144), an "ACK" is transmitted in response thereto from the in-car device 1 to the portable terminal 2 (at the reference symbol 145), and the portable terminal 2 performs screen output determination as shown by the reference symbol 170 by SPMan that is being executed. At this time, due to the processing executed by the control unit 20, the portable terminal 2 decides whether or not the in-car device 1 is capable of video signal input. For example, by information specifying whether or not the in-car device 1 is capable of inputting a video signal being stored in advance in the in-car device 1, and by this information being transmitted from the in-car device 1 to the portable terminal 2 when the in-car device 1 and the portable terminal 2 are connected together, the portable terminal 2 may perform screen output determination on the basis thereof. It should be understood that it would also be acceptable to arrange for the in-car device 1 to append the information described above to the SPMan start command shown by the reference symbol 142 or to the "ACK" shown by the reference symbol 145, and to transmit it to the portable terminal 2 in this manner. Or it would also be acceptable, when the in-car device 1 and the portable terminal 2 are connected together, to arrange to query the user as to whether or not the in-car device 1 is a device that is capable of video signal input, and for the portable terminal 2 to perform the screen output determination on the basis of the response.

After screen output determination has been performed as explained above, the portable terminal 2 performs transmission of a menu screen according to a method corresponding to the result of that determination, as shown at the reference symbol 146. In other words, if the in-car device 1 is not capable of video signal input, then, as explained for the third embodiment in FIG. 19, menu screen information specifying the content of the menu screen is transmitted to the in-car device 1 via the USB cable 3. As previously described, this menu screen information includes image information for icons corresponding to the applications that are registered in advance with SPMan on the portable terminal 2, information for specifying the correspondence relationship between the applications and the icons, and so on. On the other hand, if the in-car device 1 is capable of video signal input, then, as explained for the fourth embodiment in FIG. 26, the menu screen is converted into a video signal, and this video signal is outputted to the in-car device 1 from the video signal output unit 28 via the video cable 4.

When, due to actuation by the user of the in-car device 1, an icon that corresponds to an application for navigation is selected upon the menu screen, then, as explained in connection with FIG. 26, in response thereto, the portable terminal 2 issues a command to the in-car device 1 for the start of a navigation application session (at the reference symbol 152). And when, in response thereto, an "ACK" is transmitted from the in-car device 1 to the portable terminal 2 (at the reference symbol 153), the portable terminal 2 performs screen output determination for the application that is being executed, as shown at the reference symbol 171. By this screen output determination, it is possible to determine whether or not the in-car device 1 is capable of video signal input, according to a similar method to that employed in the case of the screen output determination for SPMan, as shown at the reference symbol 170 and previously described. At this time, it would also be acceptable to arrange to take over and to continue employing the result of screen output determination for SPMan.

Furthermore, instead of determining whether or not the in-car device 1 is capable of video signal input, it would also be acceptable to perform the screen output determination according to whether or not the application that is being executed by the portable terminal 2 has a screen display function. For example, if the application that is being executed (here, the application for navigation) is one that inherently performs screen display on the portable terminal 2, and it is possible to output this screen just as it is to the in-car device 1, then it is determined that this application has a screen display function. On the other hand, if the application that is being executed is not one that inherently performs screen display on the portable terminal 2, but is rather one that is connected to the in-car device 1 and transmits and displays screen information, then it may be determined that this application does not have a screen display function. The screen output determination at the reference symbol 171 can be performed by doing this.

After the screen output determination has been performed as explained above, transmission of a map screen is performed by a method that corresponds to the result of this determination, as shown at the reference symbol 154. In other words, if the in-car device 1 is not capable of video signal input, or the application that is being executed does not have a screen display function, then, as explained for the third embodiment in connection with FIG. 19, information for a map image or the like corresponding to the application that is being executed is transmitted from the interface unit 25 to the in-car device 1 via the USB cable 3. On the other hand, if the in-car device 1 is capable of video signal input, or the application that is being executed has a screen display function, then, as explained for the fourth embodiment in connection with FIG. 26, a screen for a map screen or the like corresponding to the application that is being executed is converted into a video signal, and this video signal is outputted from the video signal output unit 28 to the in-car device 1 via the video cable 4.

Thereafter, also when the application that is being executed is stopped and SPMan has been started as well, the portable terminal 2 performs screen output determination for SPMan that is being executed (at the reference symbol 172), and a menu screen is transmitted to the in-car device 1 by a method corresponding to the result of this determination (at the reference symbol 162). At this time, it would also be acceptable to arrange to take over and to continue employing the result of the first screen output determination for SPMan shown at the reference symbol 170.

According to the sixth embodiment as explained above, the following beneficial operational effects may be obtained.

(27) Due to the processing by the control unit 20, the portable terminal 2 determines whether or not the in-car device 1 is of a type that is capable of inputting a video signal from the exterior, and performs output of the menu screen by a method that corresponds to the result of this determination. In other words, if the in-car device 1 is one that is capable of inputting a video signal from the exterior and is equipped with a video signal input unit 16, then the menu screen is converted into a video signal, and this video signal is outputted from the signal output unit 28 via the video cable 4 to the video signal input unit 16 of the in-car device 1. On the other hand, if the in-car device 1 is of a type that is not capable of inputting a video signal from the exterior and is not equipped with a video signal input unit 16, then menu screen information specifying the content of the menu screen is outputted from the interface unit 25 via the USB cable 3 to the interface unit 15 of the in-car device 1. Since it is arranged to do this, accordingly it is possible to output the menu screen to the in-car device 1 by the most appropriate and optimum method corresponding to the nature of the in-car device 1, and it is thus possible for this menu screen to be displayed by the in-car device 1.

(28) Due to the processing by the control unit 20, the portable terminal 2 determines whether or not the application that has been put into the running state is one that has a screen display function, and performs output of the screen produced by that application by a method that corresponds to the result of this determination. In other words, if the application that has been put into the running state has a screen display function, and the screen corresponding to that application can be outputted to the in-car device 1 just as it is, then this screen is converted into a video signal, and the video signal is outputted from the signal output unit 28 via the video cable 4 to the video signal input unit 16 of the in-car device 1. On the other hand, if the application that has been put into the running state does not have a screen display function, then image information according to which application is outputted from the interface unit 25 via the USB cable 3 to the interface unit 15 of the in-car device 1. Since it is arranged to do this, accordingly it is possible to output the screen corresponding to that application to the in-car device 1 by the most appropriate and optimum method, according to whether or not the application that is being executed is provided with a screen display function, and it is thus possible for this screen to be displayed by the in-car device 1.

It should be understood that, in the sixth embodiment explained above, it would also be acceptable, according to a method like the one explained for the fifth embodiment, to arrange to display a screen corresponding to the resolution of the display unit 11 upon the in-car device 1, and to perform screen changeover display when changing over the screen such as a menu screen or a map screen or the like to some other screen.

Furthermore while, in the fourth through the sixth embodiments explained above, it was arranged for SPMan to be started upon the portable terminal 2, when the in-car device 1 and the portable terminal 2 are mutually connected together, by a start command for SPMan being outputted from the in-car device 1 to the portable terminal 2, it would also be acceptable to arrange to start SPMan upon detection of the fact that the in-car device 1 and the portable terminal 2 are connected together, as explained for the third embodiment described above.

In the fourth through the sixth embodiments explained above as well, in a similar manner to the case with the previously described third embodiment, if it is possible for the portable terminal 2 to execute a plurality of applications at the same time, then it will always be possible to start SPMan on the portable terminal 2, irrespective of whether or not some other application is being executed. The same is also true for applications of various types, such as an application for navigation or the like that is selected and executed by the user actuating the in-car device 1. In other words, in a similar manner to the case with the third embodiment, in the explanations of the fourth through the sixth embodiments described above, the "starting" of SPMan and of applications of various types means that these applications are put into the running state, and that it is arranged for exchange of information due to these applications to be performed between the in-car device 1 and the portable terminal 2. Conversely, the "stopping" of SPMan and of applications of various types means that these applications are put into the stopped state, and that it is arranged for exchange of information due to these applications no longer to be performed between the in-car device 1 and the portable terminal 2.

As described above, if the portable terminal 2 that is connected to the in-car device 1 is a device that is capable of executing a plurality of applications at the same time, then it is possible to abbreviate the processing when starting an application. Moreover, when an application for navigation is being executed upon the portable terminal 2, it is also possible for the user to actuate the in-car device 1 and to cause another application to be started. On the other hand, if the portable terminal 2 that is connected to the in-car device 1 is a device that is only capable of executing one application at a time, then, as explained in connection with the various embodiments, it is necessary to stop SPMan when an application for navigation is to be executed. By doing this, it is possible to change over the application that is being executed by the portable terminal 2 from SPMan to the application for navigation.

In the fourth through the sixth embodiments explained above, it would also be acceptable, if there is processing that is used in common by a plurality of applications, to arrange for it to be possible to share the results of this processing between the plurality of applications by delegating this processing to SPMan. Processing that is not required after having been initially performed once except when subsequently changing over between different portable terminals 2, such as, for example, user authentication processing or the like, may be of this type. If the above is done, then it is possible for each of the applications merely only to acquire the results of this processing by SPMan, and it is not necessary to perform the same processing again in detail, each time a different application is executed. Due to this, it is possible to anticipate increase of the processing efficiency of the portable terminal 2 and increase of its operating speed.

In the fourth through the sixth embodiments explained above, it was arranged for the decision as to whether or not the vehicle is in motion to be made by the portable terminal 2, by the vehicle speed information outputted from the vehicle being acquired by the in-car device 1, and by this vehicle speed information being outputted from the in-car device 1 to the portable terminal 2. However, it would also be acceptable to arrange for the in-car device 1 to make the decision as to whether or not the vehicle is in motion. In this case, it would not be necessary for the vehicle speed information to be outputted from the in-car device 1 to the portable terminal 2, and the processing of the steps S1120 and S1130 of FIG. 28 would be executed by the control unit 10 of the in-car device 1. Or, it would also be acceptable to arrange for the decision as to whether or not the vehicle is in motion to be made by the in-car device 1, and for the result of this decision to be outputted from the in-car device 1 to the portable terminal 2. In this case, the portable terminal 2 would be able to make the decision of the step S1120 on the basis of the result of the decision outputted from the in-car device 1. Or, it would also be acceptable to arrange for the decision as to whether or not the vehicle is in motion to be made on the basis of the current position of the vehicle as detected by the portable terminal 2. In this case as well, there would be no requirement for the vehicle speed information to be outputted from the in-car device 1 to the portable terminal 2.

Moreover, it would also be acceptable to arrange for the in-car device 1 to acquire vehicle information of various kinds outputted from the vehicle other than the vehicle speed information. It may be arranged for the vehicle information that is acquired at this time to be employed in the processing executed by the in-car device 1, or it may be arranged for it to be outputted from the in-car device 1 to the portable terminal 2 and to be employed in the processing executed by the portable terminal 2. As one example of this, it may be arranged for a start condition that is determined in terms of vehicle information to be stored in advance for each application, and for an application to be automatically started on the portable terminal 2 when vehicle information satisfying its start condition is outputted from the vehicle. In this case, it will be acceptable to arrange for the information specifying the start condition for each application to be transmitted from the portable terminal 2 to the in-car device 1, and for the decision, on the basis of this vehicle information, as to whether or not the start condition is satisfied to be made by the in-car device 1. Or, it would also be acceptable for the vehicle information to be transmitted from the in-car device 1 to the portable terminal 2, and for the decision, on the basis of this vehicle information, as to whether or not the start condition is satisfied to be made by the portable terminal 2. By doing this, when vehicle information such as for example whether the remaining amount of fuel has dropped below some predetermined value is outputted from the vehicle, then it is possible automatically to start an application upon the portable terminal 2 for finding a gasoline station in the vicinity of the current position.

While, in the first through the sixth embodiments explained above, examples have been explained in which the in-car device 1 and the portable terminal 2 are mutually connected together via a USB cable 3 and a video cable 4, and communication between the in-car device 1 and the portable terminal 2 is performed by USB communication, it would also be possible to implement the present invention using some other communication method or signal transmission method. For example, it would be acceptable to arrange to convert a video signal into digital data that is then transmitted by USB communication. Moreover, it would be possible to employ wireless communication such as Bluetooth (a registered trademark) or wireless USB or the like, or cable communication other than by USB or the like. Any type of communication method or format could be used, provided that it is one that is capable of transmitting and receiving the required information between the in-car device 1 and the portable terminal 2.

In the fourth through the sixth embodiments explained above examples have been explained in which button information specifying the details of button actuation by the user or coordinate information specifying a position upon the screen that has been designated by touch panel actuation is transmitted from the in-car device 1 to the portable terminal 2 as actuation information, and in which the details of actuation by the user are determined by the portable terminal 2 on the basis of this actuation information. However, it would also be acceptable to arrange not to employ this method, but for the details of such actuation by the user to be determined by the in-car device 1, and for a start command for the application, a stop command, and so on to be transmitted from the in-car device 1 to the portable terminal 2, according to the result of this determination.

The various embodiments and variant embodiments explained above are only given by way of example; the present invention is not to be considered as being limited by the contents thereof, provided that the essential characteristics of the present invention are not departed from. Moreover, it would also be possible to employ the embodiments and variant embodiments described above in any desired combination.

The invention claimed is:

1. An in-car information system comprising an in-car device and an information terminal that is capable to be connected to the in-car device, wherein:
  the in-car device includes:
    an in-car device display monitor of a touch panel type;
    an in-car device interface unit that transmits actuation information on the basis of actuation on the in-car device display monitor; and
    a video signal input unit that receives a video signal transmitted from the information terminal;
  the information terminal includes:
    an information terminal display monitor of a touch panel type;
    an information terminal interface unit that receives the actuation information;
    a video signal output unit that transmits the video signal for a display on the in-car device display monitor; and
    a memory unit that stores an application for in-car information systems capable to be selected and started via the actuation on the in-car device display monitor and an application manager that recognizes the application for in-car information systems selected via the actuation on the in-car device display monitor;
  the in-car device becomes ready to transmit a start command for the application manager to the information terminal when the in-car device interface unit and the information terminal interface unit are mutually connected together and also the video signal input unit and the video signal output unit are mutually connected together;
  the information terminal starts the application manager to transmit, from the video signal output unit to the in-car device, the video signal for displaying a menu screen on the in-car device display monitor when the information terminal receives the start command from the in-car device; and
  the in-car device receives the video signal by the video signal input unit to display the menu screen on the in-car device display monitor on the basis of the received video signal.

2. An in-car device that is capable to be connected to an information terminal, comprising:
  a display monitor of a touch panel type;
  an interface unit that transmits actuation information on the basis of actuation on the display monitor; and
  a video signal input unit that receives a video signal transmitted from the information terminal, wherein
  the in-car device becomes ready to transmit a start command for an application stored in the information terminal to the information terminal when the interface unit and the video signal input unit are connected to the information terminal.

3. An in-car device according to claim 2, wherein:
  an application for in-car information systems capable to be selected and started via the actuation on the display monitor and an application manager that recognizes the application for in-car information systems selected via the actuation on the display monitor are stored in the information terminal; and
  the in-car device becomes ready to transmit the start command for the application manager when the interface unit and the video signal input unit are connected to the information terminal.

4. An in-car device according to claim 3, wherein the in-car device displays a menu screen for selecting the application for in-car information systems on the display monitor when the application manager is started on the information terminal.

5. An in-car device according to claim 4, wherein:
  the menu screen includes an icon corresponding to the application for in-car information systems; and
  the in-car device outputs a signal to start the application for in-car information systems to the information terminal when the icon is selected on the menu screen.

6. A menu screen display method for an in-car information system comprising an information terminal and an in-car device that is capable to be connected to the information terminal, wherein:
  the in-car device includes:
  a display monitor of a touch panel type;
  an interface unit that transmits actuation information on the basis of actuation on the display monitor; and
  a video signal input unit that receives a video signal transmitted from the information terminal; and
  the menu screen display method comprises:
    setting the in-car device to be ready to transmit a start command for an application stored in the information terminal from the in-car device to the information terminal when the interface unit and the video signal input unit are connected to the information terminal;
    receiving the video signal for displaying a menu screen by the video signal input unit from the information terminal; and
    displaying the menu screen on the display monitor on the basis of the received video signal.

7. A menu screen display method according to claim 6, wherein:

an application for in-car information systems capable to be selected and started via the actuation on the display monitor and an application manager that recognizes the application for in-car information systems selected via the actuation on the display monitor are stored in the information terminal; and the in-car device becomes ready to transmit the start command for the application manager when the interface unit and the video signal input unit are connected to the information terminal.

\* \* \* \* \*